United States Patent [19]
Maruyama et al.

[11] Patent Number: 5,924,114
[45] Date of Patent: Jul. 13, 1999

[54] CIRCULAR BUFFER WITH TWO DIFFERENT STEP SIZES

[75] Inventors: Toshiyuki Maruyama; Masahito Matsuo, both of Tokyo, Japan

[73] Assignee: Mitsubishi Denki Kabushiki Kaisha, Tokyo, Japan

[21] Appl. No.: 08/890,618

[22] Filed: Jul. 9, 1997

[30] Foreign Application Priority Data

Feb. 19, 1997 [JP] Japan ................................ 9-034960

[51] Int. Cl.$^6$ .................................................. G06F 12/00
[52] U.S. Cl. ............................................ 711/110; 711/213
[58] Field of Search .................................. 711/213, 217, 711/110

[56] References Cited

U.S. PATENT DOCUMENTS

| | | | |
|---|---|---|---|
| 4,908,748 | 3/1990 | Pathak et al. ............................ | 711/220 |
| 5,463,749 | 10/1995 | Wertheizer et al. .................... | 711/110 |
| 5,623,621 | 4/1997 | Garde .................................. | 711/110 X |

OTHER PUBLICATIONS

U.S. Patent application Ser. No. 08/699,944 filed Aug. 20, 1996.
TMS320C54X User's Guide, *Texas Instruments*, 1995, pp. 7–22 to 7–25.
DSP1610 Architecture, Instruction Set, and Development Tools, Version 1.0, *AT&T*, 1992, pp. 7–29 to 7–33.

*Primary Examiner*—David L. Robertson
*Attorney, Agent, or Firm*—Burns, Doane, Swecker & Mathis, L.L.P

[57] ABSTRACT

A control unit (112) makes different judgments on the end address, depending on whether 1-word access or 2-word access, based on a post-update signal (507) and a 2-word access signal (508) which are internally generated and a coincidence signal (511) on the high-order 14 bits and another coincidence signal (512) on the bit 14 which are outputted from a comparator (158), and outputs a judgment result to a selector (155) as a selection signal (510). The selector (155) selects one of an output from an ALU (153) and an output from a latch (159) (the MOD_S register 156) based on the selection signal (510). Having this structure, a data processor which enables access with modulo addressing in two different data-units can be provided.

19 Claims, 26 Drawing Sheets

FIG. 24

```
        btsti    r8,#14                                  ⎫
        brf0t    odd                                     ⎬ 521
                                                         ⎭
even:                                                    ⎫
    ld2w    r0,@r8+                                      ⎪
    ld2w    r4,@r9+                                      ⎪
    ld2w    r2,@r8+       ||  clrac  a0                  ⎪
                                                         ⎪
    repi    #63,loopend_even                             ⎪
                                                         ⎪
    ld2w    r6,@r9+       ||  mac    a0,r0,r4            ⎪
    ld2w    r0,@r8+       ||  mac    a0,r1,r5            ⎬ 522
    ld2w    r4,@r9+       ||  mac    a0,r2,r6            ⎪
loopend_even:                                            ⎪
    ld2w    r2,@r8+       ||  mac    a0,r3,r7            ⎪
                                                         ⎪
    ld2w    r6,@r9+       ||  mac    a0,r0,r4            ⎪
    mac     a0,r1,r5                                     ⎪
    mac     a0,r2,r6                                     ⎪
    bra     end           ||  mac    a0,r3,r7            ⎭ odd:                                                     ⎫
    ld      r1,@r8+                                      ⎪
    ld2w    r4,@r9+                                      ⎪
    ld2w    r2,@r8+       ||  clrac  a0                  ⎪
                                                         ⎪
    repi    #63,loopend_odd                              ⎪
                                                         ⎪
    ld2w    r6,@r9+       ||  mac    a0,r1,r4            ⎪
    ld2w    r0,@r8+       ||  mac    a0,r2,r5            ⎬ 523
    ld2w    r4,@r9+       ||  mac    a0,r3,r6            ⎪
loopend_odd:                                             ⎪
    ld2w    r2,@r8+       ||  mac    a0,r0,r7            ⎪
                                                         ⎪
    ld2w    r6,@r9+       ||  mac    a0,r1,r4            ⎪
    ld      r0,@r8+       ||  mac    a0,r2,r5            ⎪
    mac     a0,r3,r6                                     ⎪
    mac     a0,r0,r7                                     ⎭ end:                                                     ⎫
    rachi   r0,a0,#0                                     ⎬ 524
                                                         ⎭
```

FIG. 25

| ADDRESS [14:15] | 0 | 1 | 2 | 3 |
|---|---|---|---|---|
| BEGINNING ADDRESS | 0 | 15 | 16 | 31 |
| h'2000 | A[0] | | A[1] | |
| h'2004 | A[2] | | A[3] | |
| h'2008 | A[4] | | A[5] | |
| ⋮ | ⋮ | | ⋮ | |
| h'21f8 | A[252] | | A[253] | |
| h'21fc | A[254] | | A[255] | |
| h'2400 | D[0] | | D[1] | |
| h'2404 | D[2] | | D[3] | |
| h'2408 | D[4] | | D[5] | |
| ⋮ | ⋮ | | ⋮ | |
| h'25f8 | D[252] | | D[253] | |
| h'25fc | D[254] | | D[255] | |

| ADDRESS [14:15] | 0 | 1 | 2 | 3 |
|---|---|---|---|---|
| BEGINNING ADDRESS | 0 | 15 | 16 | 31 |
| h'2400  533 | D[1] | | D[2] | |
| h'2404 | D[3] | | D[4] | |
| h'2408 | D[5] | | D[6] | |
| ⋮ | ⋮ | | ⋮ | |
| h'25f8 | D[253] | | D[254] | |
| h'25fc  535 | D[255] | | D[0] | |

534
532

| ADDRESS [14:15] | 0 | 1 | 2 | 3 |
|---|---|---|---|---|
| BEGINNING ADDRESS | 0 | 15 | 16 | 31 |
| h'2400 | D[2] | | D[3] | |
| h'2404 | D[4] | | D[5] | |
| h'2408 | D[6] | | D[7] | |
| ⋮ | ⋮ | | ⋮ | |
| h'25f8 | D[254] | | D[255] | |
| h'25fc | D[0] | | D[1] | |

FIG. 30
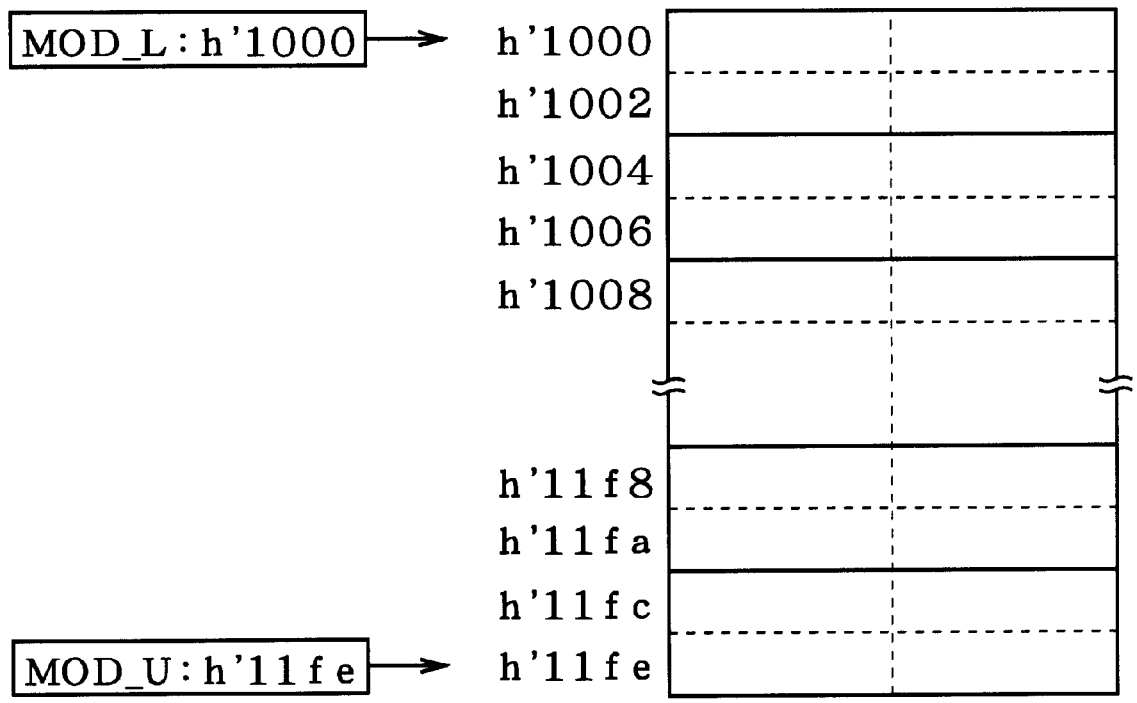
FIG. 31
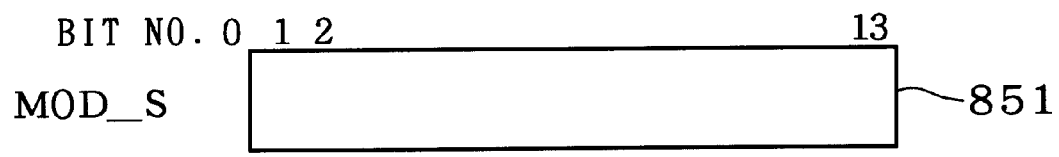

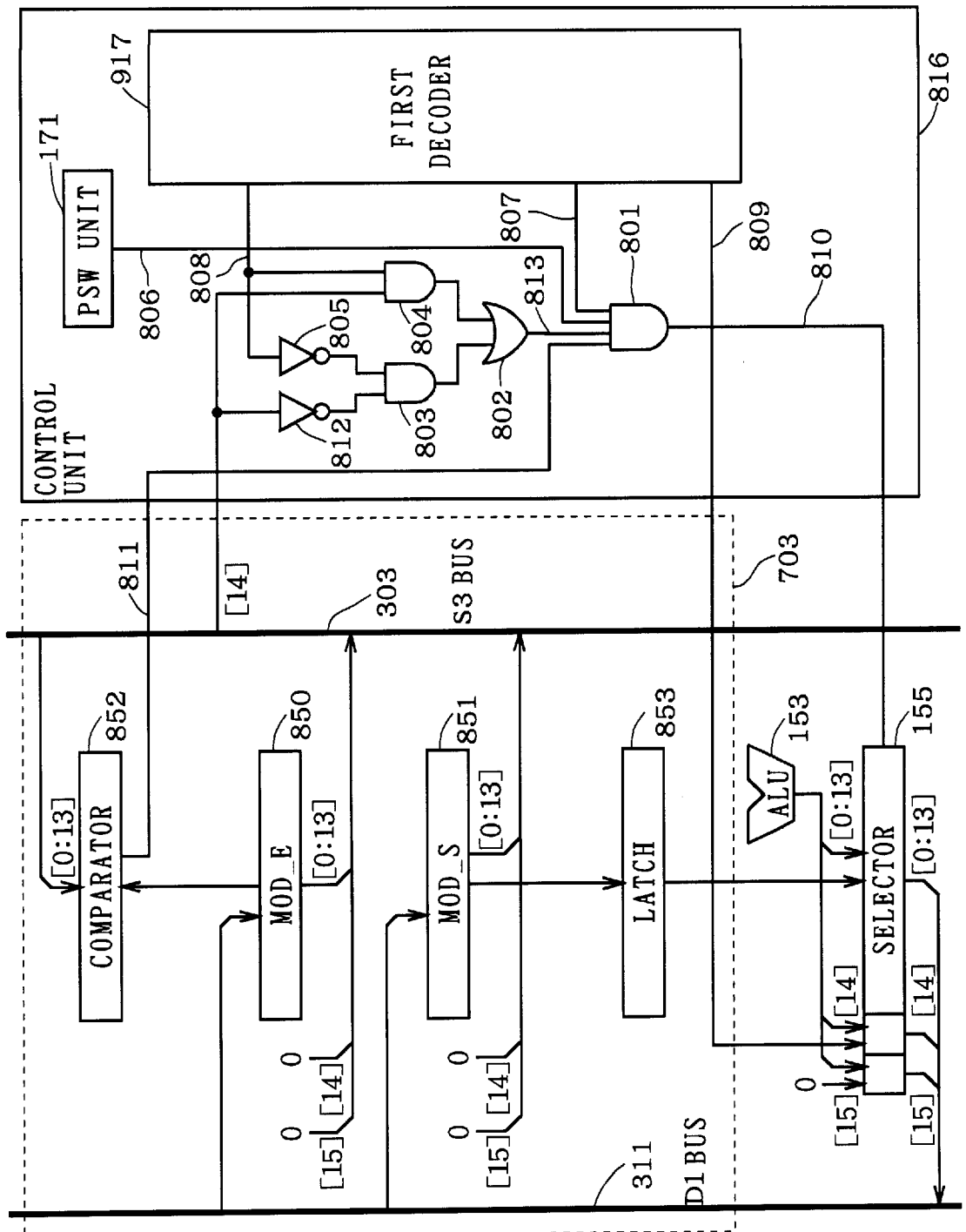
F I G. 3 2

CIRCULAR BUFFER WITH TWO DIFFERENT STEP SIZES

BACKGROUND OF THE INVENTION

1. Field of the Invention

The present invention relates to a high-performance data processor, and more particularly to a data processor implementing an addressing function for efficient access to a circular buffer.

2. Description of the Background Art

A digital signal processor (DSP) is a special processor for high-speed digital signal processing. Most of the DSPs implement modulo addressing (circular addressing), for efficient utilization of a circular buffer.

The DSP, in general, has more than one independently-accessible data memory or a memory with more than one port in order to perform one or more executions of combined multiply-add instruction in one cycle. Though there are a variety of word sizes, such as 16 bits and 24 bits, in principle, a memory is accessed by one word of given size. When a data processor having a 1-circuit data-memory system performs one or more executions of the multiply-add instruction in one cycle, it must fetch more than one data from the memory in one cycle. Moreover, in a sequential sample-by-sample processing, the data processor performs 1-word access and 2-word access mixedly. No data processor has implemented proper modulo addressing in such a processing as performs 1-word access and 2-word access mixedly.

Further, a typical DSP, for example, as disclosed in U.S. Pat. No. 4,908,748, specifies the size of a circular buffer and judges whether to modify an address after updating based on the address after updating of a pointer and the size of the circular buffer. This judgment on address after updating of the pointer increases the number of executions in one clock-cycle and accordingly hinders improvement in operating frequency for high efficiency.

Another type of DSP judges whether to modify an address based on the address before updating of the pointer. The DSP holds a beginning address (rb) and an ending address (re) to define the range of the circular buffer region. When the postincremented address coincides with the ending address (re), the beginning address (rb) is written back as an updated address. This type of DSP, however, has a problem that the modulo addressing can work only when a 1-increment is made.

In an operation of the DSP, since the region to be accessed with modulo addressing is designated by word address, only 1-word access is allowed with auto-increment or auto-decrement and only one setting for modulo addressing is made. Further, if 2-word access is made to the region with modulo addressing, no other access than 2-word access can be made.

Furthermore, there arises an inconvenience of setting start address and end address since the start address and the end address are reversed between increment and decrement.

SUMMARY OF THE INVENTION

The present invention is directed to a data processor having a memory with a circular buffer region to be accessed in units of n-bit data and 2n-bit data and being capable of executing at least a first memory-access instruction which performs access to the memory in units of n-bit data with updating of address to specify n-bit data to be next accessed and a second memory-access instruction which performs access to the memory in units of 2n-bit data with updating of address to specify 2n-bit data to be next accessed. According to a first aspect of the present invention, the data processor comprises: start-address information supply means for supplying start-address information on the circular buffer region; end-address information supply means for supplying end-address information on the circular buffer means. The start-address information designates an address which can specify at least 2n-bit data in the circular buffer region, the end-address information designates an address which can specify at least 2n-bit data in the circular buffer region, and the direction from the address designated by the start-address information to the address designated by the end-address information is defined as an address-update direction. The data processor of the first aspect further comprises: comparison means for comparing an access address specifying data to be accessed in the circular buffer region with the address designated by the end-address information to output comparison result information; and address calculation means for calculating the next address of the access address in the address-update direction to output a calculated address during execution of the first or second memory-access instruction. The calculated address is an address to specify n-bit data when the first memory-access instruction is executed, and is an address to specify 2n-bit data when f memory-access instruction is executed. The data processor of the first aspect further comprises access-address selection means for selecting a value based on the address designated by the start-address information or the calculated address on the basis of the comparison result information as a next access address to specify data to be next accessed. In the data processor of the first aspect, when the first memory-access instruction is executed, the access-address selection means selects an n-bit access address which is based on the address designated by the start-address information and can specify n-bit data in the circular buffer region as the next access address if it judges that a first condition that the address designated by the end-address information and the access address substantially coincide in address field to specify n-bit data is true, and selects the calculated address as the next access address if it judges that the first condition is not true. Further, when the second memory-access instruction is executed, the access-address selection means selects a 2n-bit access address which is based on the address designated by the start-address information and can specify 2n-bit data in the circular buffer region as the next access address if it judges that a second condition that the address designated by the end-address information and the access address substantially coincide in address field to specify 2n-bit data is true, and selects the calculated address as the next access address if it judges that the second condition is not true.

According to a second aspect of the present invention, in the data processor of the first aspect, the first memory-access instruction includes a first increment operation for incrementing an address to accomplish the updating of address, the second memory-access instruction includes a second increment operation for incrementing an address to accomplish the updating of address, and the address-update direction is a direction that increments an address. Further, the start-address information supply means includes start-address information holding means for holding the start-address information, and the end-address information supply means includes end-address information holding means for holding the end-address information.

According to a third aspect of the present invention, in the data processor of the second aspect, the address designated by the start-address information includes an address which can specify n-bit data in the circular buffer region, and the address designated by the end-address information includes an address which can specify n-bit data in the circular buffer region. Further, the second condition used when the access-address selection means selects the next access address includes a condition that the access address coincides with an address specifying the first one of two n-bit data constituting 2n-bit data in the circular buffer region specified by the address designated by the end-address information, the n-bit access address includes the address designated by the start-address information, and the 2n-bit access address includes the address designated by the start-address information.

According to a fourth aspect of the present invention, in the data processor of the second aspect, the address designated by the start-address information includes an address which can specify 2n-bit data in the circular buffer region, and the address designated by the end-address information includes an address which can specify 2n-bit data in the circular buffer region. Further, the first condition used when the access-address selection means selects the next access address includes a condition that the access address coincides with an address specifying the second one of two n-bit data constituting 2n-bit data in the circular buffer region specified by the address designated by the end-address information, the n-bit access address includes the address designated by the start-address information, and the 2n-bit access address includes the address designated by the start-address information.

According to a fifth aspect of the present invention, in the data processor of the first aspect, the first memory-access instruction includes a first decrement operation for decrementing an address to accomplish the updating of address, the second memory-access instruction includes a second decrement operation for decrementing an address to accomplish the updating of address, and the address-update direction is a direction that decrements an address. Further, the start-address information supply means includes start-address information holding means for holding the start-address information, and the end-address information supply means includes end-address information holding means for holding the end-address information.

According to a sixth aspect of the present invention, in the data processor of the fifth aspect, the address designated by the start-address information includes an address which can specify n-bit data in the circular buffer region, and the address designated by the end-address information includes an address which can specify n-bit data in the circular buffer region. Further, the n-bit access address includes the address designated by the start-address information, and the 2n-bit access address includes an address field to specify 2n-bit data of the address designated by the start-address information and fixed data to enable access in units of 2n-bit data.

According to a seventh aspect of the present invention, in the data processor of the fifth aspect, the address designated by the start-address information includes an address which can specify 2n-bit data in the circular buffer region, and the address designated by the end-address information includes an address which can specify 2n-bit data in the circular buffer region. Further, the n-bit access address includes an address specifying the second one of two n-bit data constituting 2n-bit data in the circular buffer region specified by the address designated by the start-address information, and the 2n-bit access address includes the address designated by the start-address information.

According to an eighth aspect of the present invention, the data processor of the first aspect further comprises: low-limit address holding means for holding a low limit address of the circular buffer region; and high-limit address holding means for holding a high limit address of the circular buffer region. In the data processor of the eighth aspect, the first memory-access instruction includes a first increment operation for incrementing an address to accomplish the updating of address, the second memory-access instruction includes a second increment operation for incrementing an address to accomplish the updating of address, and the address-update direction is a direction that increments an address when the first and second memory-access instructions perform the first and second increment operations, respectively. Further in the data processor of the eighth aspect, the first memory-access instruction includes a first decrement operation for decrementing an address to accomplish the updating of address, the second memory-access instruction includes a second decrement operation for decrementing an address to accomplish the updating of address, and the address-update direction is a direction that decrements an address when the first and second memory-access instructions perform the first and second decrement operations, respectively. Still further in the data processor of the eighth aspect, the start-address information supply means includes first selection means receiving executable-instruction information indicating a content of the first or second memory-access instruction to be executed and the low and high limit addresses, for supplying the start-address information designating the low limit address when the executable-instruction information indicates the first or second increment operation and supplying the start-address information designating the high limit address when the executable-instruction information indicates the first or second decrement operation, and the end-address information supply means includes second selection means receiving the executable-instruction information and the low and high limit addresses, for supplying the end-address information designating the high limit address when the executable-instruction information indicates the first or second increment operation and supplying the end-address information designating the low limit address when the executable-instruction information indicates the first or second decrement operation.

According to a ninth aspect of the present invention, in the data processor of the eighth aspect, the low limit address and the high limit address each include an address which can specify n-bit data in the circular buffer region, the n-bit access address includes the address designated by the start-address information, and the 2n-bit access address is the address designated by the start-address information when the second memory-access instruction performs the second increment operation and the 2n-bit access address includes an address field to specify 2n-bit data of the address designated by the start-address information and fixed data to enable access in units of 2n-bit data when the second memory-access instruction performs the second decrement operation.

According to a tenth aspect of the present invention, in the data processor of the eighth aspect, the low limit address and the high limit address each include an address which can specify 2n-bit data in the circular buffer region, the first condition used when the access-address selection means selects the next access address is a condition that the access address coincides with an address specifying the second one of two n-bit data constituting 2n-bit data in the circular buffer region specified by the address designated by the end-address information when the first memory-access performs the first increment operation, the n-bit access address is the address designated by the start-address information when the first memory-access instruction performs the first increment operation and the n-bit access address is an address specifying the second one of two n-bit data constituting 2n-bit data in the circular buffer region specified by the address designated by the start-address information when the first memory-access instruction performs the first decrement operation, and the 2n-bit access address includes the address designated by the start-address information.

According to an eleventh aspect of the present invention, in the data processor of the first aspect, the first and second memory-access instructions each include a load instruction which loads data from the memory.

According to a twelfth aspect of the present invention, in the data processor of the first aspect, the first and second memory-access instructions each include a store instruction which stores data into the memory.

The present invention is directed to a data processor having a memory with a circular buffer region to be accessed in units of n-bit data and being capable of executing at least a memory-access instruction which performs access to the memory in units of n-bit data with updating of address to specify n-bit data to be next accessed. According to a thirteenth aspect of the present invention, in the data processor, the memory-access instruction includes an increment operation for incrementing an address to accomplish the updating of address or a decrement operation for decrementing an address to accomplish the updating of address, and an address-update direction is a direction that increments an address when the memory-access instruction performs the increment operation and is a direction that decrements an address when the memory-access instruction performs the decrement operation. The data processor of the thirteenth aspect comprises: low-limit address holding means for holding a low limit address of the circular buffer region; and high-limit address holding means for holding a high limit address of the circular buffer region. The low limit address and the high limit address each include an address which can specify n-bit data in the circular buffer region. The data processor of the thirteenth aspect further comprises: first selection means receiving executable-instruction information indicating a content of the memory-access instruction to be executed and the low and high limit addresses, for supplying start-address information designating the low limit address when the executable-instruction information indicates the increment operation and supplying the start-address information designating the high limit address when the executable-instruction information indicates the decrement operation; and second selection means receiving executable-instruction information and the low and high limit addresses, for supplying end-address information designating the high limit address when the executable-instruction information indicates the increment operation and supplying the end-address information designating the low limit address when the executable-instruction information indicates the decrement operation. In the data processor of the thirteenth aspect, a direction from an address designated by the start-address information to an address designated by the end-address information is defined the address-update direction. The data processor of the thirteenth aspect further comprises: comparison means for comparing an access address specifying data to be accessed in the circular buffer region with the address designated by the end-address information to output comparison result information; address calculation means for calculating the next address of the access address in the address-update direction to output a calculated address during execution of the memory-access instruction; and access-address selection means for selecting the address designated by the start-address information or the calculated address on the basis of the comparison result information as a next access address to specify data to be next accessed. The access-address selection means selects the address designated by the start-address information as the next access address if it judges that a first condition that the address designated by the end-address information and the access address substantially coincide in address field to specify n-bit data is true on the basis of the comparison result information, and selects the calculated address as the next access address if it judges that the first condition is not true.

According to a fourteenth aspect of the present invention, in the data processor of the thirteenth aspect, the memory-access instruction includes a load instruction which loads data from the memory.

According to a fifteenth aspect of the present invention, in the data processor of the thirteenth aspect, the memory-access instruction includes a store instruction which stores data into the memory.

In the data processor of the first aspect, when the first memory-access instruction is executed, the access-address selection means selects an n-bit access address which is based on the address designated by the start-address information and can specify n-bit data in the circular buffer region as the next access address if the first condition that the address designated by the end-address information and the access address substantially coincide in address field to specify n-bit data is true, and selects the calculated address as the next access address if the first condition is not true. Further, when the second memory-access instruction is executed, the access-address selection means selects a 2n-bit access address which is based on the address designated by the start-address information and can specify 2n-bit data in the circular buffer region as the next access address if the second condition that the address designated by the end-address information and the access address substantially coincide in address field to specify 2n-bit data is true, and selects the calculated address as the next access address if the second condition is not true.

Therefore, the data processor of the first aspect can achieve efficient modulo addressing (circular addressing) over the circular buffer region, even if the first memory-access instruction which performs access in units of n-bit data and second memory-access instruction which performs access in units of 2n-bit data are mixedly executed, only by supplying the start-address information and the end-address information which are used in common for the first and second memory-access informations.

In the data processor of the second aspect, the first and second memory-access instructions have the first and second increment operations, respectively, for incrementing an address to accomplish updating of address, and the address-update direction is a direction that increments an address.

Therefore, the data processor of the second aspect can achieve efficient modulo addressing over the circular buffer region from the low limit address to the high limit address by supplying the start-address information which designates the low limit address and the end-address information which designates the high limit address.

In the data processor of the third aspect, the address designated by the start-address information includes an address which can specify n-bit data in the circular buffer region and the address designated by the end-address information includes an address which can specify n-bit data in the circular buffer region.

Since the address which can specify n-bit data in the circular buffer region includes an address field which can specify 2n-bit data, the access-address selection means can judge whether the first and second condition are each true or not, based on only the comparison result information obtained by comparing the address designated by the end-address information with the access address.

In the data processor of the fourth aspect, the address designated by the start-address information includes an address which can specify 2n-bit data in the circular buffer region and the address designated by the end-address information includes an address which can specify 2n-bit data in the circular buffer region. Accordingly, the start-address information holding means and the end-address information holding means hold minimum information.

Since the first condition used when the access-address selection means selects the next access address includes a condition that the access address coincides with an address specifying the second one of two n-bit data constituting 2n-bit data in the circular buffer region specified by the address designated by the end-address information, the access-address selection means can make a correct judgment on the end address of the first memory-access instruction.

In the data processor of the fifth aspect, the first and second memory-access instructions have the first and second decrement operations, respectively, for decrementing an address to accomplish updating of address, and the address-update direction is a direction that decrements an address.

Therefore, the data processor of the fifth aspect can achieve efficient modulo addressing over the circular buffer region from the high limit address to the low limit address by supplying the start-address information which designates the high limit address and the end-address information which designates the high limit address.

In the data processor of the sixth aspect, the address designated by the start-address information includes an address which can specify n-bit data in the circular buffer region and the address designated by the end-address information includes an address which can specify n-bit data in the circular buffer region.

Since the address which can specify n-bit data in the circular buffer region includes an address field which can specify 2n-bit data, the access-address selection means can judge whether the first and second condition are each true or not, based on only the comparison result information obtained by comparing the address designated by the end-address information with the access address.

Further, in the data processor of the sixth aspect, since the 2n-bit access address includes an address field to specify 2n-bit data of the address designated by the start-address information and fixed data to enable access in units of 2n-bit data, the access-address selection means can correctly select the 2n-bit access address as the next access address when the second condition is true.

In the data processor of the seventh aspect, the address designated by the start-address information includes an address which can specify 2n-bit data in the circular buffer region and the address designated by the end-address information includes an address which can specify 2n-bit data in the circular buffer region. Accordingly, the start-address information holding means and the end-address information holding means hold minimum information.

Since the n-bit access address includes an address specifying the second one of two n-bit data constituting 2n-bit data in the circular buffer region specified by the address designated by the start-address information, the access-address selection means can correctly select the n-bit access address as the next access address when the first condition is true.

In the data processor of the eighth aspect, the start-address information supply means includes first selection means for supplying the start-address information designating the low limit address when the executable-instruction information indicates the first or second increment operation and supplying the start-address information designating the high limit address when the executable-instruction information indicates the first or second decrement operation, and the end-address information supply means includes second selection means for supplying the end-address information designating the high limit address when the executable-instruction information indicates the first or second increment operation and supplying the end-address information designating the low limit address when the executable-instruction information indicates the first or second decrement operation.

Therefore, in the data processor of the eighth aspect, the first and second selection means can automatically supply correct start-address information and end-address information, whether the first and second memory-access instructions perform the first and second increment operations or the first and second decrement operations, by storing the low limit address and the high limit address of the circular buffer region into the low-limit address holding means and the high-limit address holding means.

As a result, the data processor of the eighth aspect eliminates the need for changing addresses to be stored in the low-limit address holding means and the high-limit address holding means depending on whether the first and second memory-access instructions perform the first and second increment operations or the first and second decrement operations, and accordingly it can reduce the code size of program and the number of operation cycles, to thereby achieve high-speed operation.

In the data processor of the ninth aspect, the low limit address and the high limit address each include an address which can specify n-bit data in the circular buffer region.

Since the address which can specify n-bit data in the circular buffer region includes an address field which can specify 2n-bit data, the access-address selection means can judge whether the first and second condition are each true or not, based on only the comparison result information obtained by comparing the address designated by the end-address information with the access address.

Since the 2n-bit access address is the address designated by the start-address information when the second memory-access instruction performs the second increment operation and the 2n-bit access address includes an address field to specify 2n-bit data of the address designated by the start-address information and fixed data to enable access in units of 2n-bit data when the second memory-access instruction performs the second decrement operation, the access-address selection means can correctly select the 2n-bit access address as the next access address when the second condition is true.

In the data processor of the tenth aspect, since the low limit address and the high limit address each include an address which can specify 2n-bit data in the circular buffer region, the low-limit address holding means and the high-limit address holding means hold minimum information.

Since the first condition used when the access-address selection means selects the next access address includes a condition that the access address coincides with an address specifying the second one of two n-bit data constituting 2n-bit data in the circular buffer region specified by the address designated by the end-address information when the first memory-access instruction performs the first increment operation, the access-address selection means can make a correct judgment on the end address of the first memory-access instruction.

Further, the n-bit access address is the address designated by the start-address information when the first memory-access instruction performs the first increment operation and the n-bit access address is an address specifying the second one of two n-bit data constituting 2n-bit data in the circular buffer region specified by the address designated by the start-address information when the first memory-access instruction performs the first decrement operation. Therefore, the access-address selection means can correctly select the n-bit access address as the next access address when the first condition is true.

In the data processor of the eleventh aspect, the first and second memory-access instructions each include a load instruction which loads data from the memory. Therefore, the data processor of the eleventh aspect can achieve efficient modulo addressing over the circular buffer region even if a load instruction which performs access in units of n-bit data and a load instruction which performs access in units of 2n-bit data are mixedly executed.

In the data processor of the twelfth aspect, the first and second memory-access instructions each include a store instruction which loads data from the memory. Therefore, the data processor of the twelfth aspect can achieve efficient modulo addressing over the circular buffer region even if a store instruction which performs access in units of n-bit data and a store instruction which performs access in units of 2n-bit data are mixedly executed.

The data processor of the thirteenth aspect comprises first selection means for supplying start-address information designating the low limit address when the executable-instruction information indicates the increment operation and supplying the start-address information designating the high limit address when the executable-instruction information indicates the decrement operation, and second selection means for supplying end-address information designating the high limit address when the executable-instruction information indicates the increment operation and supplying the end-address information designating the low limit address when the executable-instruction information indicates the decrement operation.

Therefore, in the data processor of the thirteenth aspect, the first and second selection means can automatically supply correct start-address information and end-address information, whether the first and second memory-access instructions perform the first and second increment operations or the first and second decrement operations, by storing the low limit address and the high limit address of the circular buffer region into the low-limit address holding means and the high-limit address holding means.

As a result, the data processor of the thirteenth aspect eliminates the need for changing addresses to be stored in the low-limit address holding means and the high-limit address holding means depending on whether the first and second memory-access instructions perform the first and second increment operations or the first and second decrement operations, and accordingly it can reduce the code size of program and the number of operation cycles, to thereby achieve efficient modulo addressing over the circular buffer region.

In the data processor of the fourteenth aspect, the memory-access instruction includes a load instruction which loads data from the memory. Therefore, the data processor of the fourteenth aspect can achieve modulo addressing over the circular buffer region by executing a load instruction which performs access in units of n-bit data.

In the data processor of the fifteenth aspect, the memory-access instruction includes a store instruction which stores data into the memory. Therefore, the data processor of the fifteenth aspect can achieve modulo addressing over the circular buffer region by executing a store instruction which performs access in units of n-bit data.

An object of the present invention is to provide a data processor which enables accesses in two different data-units with modulo addressing or a data processor which eliminates the inconvenience of setting start address and end address, which is needed in switching between increment and decrement.

These and other objects, features, aspects and advantages of the present invention will become more apparent from the following detailed description of the present invention when taken in conjunction with the accompanying drawings.

BRIEF DESCRIPTION OF THE DRAWINGS

FIG. 24 illustrates a program example of FIR filtering by the data processor in accordance with the first preferred embodiment of the present invention;

FIG. 25 illustrates coefficient allocation and data allocation in a memory when the FIR filtering operation is performed;

FIGS. 26 and 27 illustrate data allocation in a memory when the FIR filtering operation is performed;

FIG. 28 illustrates registers holding the high limit address and the low limit address for modulo addressing in a data processor in accordance with a second preferred embodiment of the present invention;

FIG. 30 illustrates a structure of a circular buffer with both the two boundaries aligned in 4 bytes;

FIG. 31 illustrates registers holding the high limit address and the low limit address for modulo addressing in a data processor in accordance with a third preferred embodiment of the present invention;

FIG. 32 is a schematic circuit diagram showing implementation of modulo addressing in the data processor in accordance with the third preferred embodiment of the present invention;

DESCRIPTION OF THE PREFERRED EMBODIMENTS

The First Preferred Embodiment

Basic Structure

Now, a data processor of the first preferred embodiment of the present invention will be discussed. The data processor of this preferred embodiment is a 16-bit processor and processes addresses and data of 16 bits.

Figure 1:
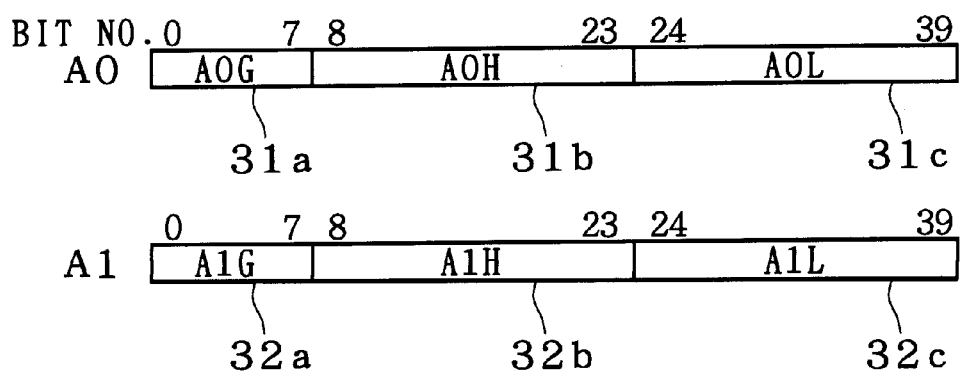
FIG. 1 illustrates a register set of a data processor in accordance with a first preferred embodiment of the present invention.

FIG. 1 illustrates a register set of the data processor of this preferred embodiment. The data processor adopts Big Endian on the order of bit or byte, and the most significant bit (MSB) corresponds to the bit 0.

Sixteen registers R0 to R15 each store data or address value. The registers R0 to R14 are general-purpose registers and the register R13 is designated as a LINK register to store a return address in execution of sub-routine jump instruction. The register R15 is a stack pointer SP, including a stack pointer for interrupt SPI and a stack pointer for user SPU which are switched over to each other by a processor status word PSW as discussed later. Hereafter, the stack pointers SPI and SPU are generally termed a stack pointer SP.

Except specific cases, 4-bit register-designator field indicates the number for the register, which is an operand. The data processor of the present invention uses an instruction which performs an operation with a pair of registers, for example, registers R0 and R1. In this case, designation is made to an even-numbered register and implicit designation is made to the next odd-numbered register. Registers CR0 to CR3 and CR7 to CR11 are control registers of 16 bits. The control registers, like the general-purpose registers, are designated by using 4-bit number. The register CR0 is intended to store the processor status word (PSW) consisting of bits indicating an operation mode of the data processor and flags indicating an operation result.

Figure 2:
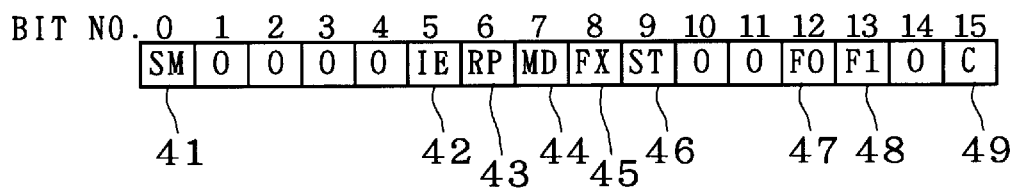
FIG. 2 illustrates a format of processor status word of the data processor in accordance with the first preferred embodiment of the present invention.

FIG. 2 illustrates a format of the PSW in the register CR0. As shown in FIG. 2, the bit 1 of the PSW is an SM bit 41 indicating a stack mode. When the SM bit 41 is "0", indicating an interrupt mode, the stack pointer SPI is used as the register R15. When the SM bit 41 is "1", indicating a user mode, the stack pointer SPU is used as the register R15. The bit 5 of the PSW is an IE bit 42 indicating whether the interrupt is enabled or disabled. When the IE bit 42 is "0", the interrupt is masked (ignored if asserted) and when it is "1", the interrupt is serviced. This data processor implements a repeat function to achieve a zero-overhead loop processing. The bit 6 of the PSW is an RP bit 43 on repeat operation. The RP bit 43 of "0" indicates no repeat operation being executed and the RP bit 43 of "1" indicates a repeat operation being executed. Further, this data processor implements a modulo addressing function to access the circular buffer. The bit 7 of the PSW is an MD bit 44 indicating whether the modulo addressing is enabled or disabled. When the MD bit 44 is "0", the modulo addressing is disabled and when it is "1", the modulo addressing is enabled. The bit 8 of the PSW is an FX bit 45 specifying a format of data to be stored in an accumulator. When the FX bit 45 is "0", a multiplication result is stored into the accumulator in an integer format and when it is "1", the multiplication result is stored in a fixed-point format, being shifted right one bit position. The bit 9 of the PSW is an ST bit 46 specifying a saturation mode. When the ST bit 46 is "0", an operation result is stored in the accumulator in 40 bits and when it is "1", the operation result is stored in 32 bits, being limited. Assuming that hexadecimal representation follows "h'", when the operation result is larger than h' 007fffffff, h'007fffffff is written into the accumulator and when it is smaller than h'ff80000000, h'ff80000000 is written into the accumulator. The bit 12 of the PSW is an execution control flag (F0 flag) 47, to which a comparison result after execution of comparison instruction and the like is set. The bit 13 of the PSW is an execution control flag (F1 flag) 48, to which the value in the F0 flag 47 is copied before the F0 flag 47 is updated in execution of comparison instruction and the like. The bit 15 of the PSW is a carry flag (C flag) 49, to which a carry in execution of add-subtract instruction is set.

The register CR2 of FIG. 1 is a program counter PC, indicating the address of an instruction being executed. The data processor of this preferred embodiment in principle processes instructions of 32-bit fixed length, and the PC (or CR2) holds instruction word addresses in units of word of 32 bits.

The register CR1 is a backup processor status word (BPSW) for saving and holding the value of the processor status word PSW during execution if an exception or an interrupt is found. The register CR3 is a backup program counter (BPC) for saving and holding the value of the program counter PC. The registers CR7 to CR9 are registers for a repeat operation, allowing an user to read and write values so that an interrupt may be accepted during the repeat operation. The register CR7 is a repeat counter (RPT_C) for holding a count value indicating the repeat count. The register CR8 is a repeat start address (RPT_S) for holding the address of the first instruction in the block to be repeated. The register CR9 is a repeat end address (RPT_E) for holding the address of the last instruction in the block to be repeated.

The registers CR10 and CR11 are control registers for modulo addressing. The register CR10 holds a modulo start address (MOD_S) and the register CR11 holds a modulo end address (MOD_E). The registers CR10 and CR11 hold the first and the last data word addresses (16 bits), respectively. In the modulo addressing with increment, the lower address is designated as the modulo start address MOD_S and the higher address is designated as the modulo end address MOD_E. When a register value to be incremented coincides with the modulo end address MOD_E, the address value of the modulo start address MOD_S is written back to the register as an increment result.

FIG. 1 also shows 40-bit accumulators A0 and A1. The accumulators A0 and A1 consist of fields A0H and A1H holding the high-order 16 bits of the multiply-add operation result, fields A0L and A1L holding the low-order 16 bits of the multiply-add operation result and guard bits A0G and A1G holding overflow bits of the multiply-add operation result, respectively.

Figure 3:
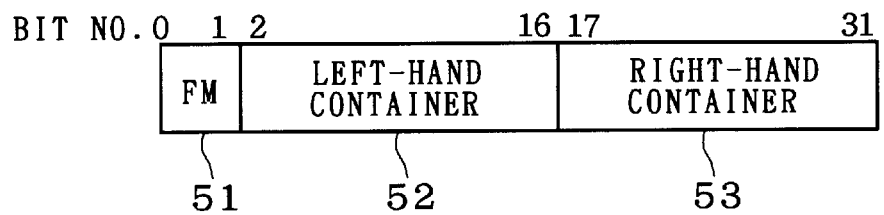
FIG. 3 illustrates an instruction format used in the data processor in accordance with the first preferred embodiment of the present invention.

The data processor of this preferred embodiment processes 2-way VLIW (Very Long Instruction Word) instruction sets. FIG. 3 illustrates a format of instruction used in the data processor of this preferred embodiment. The basic instruction length is fixed to 32 bits and the instruction is aligned in 32-bit boundary. A 32-bit instruction code consists of 2-bit format specification bit (FM bit) 51 indicating a format of the instruction, a 15-bit left-hand container 52 and a 15-bit right-hand container 53. The containers 52 and 53 may each store a 15-bit short-format sub-instruction or may store together a 30-bit long-format sub-instruction. For simple discussion, hereafter, the short-format sub-instruction is referred to as a short instruction and the long-format sub-instruction is referred to as a long instruction.

The FM bit 51 specifies a format of instruction and an order of executions of two short instructions. When the FM bit 51 is "11", the combined containers 52 and 53 of 30 bits hold a long instruction, and otherwise the containers 52 and 53 each hold a short instruction. Further, if the containers 52 and 53 hold two short instructions, the FM bit 51 specifies an order of executions of the two instructions. When the FM bit 51 is "00", the two short instructions are executed in parallel. When "01", the short instruction stored in the left-hand container 52 is first executed and the short instruction stored in the right-hand container 53 is executed later. When "10", the short instruction stored in the right-hand container 53 is first executed and the short instruction stored in the left-hand container 52 is executed later. Thus, two short instructions to be sequentially executed can be also encoded in a 32-bit instruction, for higher efficiency of encoding.

Figure 4:
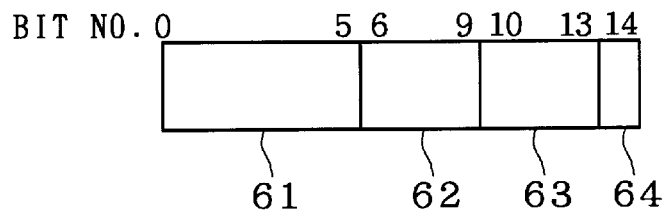
FIG. 4 illustrates a format of short-format 2-operand instruction used in the data processor in accordance with the first preferred embodiment of the present invention.
Figure 5:
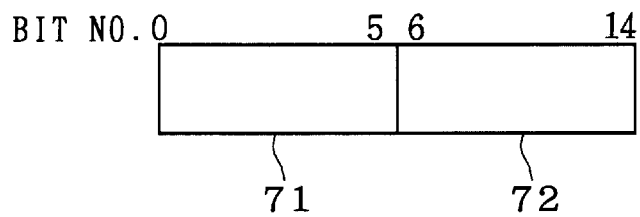
FIG. 5 illustrates a format of short-format branch instruction used in the data processor in accordance with the first preferred embodiment of the present invention.
Figure 6:
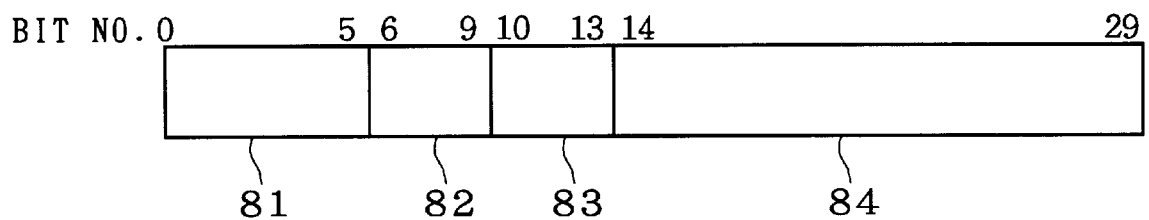
FIG. 6 illustrates a format of long-format 3-operand instruction or long-format load/store instruction used in the data processor in accordance with the first preferred embodiment of the present invention.
Figure 7:
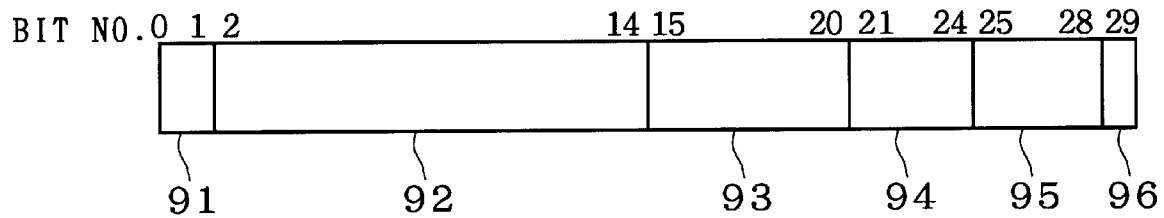
FIG. 7 illustrates a format of instruction having a long-format operation code in the right-hand container used in the data processor in accordance with the first preferred embodiment of the present invention.

FIGS. 4 to 7 illustrate typical instruction encodings. FIG. 4 illustrates instruction encoding of a 2-operand short instruction. Fields 61 and 64 are operation code fields. In some cases, the field 64 designates an accumulator number. Fields 62 and 63 designates the location to hold data to be referenced or updated as an operand by using a register number or an accumulator number. In some cases, the field 63 designates a 4-bit short immediate value. FIG. 5 illustrates instruction encoding of a short-format branch instruction, consisting of an operation code field 71 and 8-bit branch displacement field 72. The branch displacement is designated by an offset of 32-bit instruction word, like the PC value. FIG. 6 illustrates a format of 3-operand instruction with 16-bit displacement, immediate value or load/store instruction, consisting of an operation code field 81, fields 82 and 83 for designating a register number and so on like the short format and an extended data field 84 for designating 16-bit displacement or immediate value. FIG. 7 illustrates a format of long-format instruction with an operation code in the right-hand container 53. A 2-bit field 91 indicates "01". Fields 93 and 96 are operation code fields and fields 94 and 95 each designate a register number. A field 92 is a reserved field used for designating an operation code or a register number as required.

Besides the above, there are some special encodings for instructions, such as NOP (No Operation) instruction whose entire 15 bits are designated as operation code and 1-operand instruction.

A sub-instruction processed in the data processor of this preferred embodiment is a RISC-like instruction set. Only a load/store instruction accesses the memory data and an operation instruction performs an arithmetic operation on an operand held in the register/accumulator or using an immediate operand. There are five operand-data addressing modes: a register indirect mode, a register indirect mode with postincrement, a register indirect mode with postdecrement, a push mode and a register relative indirect mode, and their mnemonic-names are "@Rsrc", "@Rsrc+", "@Rsrc−", "@-SP", "@(disp16, Rsrc)", respectively. Rsrc refers to a register number used to designate a base address and disp16 refers to a 16-bit displacement value. An operand address is designated by byte address.

In the above modes, except the register relative indirect mode, the instruction format of FIG. 4 is used. The field 63 designates a base register number and the field 62 designates the number for a register to hold a value loaded from the memory or to be stored in the memory. In the register indirect mode, a value held in the designated base register is the operand address. In the register indirect mode with postincrement, a value held in the designated base register is the operand address, and the value is postincremented by the size (the number of bytes) of the operand and written back into the base register. In the register indirect mode with postdecrement, a value in the register designated as the base register is the operand address, and the value is postdecremented by the size (the number of bytes) of the operand and written back into the base register. The push mode is enabled only when a store instruction is executed and the base register is the register R15, and the stack pointer (SP) value is predecremented by the size (the number of bytes) of the operand to serve as the operand address and is written back to the SP.

In the register relative indirect mode, the instruction format of FIG. 6 is used. The field 83 designates a base register number and the field 82 designates the number for a register to hold a value loaded from the memory or to be stored in the memory. The field 84 specifies a displacement value for the location to hold the operand from the base address. In the register relative indirect mode, the 16- bit displacement value is added to the value held in the designated base register to serve as the operand address.

In the register indirect mode with postincrement and the register indirect mode with postdecrement, a modulo addressing mode is enabled by setting "1" to the MD bit 44 in the PSW.

There are two types of jump-target addressing modes for a jump instruction: a register indirect mode for designating the jump target address by the register value and a PC-relative indirect mode for designating the jump target address by a branch displacement from the PC of the jump instruction. Further, the PC-relative indirect mode includes two types of addressing modes: short-format addressing with 8-bit branch displacement and long-format addressing with 16-bit branch displacement. The data processor also processes a repeat instruction which achieves a loop without overhead.

Figure 8:
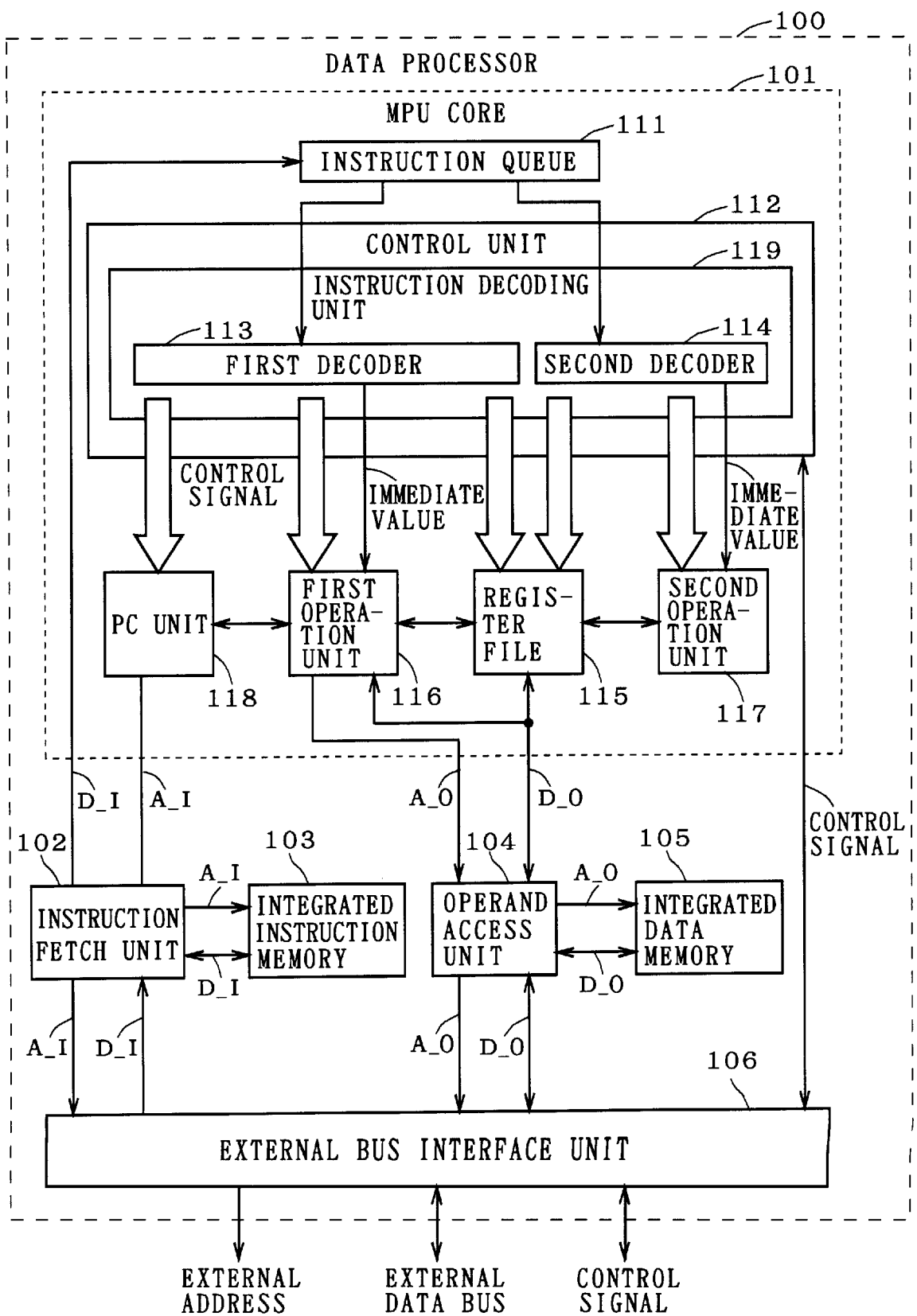
FIG. 8 is a block diagram showing a functional structure of the data processor in accordance with the first preferred embodiment of the present invention.

FIG. 8 is a block diagram showing a functional structure of a data processor 100 in accordance with the first preferred embodiment of the present invention. The data processor 100 includes an MPU core 101, an instruction fetch unit 102 for accessing instruction data in response to a request from the MPU core 101, an integrated instruction memory 103, an operand access unit 104 for accessing operand data in response to a request from the MPU core 101, an integrated data memory 105, and an external bus interface unit 106 for arbitrating external memory-access requests from the instruction fetch unit 102 and the operand access unit 104 to access an external memory of the data processor 100.

The MPU core 101 includes an instruction queue 111, a control unit 112, a register file 115, a first operation unit 116, a second operation unit 117 and a PC unit 118.

The instruction queue 111 holds two entries of 32-bit instruction buffers, a valid bit, an input/output pointer and so on, and is controlled in a FIFO (first-in first-out) order. The instruction queue 111 temporarily holds instruction data fetched by the instruction fetch unit 102 to transfer the instruction data to the control unit 112.

The control unit 112 makes all controls on the MPU core 101, such as control of the above instruction queue 111, pipeline control, execution of instructions and interface between the internal elements, such as the instruction fetch unit 102 and operand access unit 104, and the external elements. The control unit 112 includes an instruction decoding unit 119 for decoding instruction codes transferred from the instruction queue 111. The instruction decoding unit 119 includes two decoders: a first decoder 113 decodes instructions to be executed in the first operation unit 116, and a second decoder 114 decodes instructions to be executed in the second operation unit 117. In the first cycle of decoding of a 32-bit instruction, the first decoder 113 analyzes an instruction code in the left-hand container 52 (FIG. 3), and the second decoder 114 analyzes an instruction code in the right-hand container 53. Accordingly, the instruction to be first executed must be located correspondingly to the operation unit which executes it.

The data located in the FM bits 51 and in the bit 0 and the bit 1 of the left-hand container 52 are analyzed by both the first and second decoders 113 and 114. The data in the right-hand container 53 are transferred to the first decoder 113 to extract the extended data, but are not analyzed therein. When two short instructions are sequentially executed, the instruction to be executed later is decoded by a predecoder (not shown) during decoding of the instruction to be first executed, to judge which decoder, among the two, should decode the instruction to be executed later. If the instruction to be executed later can be decoded by either of the first and second decoders 113 and 114, the instruction should be decoded by the decoder 113. After decoding of the instruction to be first executed, the code of the instruction to be executed later is given to the selected decoder and analyzed therein.

The register file 115 holds values of the registers R0 to R15 (FIG. 1) and is connected to the first operation unit 116, the second operation unit 117, the PC unit 118 and the operand access unit 104 with a plurality of buses.

Figure 9:
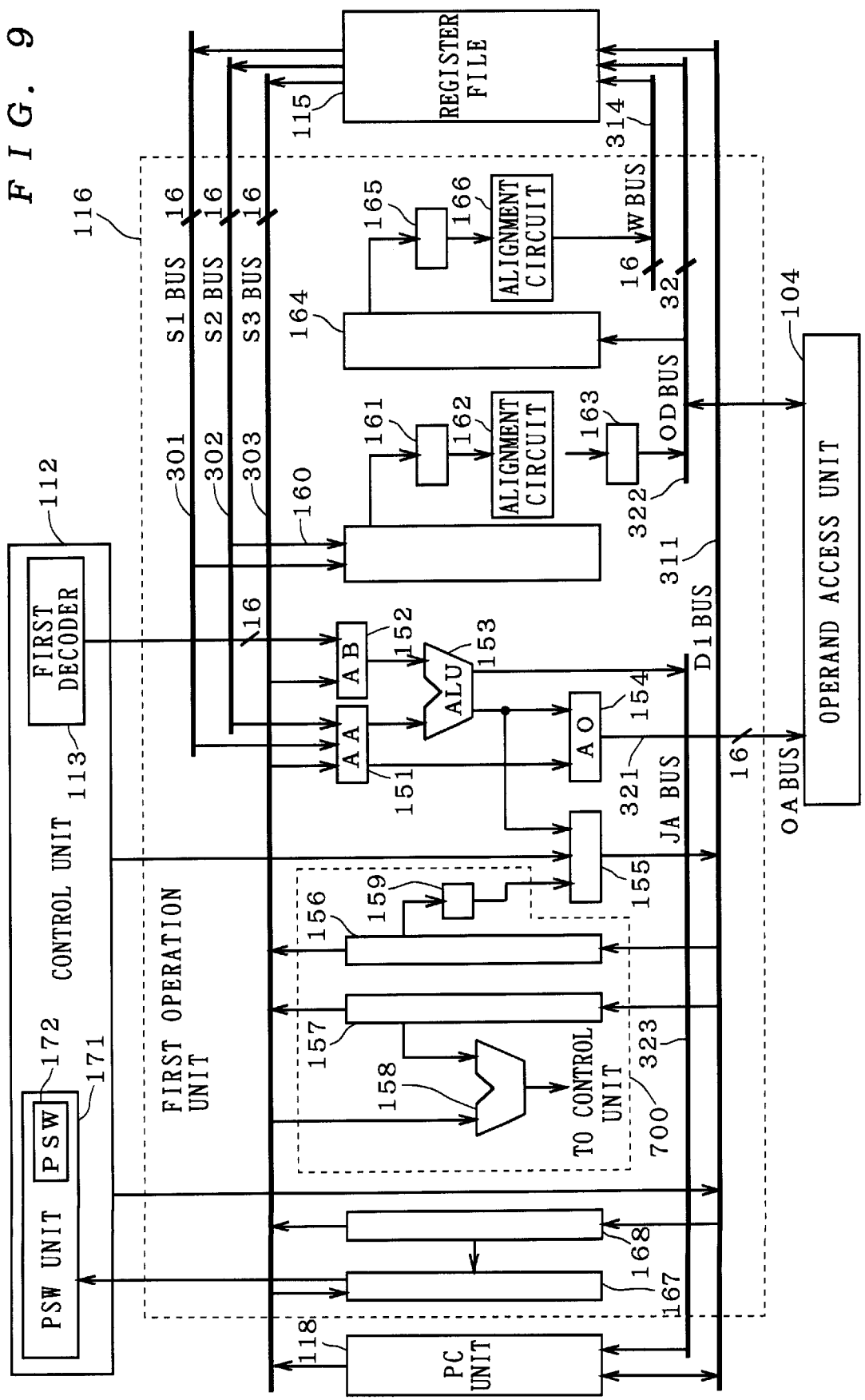
FIG. 9 is a block diagram showing a detailed structure of a first operation unit of the data processor in accordance with the first preferred embodiment of the present invention.

FIG. 9 is a block diagram showing a detailed structure of the first operation unit 116. The first operation unit 116 is connected to the register file 115 with an S1 bus 301, an S2 bus 302 and an S3 bus 303. Data read from the register file 115 are transferred over the three buses 301 to 303 to operation devices and the like, serving as operands or to be stored. The S1 bus 301 is connected only to even-numbered registers and the S2 bus 302 is connected only to odd-numbered registers. The S1 bus 301 and the S2 bus 302 can transfer 2-word data from a pair of registers in parallel. The S3 bus 303 is connected to all the registers.

The first operation unit 116 is connected to the register file 115 with a D1 bus 311 and a W bus 314. Operation results and transferred data are transferred to the register file 115 over the D1 bus 311 and loaded byte data are transferred to the register file 115 over the W bus 314. Both the D1 bus 311 and the W bus 314 are connected to all the registers. Further, the register file 115 is connected to the operand access unit 104 with a 32-bit OD bus 322, allowing parallel transfer of 1-word data or 2-word data from a pair of registers. The high-order/low-order 16 bits on the OD bus 322 are connected to the register file 115 so as to be written into any of the registers.

An AA latch 151 and an AB latch 152 are input latches for an ALU 153. The AA latch 151 receives a register value read out and transferred over the S1 bus 301, the S2 bus 302 or the S3 bus 303. The AA latch 151 also has a zero-clear function. The AB latch 152 receives a register value read out and transferred over the S3 bus 303 or a 16-bit immediate value generated by decoding in the first decoder 113, and also has a zero-clear function.

The ALU 153 mainly performs transfer, comparison, arithmetic and logic operation, calculation/transfer of operand addresses, increment/decrement of operand address values, calculation/transfer of jump target addresses and the like. Results of operation and address modification are transferred through a selector 155 over the D1 bus 311 and written back to the register designated by the instruction in the register file 115. For example, to perform increment (decrement), the ALU 153 adds the base address held in the AA latch 151 and the increment (decrement) address value held in the AB latch 152. The AB latch 152 holds "4" for 2-word access and holds "2" for 1-word access.

To execute a condition set instruction which writes "1" when the specified condition is satisfied and writes "0" when not satisfied, the selector 155 has a function to fill the least significant bit of the operation result with data from the control unit 112. In this case, the operation result is controlled to be zero. An AO latch 154 holds operand addresses, and specifically, it selectively holds the address calculation result from the ALU 153 or the base address value from the AA latch 151 and outputs the held data to the operand access unit 104 over an OA bus 321. When the ALU 153 calculates the jump target address or the repeat end address, the calculation result from the ALU 153 is transferred to the PC unit 118 over a JA bus 323.

A modulo operation unit 700 includes a MOD_S register 156, a MOD_E register 157, a comparator 158 and a latch 159. The MOD_S register 156 and the MOD_E register 157 are control registers provided correspondingly to the registers CR10 (holding modulo start address (MOD_S)) and CR11 (holding modulo end address (MOD_E)) of FIG. 1, respectively. The comparator 158 compares the value held in the MOD_E register 157 with the base address value on the S3 bus 303. The MOD_S register 156 is connected to the selector 155 through the latch 159. Detailed description on operation will be presented later.

A stored-data (SD) register 160 includes two 16-bit registers and temporarily holds store data outputted to both or either of the S1 bus 301 and the S2 bus 302. Data held in the SD register 160 are transferred to an alignment circuit 162 through a latch 161. The alignment circuit 162 aligns the stored data in 32-bit boundary according to the operand address and outputs the stored data to the operand access unit 104 through a latch 163 over an OD bus 322.

The byte data loaded by the operand access unit 104 are inputted to a 16-bit load-data (LD) register 164 over the OD bus 322. The value held in the LD register 164 is transferred to an alignment circuit 166 through a latch 165. The alignment circuit 166 performs alignment in byte and zero-/sign-extension on the byte data. The aligned and extended data are transferred over the W bus 314 and written into the designated register in the register file 115. When 1-word (16-bit) load or 2-word (32-bit) load is made, the loaded value is directly written into the designated register in the register file 115, not through the LD register 164.

A PSW unit 171 in the control unit 112 includes a PSW latch 172 for holding the value of the register CR0 of FIG. 1, a PSW update circuit and the like, and updates the value held in the PSW latch 172 with the operation result or by executing the instruction. Of the data on the S3 bus 303, only required bits (assigned bits) are transferred to the PSW latch 172 through a TPSW latch 167. When the value is read from the PSW latch 172, the value is given to the D1 bus 311 from the PSW unit 171 and written into the register file 115. A BPSW latch 168 is a register which corresponds to the register CR1 of FIG. 1. When an exception is serviced, the value of the PSW on the D1 bus 311 is written into the BPSW latch 168. The value held in the BPSW latch 168 is read out into the S3 bus 303 and transferred to the register file 115 and the like as required. The bits not assigned are forcefully given "0" and then outputted to the S3 bus 303. On return from the exception, only the required bits (assigned bits) of the value held in the BPSW latch 168 are transferred to the PSW latch 172 directly through the TPSW latch 167.

Figure 10:
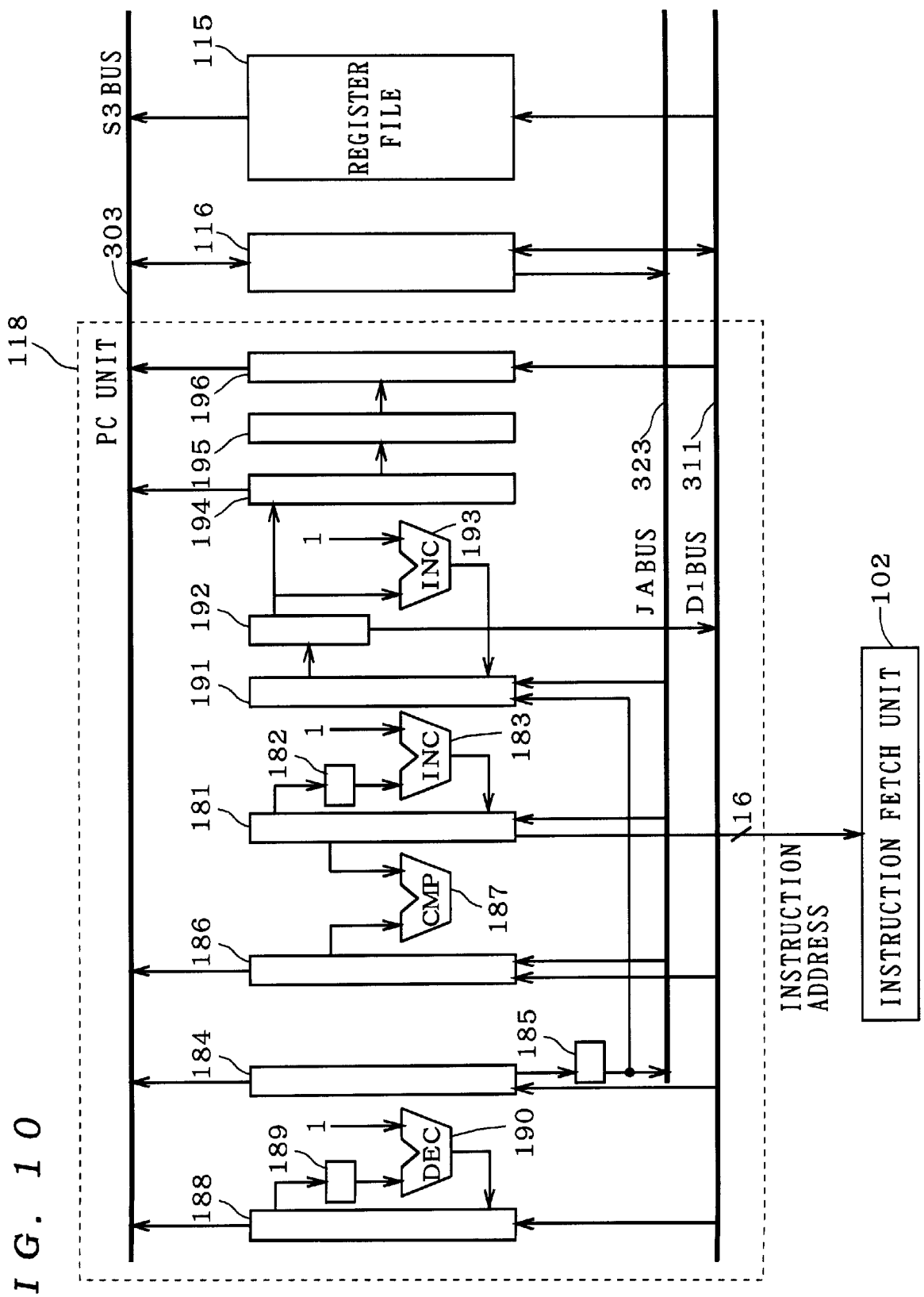
FIG. 10 is a block diagram showing a detailed structure of a program counter (PC) of the data processor in accordance with the first preferred embodiment of the present invention.

FIG. 10 is a block diagram showing a detailed structure of a program counter (PC) unit 118. An instruction address (IA) register 181 holds the address of the next instruction to be fetched and outputs the address to the instruction fetch unit 102. When a subsequent instruction is to be fetched, the address value transferred from the IA register 181 through a latch 182 is incremented by 1 in an incrementor 183 and then written back into the IA register 181. If a jump or repeat instruction changes the sequence, the IA register 181 receives the jump target address or the repeat block start address transferred over the JA bus 323.

An RPT_S register 184, an RPT_E register 186 and an RPT_C register 188 are repeat control registers and correspond to the control registers CR8, CR9 and CR7 of FIG. 1, respectively. The RPT_E register 186 holds the address of the last instruction in the block to be repeated. The last address is calculated by the first operation unit 116 during execution of the repeat instruction and given to the RPT_E register 186 over the JA bus 323. A comparator 187 compares the value of an end address in the block to be repeated which is held in the RPT_E register 186 with the value of a fetch address which is held in the IA register 181. If the value of a repeat count which is held in the RPT_C register 188 is not "1" during execution of the repeat instruction and the two addresses coincide with each other, the value of a start address in the block to be repeated which is held in the RPT_S register 184 is transferred to the IA register 181 through a latch 185 over the JA bus 323. Every time the last instruction of the block to be repeated is executed, the value held in the RPT_C register 188 is decremented by 1 in a decrementor 190 through a latch 189. If the decremented value is "0", the RP bit 43 of the PSW is cleared and the execution of the repeat instruction is terminated. The RPT_S register 184, the RPT_E register 186 and the RPT_C register 188 each have an input port connected to the D1 bus 311 and an output port connected to the S3 bus 303. By using these buses, initialization caused by execution of the repeat instruction, and saving and returning operations are performed as required.

An execution-stage PC (EPC) 194 holds the PC value of the instruction being executed, and a next-instruction PC (NPC) 191 holds the PC value of the next instruction. If a jump occurs during execution, the NPC 191 receives the jump target address value on the JA bus 323. If a branch occurs during repeat operation, the NPC 191 receives the first address in the block to be repeated from the latch 185, and otherwise the value of the NPC 191 is transferred through a latch 192 to an incrementor 193 which increments it and then written back into the NPC 191. When a subroutine jump instruction is executed, the value held in the latch 192 is given to the D1 bus 311 as a return address and then written back into the register R13 designated as a link register in the register file 115. When the next instruction comes into execution, the value held in the latch 192 is transferred to the EPC 194. To make a reference to the PC value of the instruction being executed, the value held in the EPC 194 is transferred to the first operation unit 116 over the S3 bus 303. A BPC 196 corresponds to the control register CR3 in the register set of FIG. 1. When an exception or interruption is found, the value held in the EPC 194 is transferred to the BPC 196 through a latch 195. The BPC 196 has an input port connected to the D1 bus 311 and an output port connected to the S3 bus 303, and performs saving and returning as required.

Figure 11:
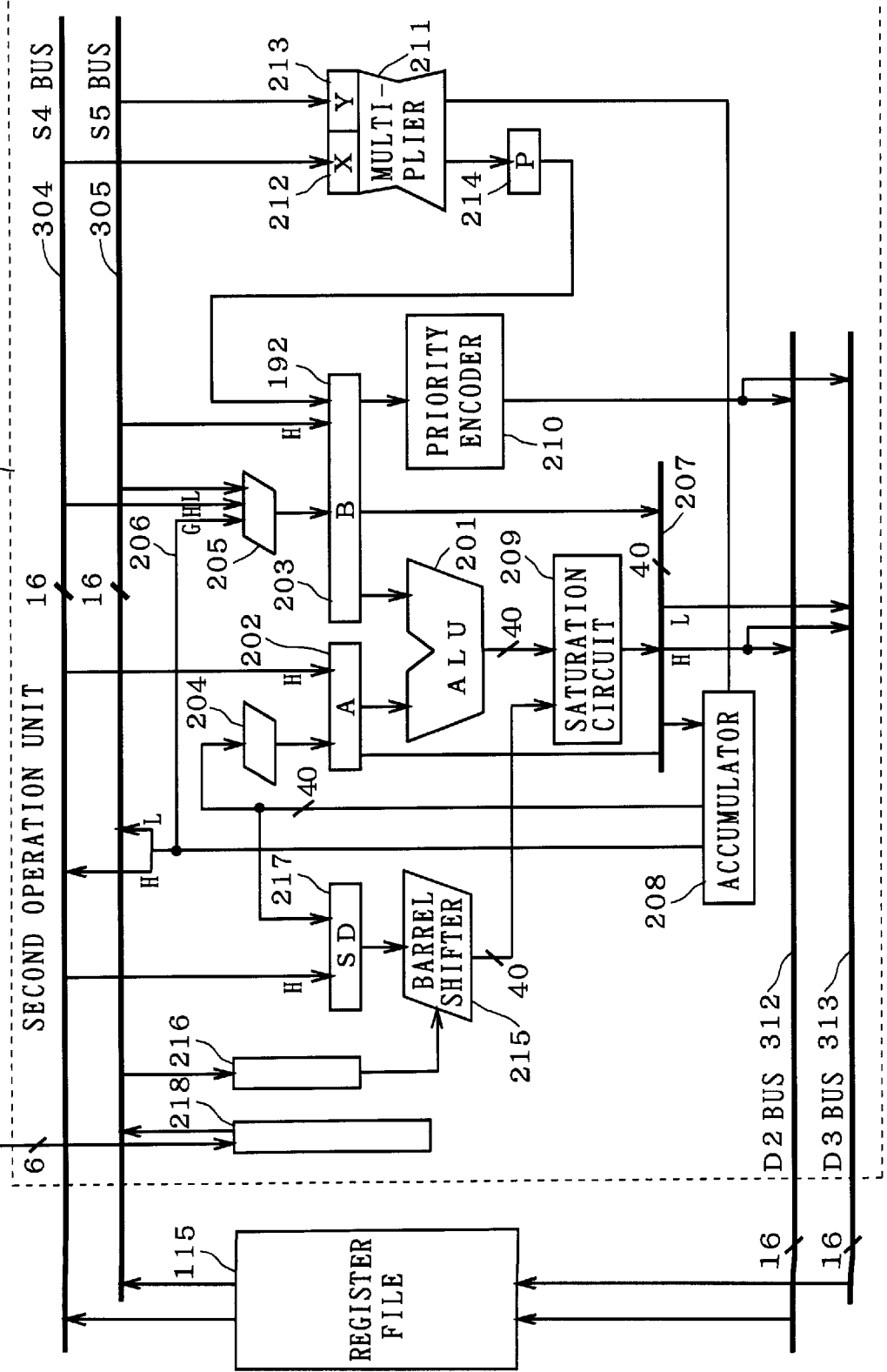
FIG. 11 is a block diagram showing a detailed structure of a second operation unit of the data processor in accordance with the first preferred embodiment of the present invention.

FIG. 11 is a block diagram showing a detailed structure of the second operation unit 117. The second operation unit 117 is connected to the register file 115 with an S4 bus 304 and an S5 bus 305, and reads data from the register file 115 over the two buses 304 and 305. The S4 bus 304 and the S5 bus 305 can transfer 2-word data from a pair of registers in parallel. The second operation unit 117 is connected to the register file 115 also with a D2 bus 312 and a D3 bus 313, and writes data into the registers in the register file 115 over the two buses 312 and 313. The D2 bus 312 is connected only to the even-numbered registers, and the D3 bus 313 is connected only to the odd-numbered registers. The D2 bus 312 and the D3 bus 313 can transfer 2-word data from a pair of registers in parallel.

An accumulator 208 performs a combined function of the two 40-bit accumulators A0 and A1 of FIG. 1.

A 40-bit ALU 201 includes an 8-bit adder (ranging from the bit 0 to the bit 7) for addition of the guard bit of the accumulator, a 16-bit arithmetic and logic unit (ranging from the bit 8 to the bit 23) and a 16-bit adder (ranging from the bit 24 to the bit 39) for addition of the low-order 16 bits of the accumulator. The ALU 201 performs addition and subtraction of up to 40 bits and a logic operation of 16 bits.

An A latch 202 and a B latch 203 are 40-bit input latches for the ALU 201. The A latch 202 receives the register value from the S4 bus 304 into the location ranging from the bit 8 to the bit 23, or receives a value from the accumulator 208 not changed or arithmetically shifted right by 16 bits through a shifter 204. A shifter 205 receives the value from the accumulator 208 over an interconnection line 206 (the guard bit of 8 bits), the S4 bus 304 (the high-order 16 bits) and the S5 bus 305 (the low-order 16 bits), or receives the register value of 16 bits or 32 bits right aligned over only the S5 bus 305 or both the S4 bus 304 and the S5 bus 305 and sign-extends it into 40 bits. The shifter 205 arithmetically shifts the received value by any shift count in a range of 3 bits left to 2 bits right and outputs the shifted data. The B latch 203 receives the data on the S5 bus 305 at the location ranging from the bit 8 to the bit 23, or an output from a multiplier or the shifter 205. The A latch 202 and the B latch 203 each have a function to clear the data therein to zero or to set the data at a constant value.

An output from the ALU 201 is given to a saturation circuit 209. The saturation circuit 209 has a function to perform clipping of a value into maximum or minimum value in 16-bit or 32-bit representation with reference to the guard bit in order to limit the high-positioned value to 16 bits or combine the high-positioned value and the low-positioned value into 32 bits, and naturally can output the value without clipping. An output from the saturation circuit 209 is connected to an interconnection line 207.

When a destination operand designates the accumulator 208, the value on the interconnection line 207 is written into the accumulator 208. When the destination operand designates a register, the value on the interconnection line 207 is written into the register file 115 over the D2 bus 312 and D3 bus 313. To achieve 1-word transfer, the value on the interconnection line 207 is outputted to the D2 bus 312 when the destination register is even-numbered and outputted to the D3 bus 313 when odd-numbered. To achieve 2-word transfer, the high-order 16-bit data are outputted to the D2 bus 312 and the low-order 16-bit data are outputted to the D3 bus 313. To execute a transfer instruction, calculation of absolute values and a maximum- or minimum-value setting instruction, outputs of the A latch 202 and the B latch 203 are connected to the interconnection line 207, allowing the values from the A latch 202 and the B latch 203 to be transferred to the accumulator 208 and the register file 115.

A priority encoder 210 receives the value from the B latch 203. The priority encoder 210 generates the shift count value required to normalize the input data as fixed point format, and writes back the shift count value into the register file 115 over the D2 bus 312 or the D3 bus 313.

An X latch 212 and a Y latch 213 are input registers in a multiplier, and receive 16-bit values on the S4 bus 304 and the S5 bus 305, respectively, and perform zero-extension or sign-extension of the 16-bit values into 17 bits. A 17-by 17-bit multiplier 211 multiplies a value stored in the X latch 212 by a value stored in the Y latch 213. When a multiply-add instruction or a multiply-subtract instruction is executed, the multiplication result is given to a P latch 214 and then transferred to the B latch 203. When the destination operand in the multiplication instruction designates the accumulator 208, the multiplication result is written into the accumulator 208.

A barrel shifter 215 can perform an arithmetic/logic shift on 40-bit or 16-bit data by up to 16 bits left and right. The value held in the accumulator 208 or the register value transferred over the S4 bus 304 is given to a shift data (SD) latch 217 as data to be shifted. The immediate value or the register value transferred over the S5 bus 305 is given to a shift count (SC) latch 216 as a shift count. The barrel shifter 215 performs shifting of the data held in the SD latch 217 by the shift count held in the SC latch 216 according to the operation code. The shifted result is outputted to the saturation circuit 209. The saturation circuit 209 performs saturation arithmetic of the shifted result, like the operation result from the ALU, as required, and gives the result to the interconnection line 207. The value on the interconnection line 207 is written back into the accumulator 208 or the register file 115 over the D2 bus 312 and the D3 bus 313.

An immediate-value latch 218 extends a 6-bit immediate value generated by the second decoder 114 into a 16-bit value and holds it. Then, the value held in the immediate-value latch 218 is transferred to the operation device over the S5 bus 305.

Figure 12:
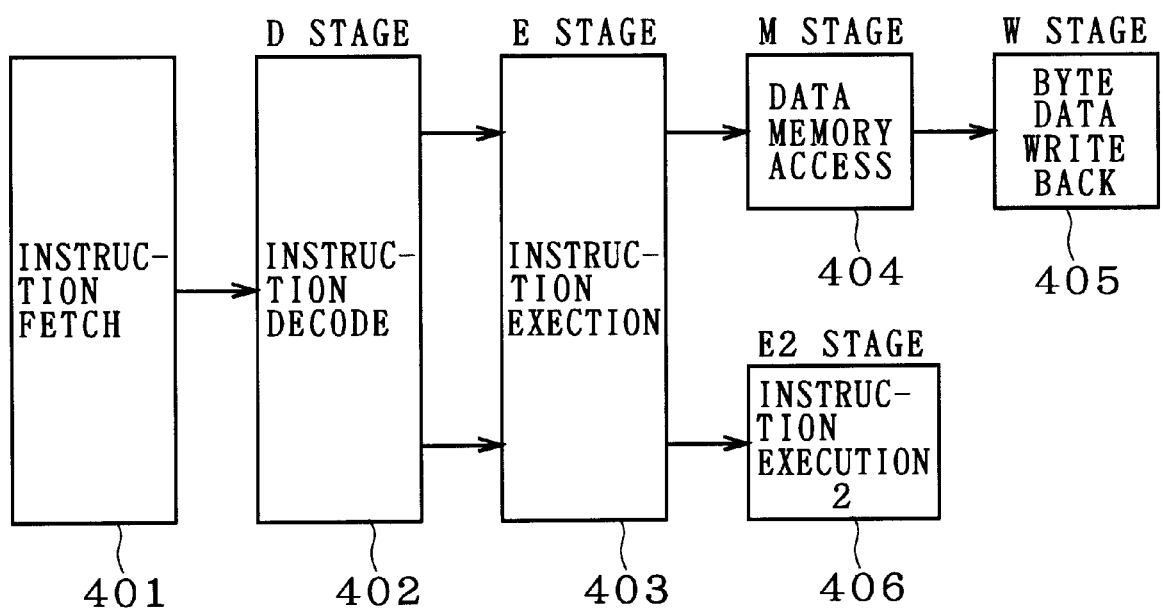
FIG. 12 illustrates a pipeline processing by the data processor in accordance with the first preferred embodiment of the present invention.

Next, a pipeline processing in the data processor of this preferred embodiment will be discussed. FIG. 12 illustrates the pipeline processing of the data processor in accordance with the first preferred embodiment. The data processor of the first preferred embodiment performs 5-stage pipeline processing: an instruction-fetch (IF) stage 401 for fetching instruction data; an instruction-decode (D) stage 402 for decoding instructions; an instruction-execution stage (E) 403 for executing operations; a memory-access (M) stage 404 for accessing a data memory; and a write-back (W) stage 405 for writing byte operands loaded from the memory into a register. Writing of the operation result obtained in the E stage 403 is completed in the E stage 403. Writing of 1-word (2-byte) or 2-word (4-byte) loaded data into the register is completed in the M stage 404. To perform multiply-add/multiply-subtract operations, further 2 stages of pipeline processing including multiplication and addition are needed to execute instructions. The latter-stage processing is referred to as an instruction-execution 2 (E2) stage 406. In execution of consecutive multiply-add/multiply-subtract operations, one operation can be performed in one clock-cycle.

In the IF stage 401, mainly, a fetch of instructions, management of the instruction queue 111 and repeat control are performed. The IF stage 401 controls the operations of the instruction fetch unit 102, the integrated instruction memory 103, the external bus interface unit 106, the instruction queue 111, the IA register 181, the latch 182, the incrementor 183 and the comparator 187 in the PC unit 118, and parts of the control unit 112 to achieve an IF stage control, an instruction fetch control and a control of the PC unit 118. The IF stage 401 is initialized by a jump at the E stage 403.

A fetch address is held in the IA register 181. If a jump occurs in the E stage 403, the IA register 181 receives the jump target address over the JA bus 323 and perform initialization. To sequentially fetch the instruction data, the incrementor 183 increments the address. During execution of a repeat instruction, if the comparator 187 detects coincidence between the value held in the IA register 181 and the value held in the RPT_E register 186 and the value held in the RPT_C register 188 is not "1", the sequence is controlled to change over. In this case, the value held in the RPT_S register 184 is transferred to the IA register 181 through the latch 185 over the JA bus 323.

The value held in the IA register 181 is transferred to the instruction fetch unit 102 which in turn fetches the instruction data. If the corresponding instruction data are found in the integrated instruction memory 103, the instruction code is read from the integrated instruction memory 103. In this case, fetch of 32-bit instruction is completed in one clock-cycle. If the corresponding instruction data are not found in the integrated instruction memory 103, an instruction-fetch request is given to the external bus interface unit 106. The external bus interface unit 106 arbitrates between the instruction-fetch request and a request from the operand access unit 104. When the instruction-fetch request is accepted, the external bus interface unit 106 fetches the instruction data from an external memory and transfers the fetched instruction data to the instruction fetch unit 102. The external bus interface unit 106 can access the external memory in a minimum of 2 clock-cycles. The instruction fetch unit 102 transfers the received instruction to the instruction queue 111. The instruction queue 111 holds two entries and outputs the instruction code received under FIFO control to the instruction decoding unit 119.

In the D stage 402, the instruction decoding unit 119 decodes an operation code and generates a group of control signals for controlling the first operation unit 116, the second operation unit 117 and the PC unit 118 to execute instructions. The D stage 402 is initialized by a jump at the E stage 403. If the instruction code transferred from the instruction queue 111 is invalid, the D stage 402 is idle and waits for completion of the preceding operation in the E stage 403. Such a condition occurs, for example, when the instruction being executed in the E stage 403 performs a memory access and the preceding memory access in the M stage 404 is not completed.

Figure 13:
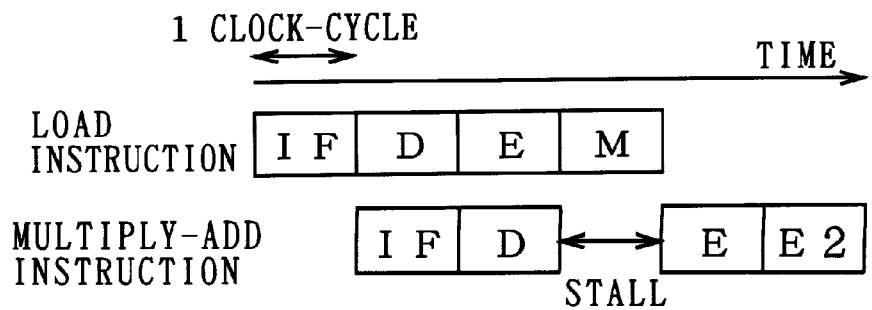
FIG. 13 illustrates a pipeline processing with load operand conflict occurring in the data processor in accordance with the first preferred embodiment of the present invention.
Figure 14:
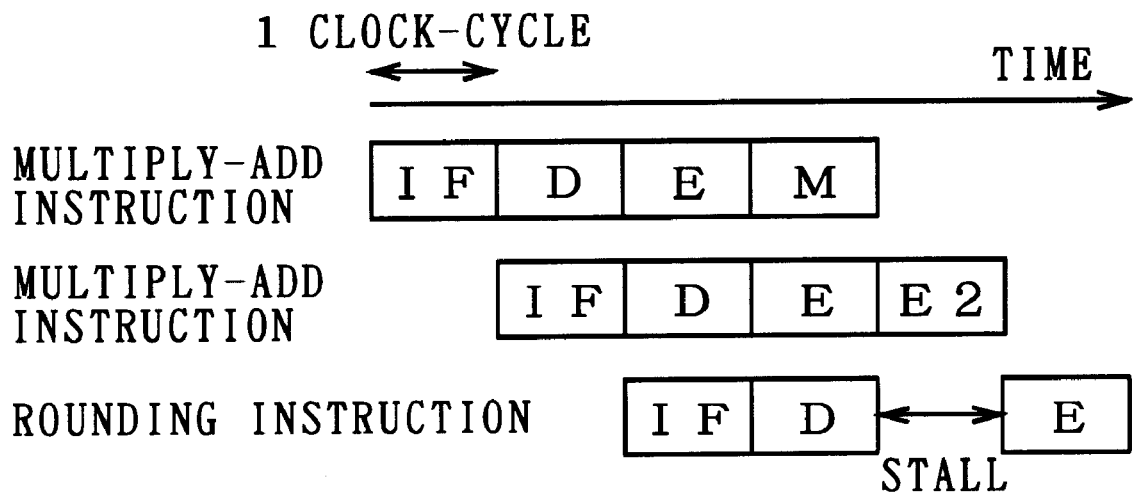
FIG. 14 illustrates a pipeline processing with hardware conflict occurring in the data processor in accordance with the first preferred embodiment of the present invention.

The D stage 402 also performs division of two instructions to be sequentially executed and sequence control of instructions to be executed in two cycles. Further, the D stage 402 performs checking of a conflict of load operands using a scoreboard register (not shown) and a conflict of operations by operation devices in the second operation unit 117. When any of these conflicts is detected, the control signal is not permitted to output until the conflict is resolved. FIG. 13 illustrates an example of load operand conflict. If a 1-word or 2-word load instruction is executed and immediately after the load instruction exists a multiply-add operation instruction which refers to the operand loaded by the load instruction, execution of the multiply-add instruction is not permitted to start until the loading of the operand into the register is completed. In this case, 1-clock-cycle stall occurs even if the memory access is completed in one clock-cycle. In a case of loading of byte data, further 1-clock-cycle stall occurs since writing of the byte data into the register file is completed in the W stage. FIG. 14 illustrates an example of operation hardware conflict. If a rounding instruction uses an adder is found immediately after execution of multiply-add instruction, execution of the rounding instruction is not permitted to start until the execution of the preceding multiply-add instruction is completed. In this case, a 1-clock-cycle stall occurs. In a case of consecutive multiply instructions, no stall occurs.

The first decoder 113 mainly generates execution control signals for controlling the first operation unit 116, the PC unit 118 except its elements controlled by the IF stage 401, reading of data from the register file 115 to the S1 bus 301, the S2 bus 302 and the S3 bus 303 and writing of data into the register file 115 from the D1 bus 311. The first decoder 113 also generates instruction-dependent control signals to be used in the M stage 404 and W stage 405, and the control signals are transferred according to the flow of the pipeline processing. The second decoder 114 mainly generates execution control signals for controlling the execution in the second operation unit 117, and reading data out from the register file 115 into the S4 bus 304 and the S5 bus 305 and writing data into the register file 115 from the D2 bus 312 and the D3 bus 313.

The E stage 403 achieves almost all executions of the instructions, except memory access and addition of the multiply-add/multiply-subtract instructions, such as an arithmetic operation, comparison, data transfer between registers including control registers, calculation of operand address of load/store instructions, calculation of the jump target address of the jump instruction, jump operation, EIT (Exception, Interrupt, Trap) detection and jump to a vector table of the EIT.

With interrupts enabled, an interrupt is always detected at the end of a 32-bit instruction. When two short instructions are sequentially executed in a 32-bit instruction, no interrupt is serviced between the two short instructions.

When the instruction being executed in the E stage 403 performs an operand access and the memory access is not completed in the M stage 404, the execution in the E stage 403 must stall, not to be completed. The control unit 112 performs this stage control.

In the E stage 403, the first operation unit 116 performs arithmetic and logic operation, comparison and data transfer. The ALU 153 calculates an address of a memory operand which also controls modulo addressing and a branch target address. The register value designated as an operand is given to the S1 bus 301, S2 bus 302 and S3 bus 303. The ALU 153 performs arithmetic operation of the register value and a separately-received extended data such as an immediate value and a displacement. The operation result is written back to the register file 115 over the D1 bus 311. When the load/store instruction is executed, the operation result is transferred to the operand access unit 104 through the AO latch 154 over the OA bus 321. When the jump instruction is executed, the jump target address is transferred to the PC unit 118 over the JA bus 323. The data stored in the register file 115 is transferred over the S1 bus 301 and the S2 bus 302 to the SD register 160 and the latch 161 to be held therein. Further, the data are aligned in the alignment circuit 166. The PC unit 118 manages the PC value of the instruction being executed and generates an address of the next instruction. Data transfer among the first operation unit 116, the control registers (except the accumulator) in the PC unit 118 and the register file 115 occurs over the S3 bus 303 and the D1 bus 311.

In the E stage 403, the second operation unit 117 performs all the operations, except addition of the multiply-add operation, such as arithmetic and logic operation, comparison, transfer and shift. Operand values are transferred from the register file 115, the immediate-value register 218 and the accumulator 208 to respective operation devices over the S4 bus 304, the S5 bus 305 and other exclusive paths. The respective operation devices perform specified operations, and the operation results are written back to the accumulator 208, and the register file 115 over the D2 bus 312 and the D3 bus 313.

The E stage 403 also controls updating of a flag value in the PSW 172 by the operation results in the first and second operation units 116 and 117. Since the operation result is reliably obtained late in the E stage 403, however, actual updating of the value in the PSW 172 is performed in the next cycle. Another updating of the value in the PSW 172 by data transfer is completed in the same cycle.

The execution control signal for controlling the addition and subtraction of the multiply-add/multiply-subtract operation generated by the second decoder 114 is held under control of the E stage 403. Informations on the memory access and load register are transferred to the M stage 404. The control unit 112 also performs the control of the E stage 403.

In the M stage 404, operand memory access is performed by the address transferred from the first operation unit 116. When the operand is found in the integrated data memory 105 or an on-chip IO (not shown), the operand access unit 104 reads/writes data from/to the integrated data memory 105 or the on-chip IO in one clock-cycle. When the operand is not found in the integrated data memory 105 or the on-chip IO, the operand access unit 104 gives a data access request to the external bus interface unit 106. The external bus interface unit 106 performs data access to the external memory. When data are loaded, the external bus interface unit 106 transfers the read data to the operand access unit 104. The external bus interface unit 106 can perform access to the external memory in a minimum of two clock-cycles. The operand access unit 104 transfers the read data over the OD bus 322. When byte data are loaded, the data are written into the LD register 164 and when 1-word or 2-word data are loaded, the data are directly written into the register file 115. When data are stored, the data to be stored which are aligned in the alignment circuit 162 are transferred to the operand access unit 104 over the OD bus 322, and then written into the specified memory. The control unit 112 also performs the control of the M stage 404.

In the W stage 405, the load operand (byte data) held in the LD register 164 is given to the latch 165 to be held therein. Further, the load operand in the latch 165 is aligned and zero- or sign-extended in the alignment circuit 166 and written into the register file 115 over the W bus 314.

In the E2 stage 406, the ALU 201 performs the addition and subtraction of the multiply-add/multiply-subtract operation and the operation result is written back to the accumulator 208.

The data processor of this preferred embodiment generates a clock signal with 2 phases of the same frequency as an input clock, which is used for internal control. An operation of each pipeline stage is completed in a minimum of one internal-clock-cycle. Detailed discussion on clock control will be omitted since it is not directly pertinent to this invention.

Now, execution of sub-instructions will be discussed. Execution of instructions for arithmetic operations such as addition and subtraction, logic operation and comparison, and instructions for transfer between registers is completed in three stages consisting of the IF stage 401, the D stage 402 and the E stage 403. Operations and data transfers are performed in the E stage 403.

The multiply-add/multiply-subtract instruction performs 2-clock-cycle operations, i.e., multiplication in the E stage 403 and addition and subtraction in the E2 stage 406, and therefore execution of the instruction is completed in four stages.

Execution of the byte-data load instruction is completed in five stages: the IF stage 401, the D stage 402, the E stage 403, the M stage 404 and the W stage 405. Execution of the 1-word/2-word load/store instruction is completed in four stages: the IF stage 401, the D stage 402, the E stage 403 and the M stage 404.

To access non-aligned data, two separate memory accesses are performed in the operand access unit 104 under control of the M stage 404.

An instruction which performs 2-cycle operation is executed by the first and second instruction decoders 113 and 114 in two cycles, and the execution control signal is outputted for each cycle. Thus, the operation is performed in two cycles.

A long instruction refers to a 32-bit instruction having a long format. Using a long instruction, execution of a 32-bit instruction is achieved. Two instructions to be executed in parallel are two short instructions, and the two executions are controlled in accordance with the speed of one that requires more cycles. For example, parallel executions of an instruction which performs 2-cycle operation and another instruction which performs 1-cycle operation are completed in two cycles. Sequential executions of two short instructions are made by combining respective sub-instructions. In a decoding stage, the instructions are sequentially decoded and then executed. For example, when two addition instructions are executed, each of which is completed in one cycle of the E stage 403, the D stage 402 and the E stage 403 each need one cycle for each instruction and in total two cycles. Decoding of the following instruction is performed in the D stage 402 parallelly with execution of the preceding instruction in the E stage 403.

Features of The First Preferred Embodiment

Figure 15:
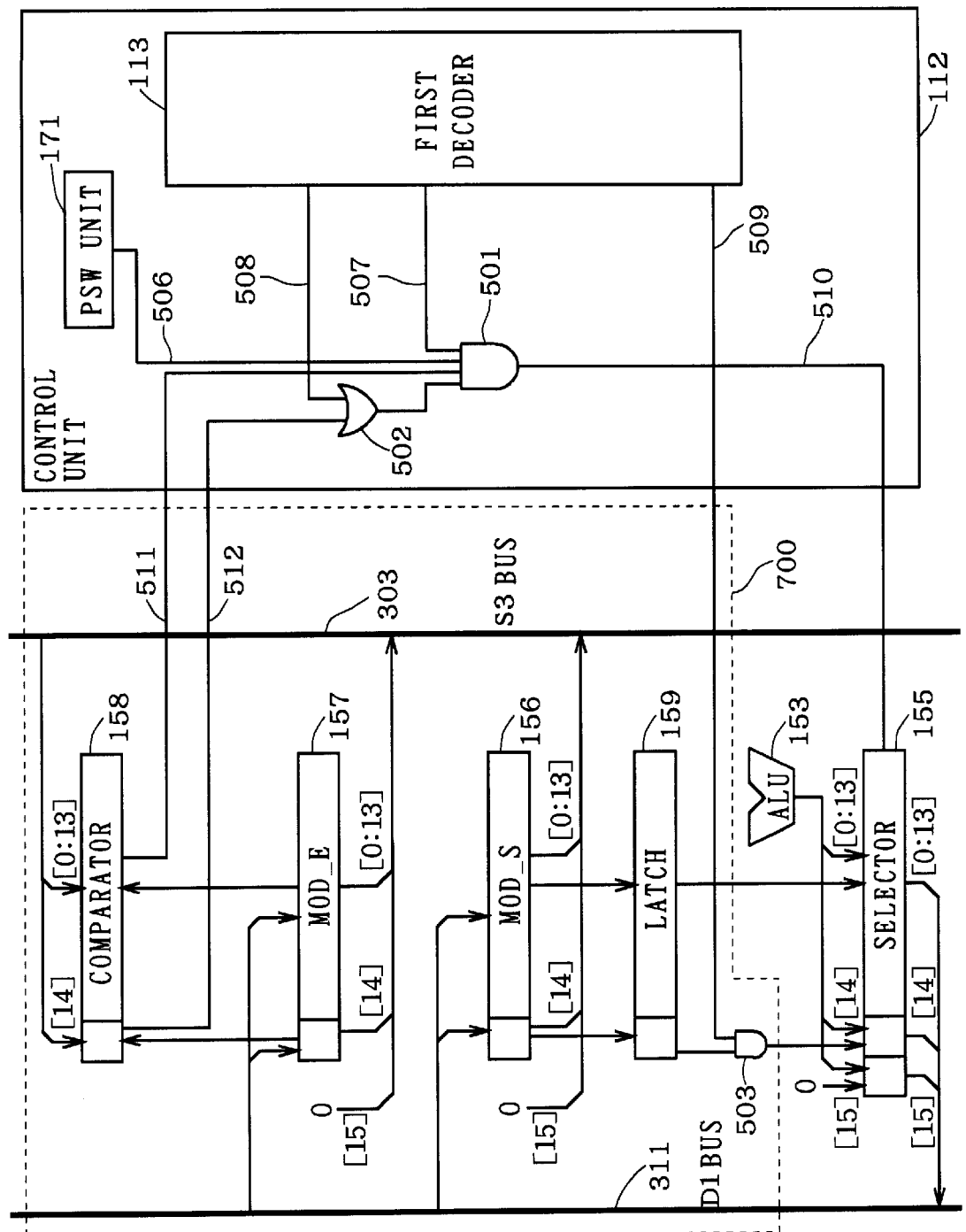
FIG. 15 is a schematic circuit diagram showing implementation of modulo addressing in the data processor in accordance with the first preferred embodiment of the present invention.

FIG. 15 is a schematic circuit diagram showing a structure for implementation of modulo addressing in the data processor in accordance with the first preferred embodiment. This structure is a feature of the first preferred embodiment. Elements of the control unit 112 shown in FIG. 15 are those pertinent to the modulo arithmetic. For simple illustration, enable signals and the like for the latches are omitted.

Further, logics are shown in positive representation as much as possible. The comparator 158 compares the base address value transferred over the S3 bus 303 with the modulo end address held in the MOD_E register 157, and transfers the comparison results with respect to two independent fields to the control unit 112. Specifically, a coincidence signal 511 indicates "1" when the two addresses coincide in the high-order 14 bits ranging from the bit 0 to the bit 13 and indicates "0" when they do not. Another coincidence signal 512 indicates "1" when the two addresses coincide in the bit 14 and indicates "0" when they do not.

The MOD_E register 157 is a 15-bit latch and has an input port connected to the D1 bus 311 and output ports connected to the S3 bus 303 and the comparator 158. The value held in the MOD_E register 157 is outputted to the S3 bus 303 with the bit 15 being "0". The MOD_S register 156 which holds the modulo start address is a 15-bit latch and has an input port connected to the D1 bus 311 and output ports connected to the S3 bus 303 and the 16-bit latch 159. The value held in the MOD_S register 156 is outputted to the S3 bus 303 with the bit 15 being "0". The selector 155 selectively outputs an output from the ALU 153 and the modulo start address value held in the latch 159 according to a selection signal 510. When the selector 155 selects the value of the latch 159, the value is outputted with the bit 15 being "0". The first decoder 113 generates a postdecrement 2-word access signal 509 of low active which indicates "0" when 2-word access with postdecrement is made and otherwise "1". An AND gate 503 obtains a logical product of the signal 509 and the bit 14 of the latch 159 and outputs the logical product to the bit 14 of the selector 155. In other words, "0" is forcefully set to the bit 14 of the selector 155 when 2-word access with postdecrement is made, and otherwise the bit 14 of the latch 159 is set thereto.

In the control unit 112, the selection signal 510 for the selector 155 is generated, based on the decoded result of the instruction and the comparison result from the comparator 158. The PSW unit 171 outputs the value of the MD bit 44 which indicates whether the modulo addressing is enabled or disabled over a signal line 506. The first decoder 113 outputs a post-update signal 507 which indicates "1" when memory access with postincrement/postdecrement is made and a 2-word access signal 508 which indicates "1" when 2-word access is made as a result of decoding of the instruction.

An AND gate 501 and an OR gate 502 generate the selection signal 510 based on these informations. Specifically, the OR gate 502 performs an OR operation of the coincidence signal 512 and the 2-word access signal 508 and outputs the operation result to the AND gate 501. The AND gate 501 performs an AND operation of the output from the OR gate 502, the coincidence signal 511, the value of the MD bit 44 (on the signal line 506) and the post-update signal 507 and outputs the operation result as the selection signal 510.

When 1-word access is made (the 2-word access signal 508 is "0"), the modulo addressing is enabled (the signal line 506 is "1"), a load/store instruction with postincrement/postdecrement is executed (the post-update signal 507 is "1"), the operand address transferred over the S3 bus 303 coincides with the high-order 14 bits of the MOD_E register 157 (the coincidence signal 511 is "1") and the operand address coincides with the bit 14 of the MOD_E register 157 (the coincidence signal 512 is "1"), the selection signal 510 indicates "1" and otherwise "0".

On the other hand, when 2-word access is made (the 2-word access signal 508 is "1"), the modulo addressing is enabled, a load/store instruction with postincrement/postdecrement is executed and the operand address transferred over the S3 bus 303 coincides with the high-order 14 bits of the MOD_E register 157, the selection signal 510 indicates "1" and otherwise "0".

When the selection signal 510 indicates "0" during execution of the load/store instruction with post-updating of the address register, the addition/subtraction result from the ALU 153 is transferred over the D1 bus 311 and written back to the register file 115 as update value of the pointer. When the selection signal 510 indicates "1", the modulo start address held in the latch 159 is transferred over the D1 bus 311 and written back into the register file 115 as the update value of the pointer. In this case, when 2-word access with postdecrement is made (the signal 509 is "0"), "0" is forcefully set to the bit 14 of the selector 155 by the AND gate 503 and otherwise the value of the bit 14 of the latch 159 is set thereto. To the bit 15 of the selector 155, "0" is also forcefully set.

When the modulo addressing is disabled, the selection signal 510 necessarily indicates "0" and the selector 155 selects the output from the ALU 153.

Next, some patterns of address-updating in execution of the load/store instructions using the circular buffer will be discussed. The value of the MD bit 44 is herein assumed to be "1". First, the modulo addressing with postincrement will be discussed.

The data processor of the first preferred embodiment does not ensure the reliability of access to the circular buffer with its data region misaligned into 4-byte boundary. The data region of the circular buffer must be aligned into 4-byte boundary when the 2-word access is made.

Figure 16:
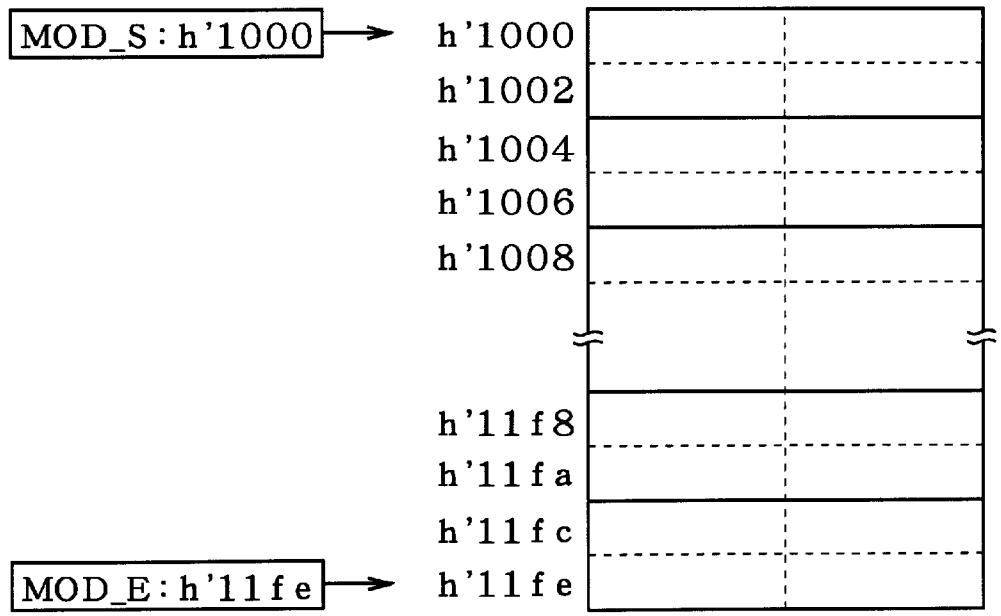
FIG. 16 illustrates a structure of a circular buffer with both the two boundaries aligned in 4 bytes.

FIG. 16 illustrates a structure of a circular buffer with both the two boundaries aligned in 4 bytes. Hexadecimal representation follows "h'". The circular buffer region covers 256 words (512 bytes) ranging from h'1000 to h'11ff. The high-order 15 bits at the beginning word address h'1000 are set to the MOD_S register 156 and the high-order 15 bits at the ending word address h'11fe are set to the MOD_E register 157.

When 1-word access is made with postincrement, the post-update signal 507 outputted from the first decoder 113 is "1", the 2-word access signal 508 is "0" and the postdecrement 2-word access signal 509 (low active) is "1". When the base address register value indicates h'11fe, the coincidence signals 511 and 512 are each "1" and the selection signal 510 outputted from the AND gate 501 is "1", and consequently the selector 155 selects the modulo start address value (the output of the latch 159+"0" (the bit 15)) and writes h'1000 back into the base address register 115 over the D1 bus 311.

Otherwise in the 1-word access with postincrement, the selector 155 selects the output from the ALU 153, i.e., the value held in the base address register +"2", and writes back the output value into the base address register since either the coincidence signal 511 or 512 is "0". For example, when the base address register holds h'11fc, h'11fe is written back into the base address register.

When 2-word access is made with postincrement, the post-update signal 507 outputted from the first decoder 113 is "1", the 2-word access signal 508 is "1" and the postdecrement 2-word access signal 509 (low active) is "1". When the base address register value indicates h'11fc, the coincidence signal 511 is "1" and accordingly the selection signal 510 is "1" even if the coincidence signal 512 is "0", and consequently the selector 155 selects the modulo start address value and writes h'1000 back into the base address register.

Otherwise in the 2-word access with postincrement, the value held in the base address register+"4" is written back into the base address register since the coincidence signal 511 is "0".

The first preferred embodiment ensures proper operations in both cases of 1-word access and 2-word access with postincrement by setting values to the MOD_S register 156 and the MOD_E register 157 which are used in common for the 1-word access with postincrement and the 2-word access with postincrement.

Figure 17:
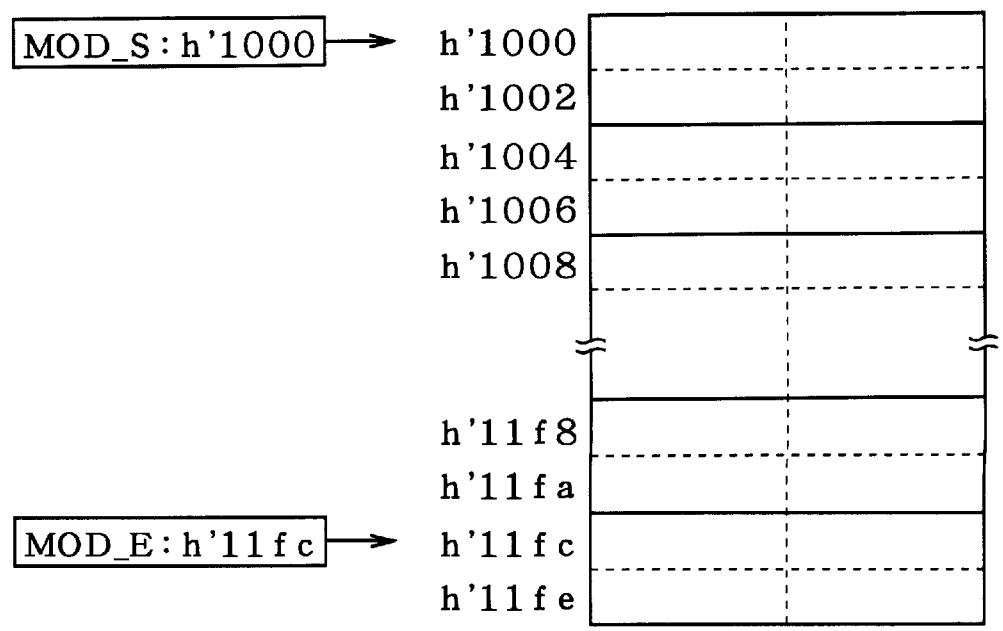
FIG. 17 illustrates a structure of a circular buffer with the beginning position aligned in 4-byte boundary and the ending position misaligned in 4-byte boundary.

FIG. 17 illustrates a structure of a circular buffer with the beginning position aligned in 4-byte boundary and the ending position misaligned in 4-byte boundary. As shown in FIG. 17, the circular buffer region covers 255 words ranging h'1000 to h'11fd, and the high-order 15 bits at the beginning word address h'1000 are set to the MOD_S register 156 and the high-order 15 bits at the ending word address h'11fc are set to the MOD_E register 157.

When 1-word access is made to the circular buffer having the structure of FIG. 17 with the base address register value h'11fc, h'1000 is written back into the base address register. Otherwise in the 1-word access, the value held in the base address register+"2" is written into the base address register. Since the ending position is misaligned in 4-byte boundary, it is useless to make 2-word access with the base address register value h'11fc. It works effectively when a circular buffer of odd-word data region is accessed in consideration of the boundary for the purpose of making use of auto update function of the pointer in a case of array calculation and the like.

Figure 18:
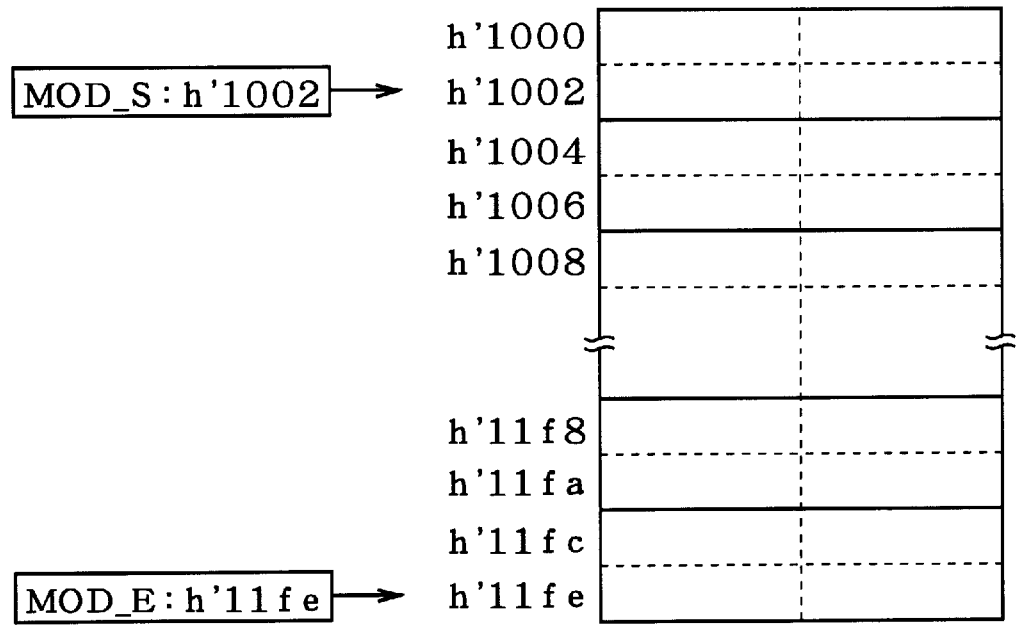
FIG. 18 illustrates a structure of a circular buffer with the beginning position misaligned in 4-byte boundary and the ending position aligned in 4-byte boundary.

FIG. 18 illustrates a structure of a circular buffer with the beginning position misaligned in 4-byte boundary and the ending position aligned in 4-byte boundary. As shown in FIG. 18, the circular buffer region covers 255 words ranging h'10002 to h'11ff, and the high-order 15 bits at the beginning word address h'1002 are set to the MOD_S register 156 and the high-order 15 bits at the ending word address h'11fe are set to the MOD_E register 157.

When 1-word access is made with the base address register value h'11fe, h'1002 is written back into the base address register. Otherwise in the 1-word access, the value held in the base address register+"2" is written back into the base address register. When 2-word access is made with the base address register value h'11fc, h'1002 is written back into the base address register. Otherwise in the 2-word access, the value held in the base address register+"4" is written back into the base address register. This case also works effectively when a circular buffer of odd-word data region is accessed in consideration of the boundary for the purpose of making use of auto update function of the pointer.

Figure 19:
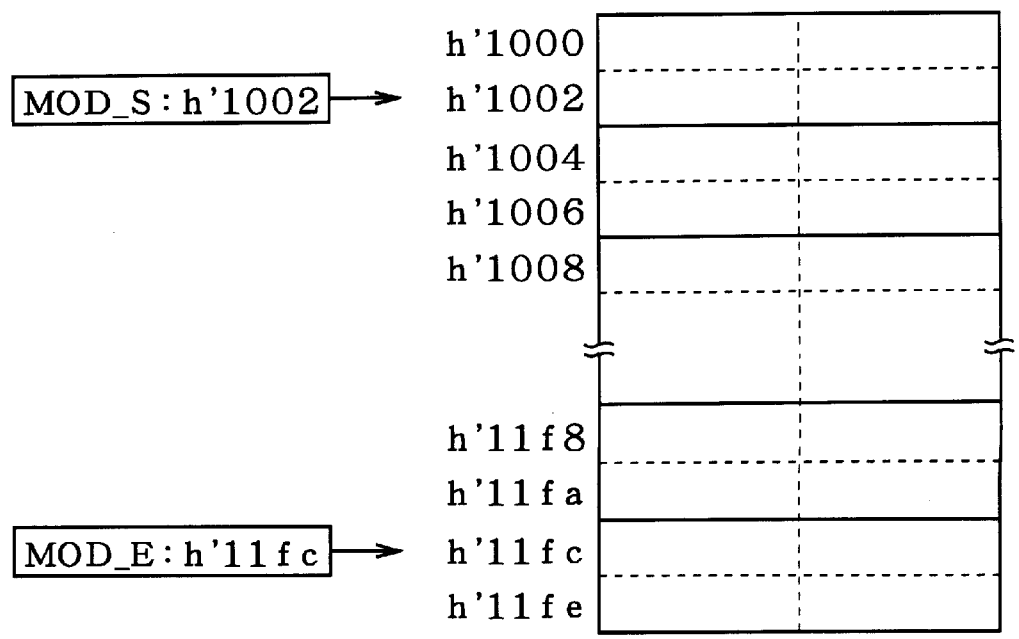
FIG. 19 illustrates a structure of a circular buffer with neither the beginning position nor the ending position aligned in 4-byte boundary.

FIG. 19 illustrates a structure of a circular buffer with neither the beginning position nor the ending position aligned in 4-byte boundary. As shown in FIG. 19, the circular buffer region covers 254 words ranging h'1002 to h'11fd, and the high-order 15 bits at the beginning word address h'1002 are set to the MOD_S register 156 and the high-order 15 bits at the ending word address h'11fc are set to the MOD_E register 157.

When 1-word access is made with the base address register value h'11fc, h'1002 is written back into the base address register. Otherwise in the 1-word access, the value held in the base address register+"2" is written back into the base address register. Also when 2-word access is made, it is necessary to make 1-word access for the beginning word and the ending word. This case also works effectively when a circular buffer of odd-word data region is accessed in consideration of the boundary for the purpose of making use of auto update function of the pointer. Furthermore, the circular buffer has a data region of an integral multiple of 2 words and accordingly it is more efficient to use the circular buffer with its boundaries aligned.

Any structure of FIGS. 16 to 19 properly performs 1-word access, regardless of the beginning/ending boundary positions. Further, it effectively works for all types of access when used for the purpose of making use of auto update function for the address by modulo addressing in consideration of the boundaries. When the 1-word access and the 2-word access are mixedly performed, it is possible to make access without considering the boundaries if the beginning and ending positions of the circular buffer region are aligned into 4-byte boundary. When the circular buffer has an odd-word data region, it is possible to align the two boundaries into 4-byte boundary if 1-word more region is allocated. To hold double-precision data (32 bits) or a pair of two words like complex numbers, it is necessary to make 2-word access with the beginning and ending positions of the circular buffer aligned into 4-byte boundary.

Thus, the data processor of the first preferred embodiment allows efficient 2-word access as well as 1-word access to the circular buffer with postincrement, thereby reducing code size of the program and the number of operation cycles. That causes reduction in power dissipation when a specific application is performed.

Furthermore, setting is simple since it is only necessary to set the beginning and ending word addresses in any case of the 1-word access and the 2-word access.

Next, access with postdecrement will be discussed. In postdecrement, since the operand-access size and pointer-update size are not necessarily equal unlike in postincrement, it is necessary to correct the pointer value when the 1-word and 2-word accesses are mixed.

Figure 20:
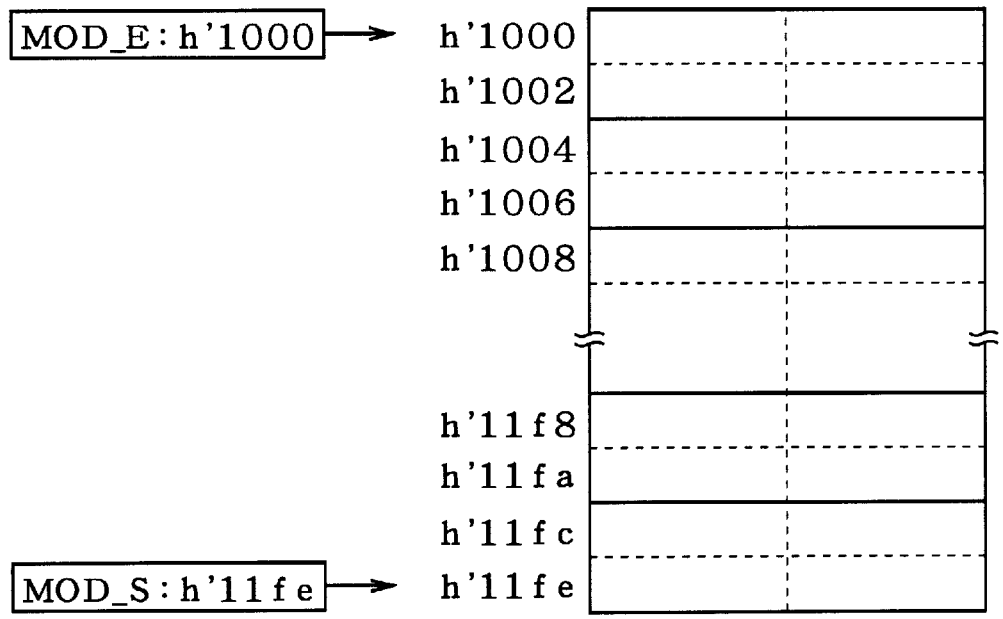
FIG. 20 illustrates a structure of a circular buffer with both the two boundaries aligned in 4 bytes.

FIG. 20 illustrates a structure of a circular buffer with both the two boundaries aligned in 4 bytes. As shown in FIG. 20, the circular buffer region covers 256 words (512 bytes) ranging from h'1000 to h'11ff. The high-order 15 bits at the ending word address h'11fe are set to the MOD_S register 156 and the high-order 15 bits at the beginning word address h'1000 are set to the MOD_E register 157.

When 1-word access is made with postdecrement, the post-update signal 507 outputted from the first decoder 113 is "1", the 2-word access signal 508 is "0" and the postdecrement 2-word access signal 509 (low active) is "1". When the base address register value indicates h'1000, the coincidence signals 511 and 512 are each "1" and the selection signal 510 is "1", and consequently the selector 155 selects the modulo start address value (the output of the latch 159+"0" (the bit 15)) and writes h'11fe back into the base address register in the register file 115 over the D1 bus 311.

Otherwise in the 1-word access with postdecrement, the selector 155 selects the output of the ALU 153, i.e., the value held in the base address register–"2", and writes back the output value into the base address register since either the coincidence signal 511 or 512 is "0". For example, the base address register holds h'1002, h'1000 is written back into the base address register.

When 2-word access is made with postdecrement, the post-update signal 507 outputted from the first decoder 113 is "1", the 2-word access signal 508 is "1" and the postdecrement 2-word access signal 509 (low active) is "0". When the base address register value indicates h'1000, the coincidence signals 511 and 512 are each "1" and the selection signal 510 is "1", and consequently the selector 155 selects the modulo start address value (the high-order 14 bits of the latch 159+"00" (the bits 14 and 15)) and writes h'11fc back into the base address register.

The reason why the bit 14 of the output from the selector 155 is "0" is the postdecrement 2-word access signal 509 of low active is "0" and accordingly the bit 14 of the output from the latch 159 is forcefully cleared to zero by the AND gate 503.

Otherwise in the 2-word access with postdecrement, the selector 155 selects the output of the ALU 153, i.e., the value held in the base address register–"4", and writes back the output value into the base address register since the coincidence signal 511 is "0".

The data processor of the first preferred embodiment ensures proper operations in both cases of 1-word access and 2-word access with postdecrement by setting values to the MOD_S register 156 and the MOD_E register 157 which are used in common for the 1-word access with postdecrement and the 2-word access with postdecrement.

Figure 21:
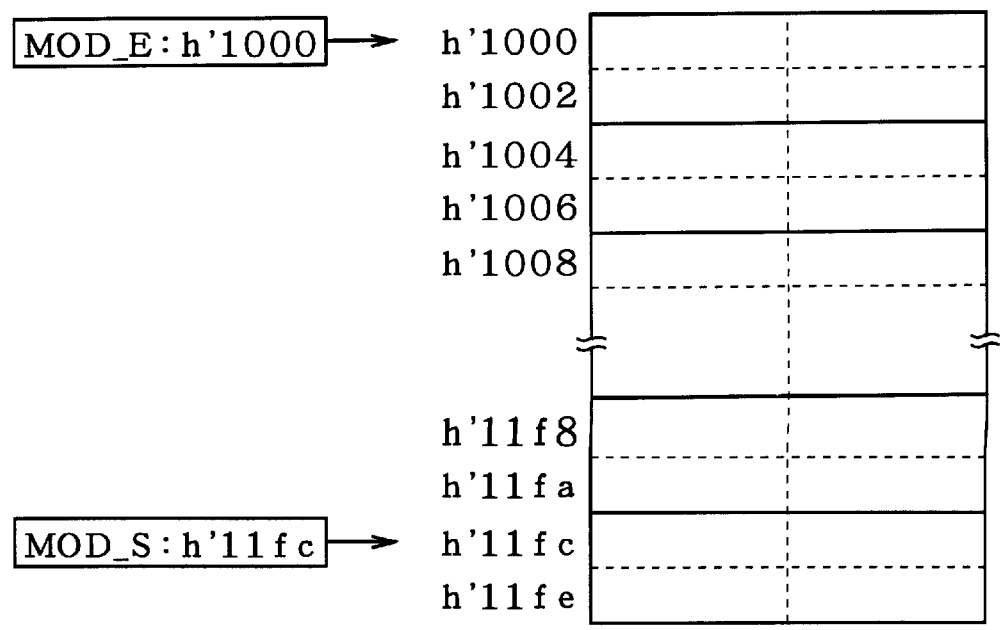
FIG. 21 illustrates a structure of a circular buffer with the beginning position aligned in 4-byte boundary and the ending position misaligned in 4-byte boundary.

FIG. 21 illustrates a structure of a circular buffer with the beginning position aligned in 4-byte boundary and the ending position misaligned in 4-byte boundary. As shown in FIG. 21, the circular buffer region covers 255 words ranging from h'1000 to h11fd. The high-order 15 bits at the ending word address h'11fc are set to the MOD_S register 156 and the high-order 15 bits at the beginning word address h'1000 are set to the MOD_E register 157.

When 1-word access with postdecrement is made with the base address register value h'1000, h'11fc is written back into the base address register. Otherwise in the 1-word access, the value held in the base address register–"2" is written back into the base address register.

When 2-word access with postdecrement is made with the base address register value h'1000, h'11fc is written back into the base address register. Otherwise in the 2-word access with postdecrement, the value held in the base address register–"4" is written back into the base address register. This case needs access in consideration of the boundary.

Figure 22:
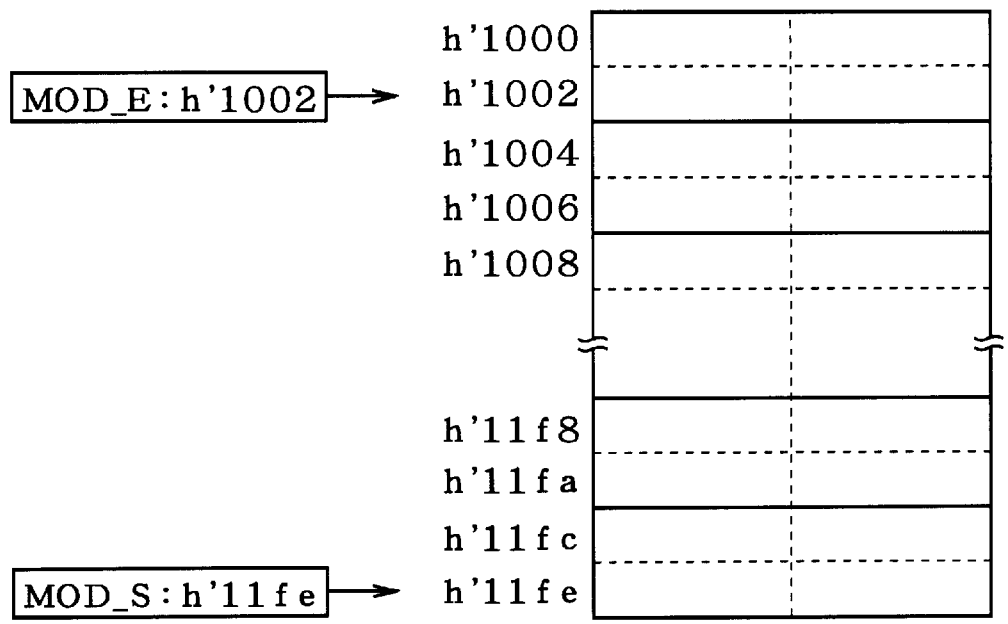
FIG. 22 illustrates a structure of a circular buffer with the beginning position misaligned in 4-byte boundary and the ending position aligned in 4-byte boundary.

FIG. 22 illustrates a structure of a circular buffer with the beginning position misaligned in 4-byte boundary and the ending position aligned in 4-byte boundary. As shown in FIG. 22, the circular buffer region covers 255 words ranging h'1002 to h'11ff, and the high-order 15 bits at the ending word address h'11fe are set to the MOD_S register 156 and the high-order 15 bits at the beginning word address h'1002 are set to the MOD_E register 157.

When 1-word access with postdecrement is made with the base address register value h'1002, h'11fe is written back into the base address register. Otherwise in the 1-word access, the value held in the base address register–"2" is written back into the base address register.

The first preferred embodiment does not ensure the operation for 2-word access with postdecrement with the base address register value h'1000 since the 2-word access in this case is useless. Otherwise in the 2-word access with postdecrement, the value held in the base address register– "4" is written back into the base address register. This case also needs access in consideration of the boundary.

Figure 23:
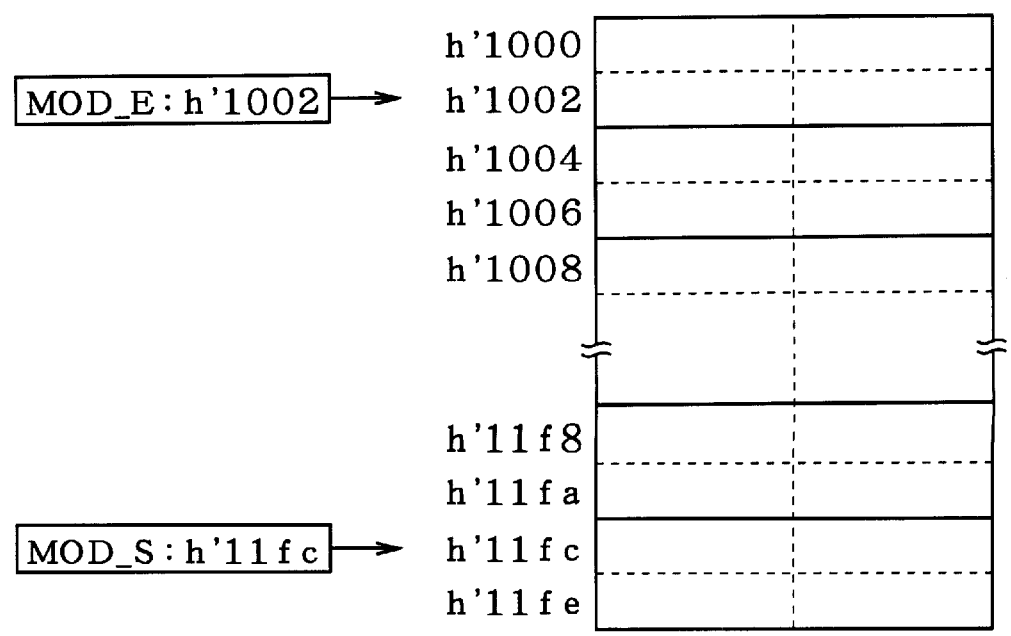
FIG. 23 illustrates a structure of a circular buffer with neither the beginning position nor the ending position aligned in 4-byte boundary.

FIG. 23 illustrates a structure of a circular buffer with neither the beginning position nor the ending position aligned in 4-byte boundary. As shown in FIG. 23, the circular buffer region covers 254 words ranging h'1002 to h'11fd, and the high-order 15 bits at the ending word address h'11fc are set to the MOD_S register 156 and the high-order 15 bits at the beginning word address h'1002 are set to the MOD_E register 157.

When 1-word access with postdecrement is made with the base address register value h'1002, h'11fc is written back into the base address register. Otherwise in the 1-word access, the value held in the base address register–"2" is written back into the base address register.

To perform 2-word access with postdecrement, it is necessary to make 1-word access for the beginning word and the ending word. In this case, it works effectively when a circular buffer of odd-word data region is accessed in consideration of the boundary for the purpose of making use of auto update function of the pointer. Furthermore, the circular buffer has a data region of an integral multiple of 2 words and accordingly it is more efficient to use the circular buffer with its boundaries aligned.

Any structure of FIGS. 20 to 23 properly performs 1-word access with postdecrement, regardless of the beginning/ ending boundary positions. Further, it effectively works for all types of access when used for the purpose of making use of auto update function for the address by modulo addressing in consideration of the boundaries. If the circular buffer is always accessed by 1 word, its beginning and ending positions do not have to be aligned into 4-byte boundary.

Thus, the data processor of the first preferred embodiment allows efficient 2-word access as well as 1-word access to the circular buffer with postdecrement, thereby reducing code size of the program and the number of operation cycles. Further, setting is simple since it is only necessary to set the beginning and ending word addresses in any case of the 1-word access and the 2-word access.

Furthermore, the data processor of the first preferred embodiment allows judgment operation based on the base address value in parallel with address calculation during postincrement or postdecrement. That facilitates speeding up of operation with higher operating frequency.

A variety of boundary patterns of the circular buffer have been discussed above. In particular, there are a lot of restrictions on odd-word boundary. For this reason, in a case of odd-word data region, it is more efficient to align the two boundaries into 2 words by allocating 1-word more useless data region, if possible. If access is made without considering the boundary, especially, the data region had better be aligned into 2-word boundary.

Now, a 256-tap FIR (Finite-duration Impulse-Response) filtering will be discussed, which performs a sequential sample-by-sample operation using the data processor of the first preferred embodiment. FIG. 24 illustrates a program example of FIR filtering. In FIG. 24, "||" represents a parallel execution of two short instructions. In the FIR filtering, the following calculation is performed:

$$\sum_{i=0}^{255}(A[i]\cdot D[i]) \quad (1)$$

where A[i] is a coefficient array and D[i] is a data array. The smaller i is, the later the data are. In this calculation, 256 multiply-add operations are performed. An example using 16-bit coefficient and 16-bit data will be discussed.

In a part 521 of the program of FIG. 24, alignment condition for data pointer (address at D[0]) is judged. If the data region is aligned into 4-byte boundary, the program part 521 is executed and otherwise a program part 523 is executed. In a program part 524, a postprocessing common to the program parts 521 and 523 is executed.

FIG. 25 illustrates coefficient allocation and data allocation in the integrated memory 105 in an initial state. The coefficient array covers 256 words (512 bytes) located from h'2000 to h'21ff and the data array covers 256 words (512 bytes) located from h'2400 to h'25ff.

Prior to execution of this program, the pointer of data (address of D[0]) and the beginning address of coefficient (address of A[0]) are set to registers r8 and r9, respectively. Further, the beginning word address h'2400 of the data array region used as a circular buffer and the ending word address h'25fe of the data array region are set to the MOD_S register 156 and the MOD_E register 157, respectively, and "1" is set to the MD bit 44 of the PSW 21. Thus, the modulo addressing is enabled.

In the program part 521, the bit 14 (the second bit from the LSB) of the data pointer stored in the register r8 is tested by the instruction "btst". When the bit 14 is "0", indicating that the data region is aligned in 4-byte boundary, "0" is set to the F0 flag 47. When the bit 14 is "1" indicating that the data region is misaligned in 4-byte boundary, "1" is set to the F0 flag 47. By the instruction "brf0t", the program part 523 starting with the label "odd" is executed when the F0 flag 47 is "1" (misaligned in 4 bytes), and the subsequent program part 522 starting with the label "even" is executed when the F0 flag 47 is "0" (aligned in 4 bytes).

By the instruction "mac a0, rn, rm", 16-bit signed-value held in a register rm is multiplied by 16-bit signed-value held in a register rn and the multiplication result is added to an accumulator a). By the instruction "repi #c, label" which performs a block repeat operation, execution of a series of instructions from the next instruction to the instruction with label is repeated c times. By the instruction "clrac a0", the accumulator a0 is cleared to zero.

In the program part 522, each operand is accessed by 2 words and then a desired multiply-add operation is performed. The operation result is stored in the accumulator a0. In the program part 523, since the address of D[0] is not located on 4-byte boundary, only the D[0] and D[255] are accessed by 1 word and the other data are accessed by 2 words. Thus, one multiply-add operation is performed in one clock-cycle in any case. The last instruction "bra end" in the program part 522 performs an unconditional branch to the instruction with the label "end". By the instruction "rachi r0, a0, #0" in the program 524, a value of fixed point format held in the accumulator a0 is rounded to 16 bits and saturated, and then transferred to a register r0.

In FIG. 25, the program part 522 is executed and 2-word access is made to each data. After one sample is processed, the latest data D[0] is overwritten to a region 531 holding the oldest data D[255] in the previous processing and the pointer is updated to h'25fe. This state is shown in FIG. 26.

In FIG. 26, 1-word access is made to the data D[0] at a region 532 to be read out in a preprocessing of the program part 523. The register r8 is updated to h'2400 through modulo addressing and then 2-word accesses are made to a series of data D[1] at a region 533 to D[254] at a region 534 to be loaded. Finally, 1-word access is made to the data D[255] in the last region 535 to be loaded.

Figures 27, 28:
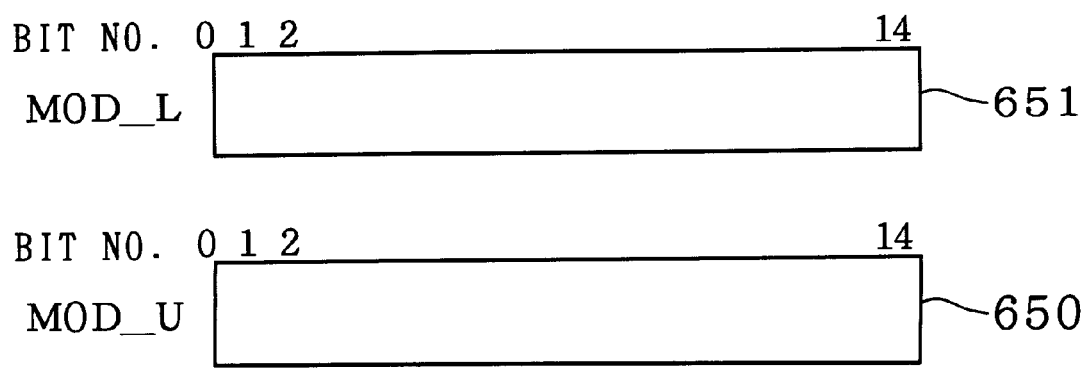

FIG. 27 shows a state of the circular buffer when the next sample is inputted. The data pointer is updated to h'25fc. In this condition, the program part 522 is executed and 2-word accesses are made to all the data. When 2-word access is made with the data pointer at h'25fc, the register r8 is updated to h'2400.

In the sample-by-sample FIR filtering, where 1-word access and 2-word access are mixed, the data processor of the first preferred embodiment ensures proper updating of the pointer in any case of the 1-word access and the 2-word access to the circular buffer boundary. Therefore, the data processor allows a user to make programming without considering the circular buffer boundary and reduce code size of the program. Thus, the data processor of the first preferred embodiment achieves an efficient sequential processing without causing degradation in performance due to a condition judgment and the like in the program.

The above discussion has been made on the data processor of the first preferred embodiment which enables execution of load/store instruction to perform 1-word or 2-word access with postincrement or postdecrement. Further, the present invention can be used to execute a load/store instruction which transfers 4 or more words at a time. For example, in order to achieve 1-word access, 2-word access and 4-word access, it is necessary to make a judgment based on coincidence signals of three levels (4-word level, 2-word level and 1-word level).

Furthermore, though the data processor of the first preferred embodiment discussed above uses 16-bit address, it may use an address of any length such as 24 bits and 32 bits. The data processor of the first preferred embodiment can process data of 24 bits like a 24-bit DSP and data of 32 bits like a general-purpose processor, as well as data of 16 bits.

Besides controlling byte address as discussed above, the data processor of the first preferred embodiment may be used to control word address, consisting of 16 bits, 24 bits or 32 bits, like a general DSP.

In the data processor of the first preferred embodiment discussed above, when the coincidence signal 511 indicates "1" in the postincrement or postdecrement accompanying the 2-word access, the pointer value (the base address register value) is replaced without reference to the coincidence signal 512 which indicates coincidence/noncoincidence of the bit 14. In other words, if the coincidence signal 511 indicates "1" in the 2-word access, the address value held in the MOD_E register 157 and the pointer value are regarded as having substantially the same address field specifying the 2-word data.

Besides the above, the data processor of the first preferred embodiment may be structured so that the pointer value should not be replaced until the coincidence signal 511 indicates "1" and the bit 14 is "0" (indicating that the pointer value coincides with the address designating the first one of the two 1-word data constituting the 2-word data) in the postincrement (postdecrement) accompanying the 2-word access. In other words, if the coincidence signal 511 indicates "1" and the bit 14 is "0" in the 2-word access, the address value held in the MOD_E register 157 and the pointer value are also regarded as having substantially the same address field specifying the 2-word data.

Though judgment is made based on the high-order 15 bits without regard to the bit 15 in the first preferred embodiment as discussed above, additional condition that the bit 15 is "0" may be relied upon in the judgment.

Though the MOD_S register 156 and the MOD_E register 157 each hold 15 bits physically in the data processor of the first preferred embodiment discussed above, the MOD_S register 156 and the MOD_E register 157 may each have a structure to hold 16 bits and then the bit 15 may be compared or may not. When the bit 15 is compared, "0" is necessarily set to the bit 15 of the MOD_S register 156 and the whole 16-bit data are compared.

Though the MOD_S register 156 and the MOD_E register 157 each have word address in the above-discussed first preferred embodiment, the MOD_S register 156 and the MOD_E register 157 may each have byte address defining the boundary. If the bit 15 is ignored, the same operation as above-discussed first preferred embodiment is achieved.

In the data processor of the first preferred embodiment discussed above, the MOD_S register 156 and the MOD_E register 157 each hold all the address values up to the most significant bit (MSB). If the high-order bits are not held and judgment is made based on only the low-order bits, however, modulo addressing can work over more than one circular buffer provided in more than one region at a time without change of setting. This case needs some additional processing, such as outputting the value before updated to the high-order bits not to be compared.

Though two comparison results, i.e., comparison result on the high-order 14 bits and that on the bit 14, are obtained in the data processor of the first preferred embodiment as discussed above, an operation result of any form may be used only if it includes matching information on word address and that on 2-word address.

Though the data processor of the first preferred embodiment discussed above can perform its function in both increment and decrement, the data processor may be structured so as to perform its function in either increment or decrement.

Though the data processor of the first preferred embodiment discussed above has the structure of a general processor, the data processor may have a structure with the address register and the data register (such as accumulator) being separated, like a DSP. Further, the present invention may be also effective if it has a structure allowing independent access to a plurality of memories, like a DSP.

The data processor of the first preferred embodiment discussed above ensures no operation other than specified. When not-specified operation is done, additional processing for detecting an exception and the like may be performed. For example, an address exception may be serviced when the circular buffer has odd-word addresses.

The Second Preferred Embodiment

In the data processor of the first preferred embodiment, the boundary values of the circular buffer are set to the MOD_S register 156 and the MOD_E register 157 in accordance with circular direction by the program.

A data processor of the second preferred embodiment has a structure to designate the high limit address and the low limit address of the circular buffer region by using word addresses, and selects the address to be compared and the address to be outputted by hardware. The second preferred embodiment is different in control over modulo addressing from the first preferred embodiment, but it has the same basic specification and structure other than the above.

FIG. 28 illustrates a MOD_U register 650 and a MOD_L register 651 each defining an address of the circular buffer by word address. The data processor of the second preferred embodiment implements the MOD_U register 650 and the MOD_L register 651, instead of the MOD_S register 156 and the MOD_E register 157 of the first preferred embodiment, as control registers to designate the boundary addresses of the circular buffer.

The MOD_U register 650 is a 15-bit latch and holds the high limit address of a region to be modulo-addressed by word address. The MOD_L register 651 is a 15-bit latch and holds the low limit address of a region to be modulo-addressed by word address. The low limit address is an address lower than the high limit address. The least significant bits (the bit 15) of the high and low limit addresses which are not held in the MOD_U register 650 nor the MOD_L register 651 are each fixed to "0", and specifically no data are written into the MOD_U register 650 or the MOD_L register 651 as the bit 15 and "0" is always read out as the bit 15.

Figure 29:
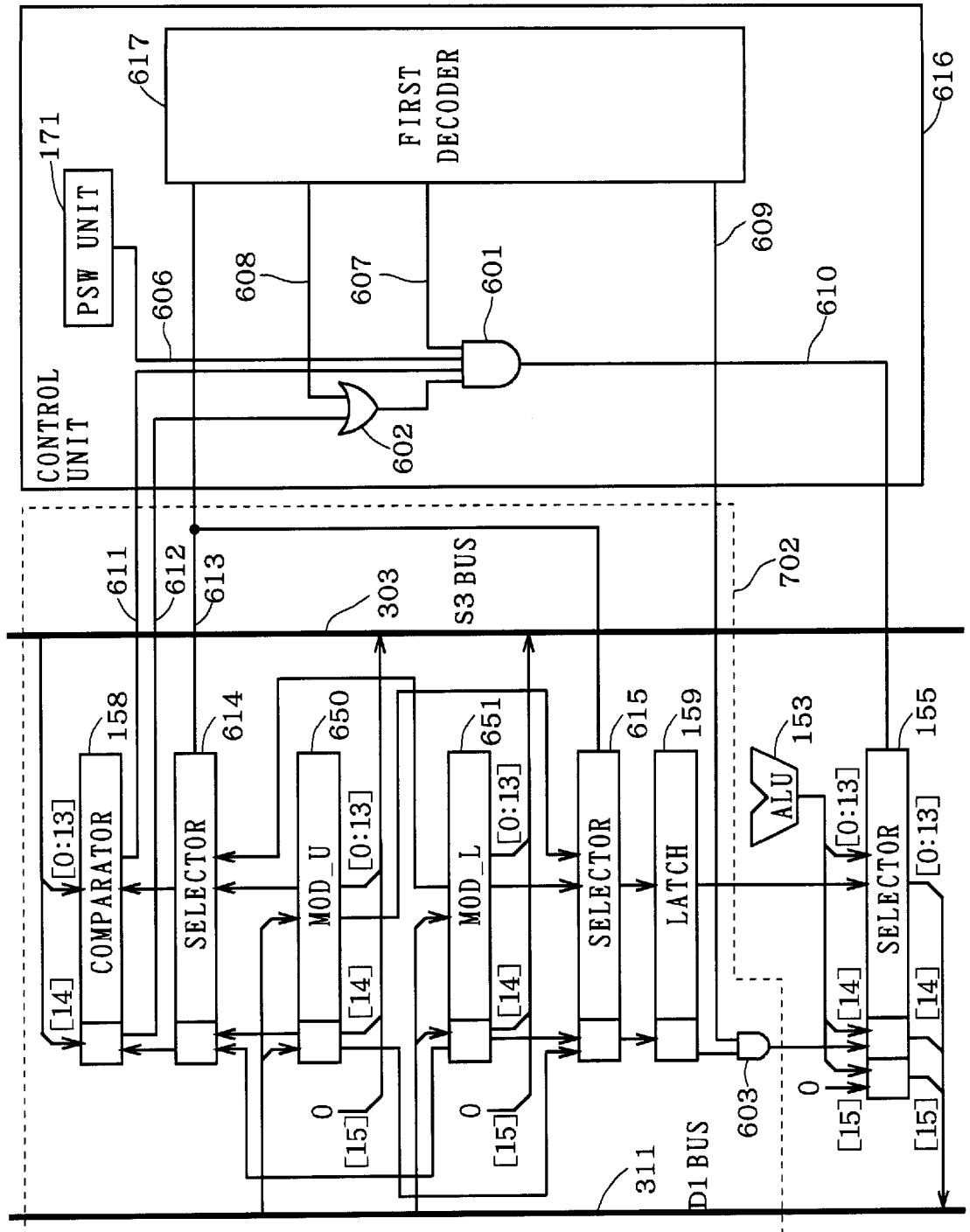
FIG. 29 is a schematic circuit diagram showing implementation of modulo addressing in the data processor in accordance with the second preferred embodiment of the present invention.

FIG. 29 is a schematic circuit diagram showing implementation of modulo addressing in the data processor of the second preferred embodiment. A control unit 616 corresponds to the control unit 112 of the first preferred embodiment, and has almost the same elements other than those associated with control over modulo addressing. A modulo operation unit 702 corresponds to the modulo operation unit 700 of the first preferred embodiment. For simple illustration, enable signals and the like for the latches are omitted. Further, logics are shown in positive representation as much as possible.

The data processor of the second preferred embodiment has almost the same circuit configuration other than shown in FIG. 29 as that of the first preferred embodiment. In FIG. 29, a selector 614 selectively outputs the value held in the MOD_U register 650 or the MOD_L register 651 to the comparator 158 under the control of a postincrement signal 613 generated by a first decoder 617. The postincrement signal 613 indicates "1" when a memory-access instruction (load instruction, store instruction) is executed with postincrement and indicates "0" when executed with postdecrement. Specifically, the selector 614 outputs the value held in the MOD_U register 650 to the comparator 158 when the postincrement signal 613 is "1" indicating postincrement and outputs the value held in the MOD_L register 651 to the comparator 158 when the postincrement signal 613 is "0" indicating postdecrement.

The comparator 158 compares the base address value transferred over the S3 bus 303 with the address outputted from the selector 614, and transfers the comparison results with respect to two independent fields to the control unit 616. Specifically, a coincidence signal 611 indicates "1" when the two addresses coincide in the high-order 14 bits ranging from the bit 0 to the bit 13 and indicates "0" when they do not. A coincidence signal 612 indicates "1" when the two addresses coincide in the bit 14 and indicates "0" when they do not.

The MOD_U register 650 which holds the high limit address of the circular buffer is a 15-bit latch and has an input port connected to the D1 bus 311 and output ports connected to the S3 bus 303 and the selectors 614 and 615. When the value held in the MOD_U register 650 is outputted to the S3 bus 303, "0" is set to the bit 15.

The MOD_L register 651 which holds the low limit address of the circular buffer is a 15-bit latch and has an input port connected to the D1 bus 311 and output ports connected to the S3 bus 303 and the selectors 614 and 615. When the value held in the MOD_S register 651 is outputted to the S3 bus 303, "0" is given as the bit 15.

The selector 615 selectively outputs the value held in the MOD_U register 650 or the MOD_L register 651 to the latch 159 under the control of a postincrement signal 613 generated by the first decoder 617. Specifically, the selector 615 outputs the value held in the MOD_U register 650 to the latch 159 when the postincrement signal 613 is "1" indicating postincrement and outputs the value held in the MOD_L register 651 to the latch 159 when the postincrement signal 613 is "0" indicating postdecrement.

The selector 155 selectively outputs the output from the ALU 153 and the address value held in the latch 159 to the D1 bus 311, based on a selection signal 610. When the value held in the latch 159 is selected, "0" is outputted as the bit 15. The first decoder 617 generates a postdecrement 2-word access signal 609 of low active which indicates "0" when 2-word access is made with postdecrement and otherwise "1". An AND gate 603 obtains a logical product of the signal 609 and the bit 14 of the latch 159 and outputs the logical product to the bit 14 of the selector 155. In other words, when the postdecrement 2-word access signal is "0" indicating 2-word access with postdecrement, "0" is forcefully set to the bit 14 of the selector 155, and otherwise the bit 14 of the latch 159 is set thereto.

In the control unit 616, the selection signal 610 for the selector 155 is generated, based on the decoded result of the instruction and the comparison result from the comparator 158. The PSW unit 171 outputs the value of the MD bit 44 which indicates whether the modulo addressing is enabled or disabled over a signal line 606. The first decoder 617 outputs a post-update signal 607 which indicates "1" when memory access is performed with postincrement/postdecrement and a 2-word access signal 608 which indicates "1" when 2-word access is performed, as a result of decoding of the instruction. An AND gate 601 and an OR gate 602 generate the selection signal 610 based on these informations. Specifically, the OR gate 602 performs an OR operation of the coincidence signal 612 and the 2-word access signal 608 and outputs the operation result. The AND gate 601 performs an AND operation of the value of the MD bit 44 (on the signal line 606), the post-update signal 607, the coincidence signal 611 and the output from the OR gate 602, and outputs the operation result as the selection signal 610.

When 1-word access is made (the 2-word access signal 608 is "0"), the modulo addressing is enabled (the signal line 606 is "1"), the load/store instruction is executed with postincrement/postdecrement (the post-update signal 607 is "1") and the operand address transferred over the S3 bus 303 coincides with the high-order 14 bits of the address selected by the selector 614 (the coincidence signal 611 is "1"), the selection signal 610 indicates "1" and otherwise "0".

On the other hand, when 2-word access is made (the 2-word access signal 608 is "1"), the modulo addressing is enabled and the load/store instruction is executed with postincrement/postdecrement, the selection signal 610 indicates "1" and otherwise "0".

When the selection signal 610 indicates "0" during execution of the load/store instruction with post-updating of the address register, the addition/subtraction result from the ALU 153 is transferred over the D1 bus 311 and written back into the register file 115 as an updated pointer value. When the selection signal 610 indicates "1", the address value held in the latch 159 is transferred over the D1 bus 311 and written back into the register file 115 as the update value of the pointer. In this case, when 2-word access is made with postdecrement, "0" is forcefully set to the bit 14 of the selector 155 by the AND gate 603 and otherwise the value of the bit 14 of the latch 159 is set thereto. Also to the bit 15 of the selector 155, "0" is forcefully set.

When the modulo addressing is disabled, the selection signal 610 necessarily indicates "0" and the selector 155 selects the output from the ALU 153.

Next, as an example, address-updating in execution of the load/store instructions using the circular buffer will be discussed. The value of the MD bit 44 is assumed to be "1".

The data processor of the second preferred embodiment does not ensure the reliability of access to the circular buffer with its data region misaligned into 4-byte boundary. The data region of the circular buffer must be aligned into 4-byte boundary when the 2-word access is made.

FIG. 30 illustrates a structure of a circular buffer with the two boundaries aligned in 4-byte. Hexadecimal representation follows "h'". A circular buffer region covers 256 words (512 bytes) ranging from h'1000 to h'11ff. The low limit word address h'1000 of the buffer region is set to the MOD_L register 651 and the high limit word address h'11fe is set to the MOD_U register 650.

When the postincrement is performed, since the postincrement signal 613 outputted from the first decoder 617 is "1", regardless of whether 1-word access or 2-word access, the selector 614 outputs the value held in the MOD_U register 650 to the comparator 158 and the selector 615 outputs the value held in the MOD_L register 651 to the latch 159.

When 1-word access is made with postincrement, the postincrement signal 613 outputted from the first decoder 617 is "1", the post-update signal 607 is "1", the 2-word access signal 608 is "0" and the postdecrement 2-word access signal 609 (low active) is "1".

In this condition, when the base address register value indicates h'11fe, the coincidence signals 611 and 612 are each "1" and the selection signal 610 is "1", and consequently the selector 155 selects the value held in the latch 159 (the value in the MOD_L register 651) and writes h'1000 back into the base address register 115 over the D1 bus 311.

Otherwise in the 1-word access with postincrement, the selector 155 selects the output of the ALU 153, i.e., the value held in the base address register+"2", and writes back the output value into the base address register since either the coincidence signal 611 or 612 is "0". For example, the base address register holds h'11fc, h'11fe is written back into the base address register.

When 2-word access is made with postincrement, the postincrement signal 613 outputted from the first decoder 617 is "1", the post-update signal 607 is "1", the 2-word access signal 608 is "1" and the postdecrement 2-word access signal 609 (low active) is "1".

In this condition, when the base address register value indicates h'11fc, the coincidence signal 611 is "1" and the 2-word access signal 608 is "1", and accordingly the selection signal 610 is "1" even if the coincidence signal 612 is "0". Consequently, the selector 155 selects the output value from the latch 159 (the value of the selector 615) and writes h'1000 back into the base address register.

Otherwise in the 2-word access with postincrement, the selector 155 selects the output of the ALU 153, i.e., the value held in the base address register+"4", and writes back the output value into the base address register since the coincidence signal 611 is "0" and the selection signal is "0".

The data processor of the second preferred embodiment ensures proper operations in both cases of 1-word access and 2-word access with postincrement by setting the high limit word address and the low limit word address of the circular buffer to the MOD_U register 650 and the MOD_L register 651, respectively.

When the postdecrement is performed, since the postincrement signal 613 outputted from the first decoder 617 is "0", regardless of whether 1-word access or 2-word access, the selector 614 outputs the value held in the MOD_L register 651 to the comparator 158 and the selector 615 outputs the value held in the MOD_U register 650 to the latch 159.

When 1-word access is made with postdecrement, the postincrement signal 613 outputted from the first decoder 617 is "0", the post-update signal 607 is "1", the 2-word access signal 608 is "0" and the postdecrement 2-word access signal 609 (low active) is "1".

In this condition, when the base address register value indicates h'1000, the coincidence signals 611 and 612 are each "1" and the selection signal 610 is "1", and consequently the selector 155 selects the output value from the latch 159 (the value in the MOD_U register 650) and writes h'11fe back into the base address register.

Otherwise in the 1-word access with postdecrement, the selector 155 selects the output of the ALU 153, i.e., the value held in the base address register–"2", and writes back the output value into the base address register since either the coincidence signal 611 or 612 is "0" and the selection signal is "0". For example, the base address register holds h'1002, h'1000 is written back into the base address register.

When 2-word access is made with postdecrement, the postincrement signal 613 outputted from the first decoder 617 is "0", the post-update signal 607 is "1", the 2-word access signal 608 is "1" and the postdecrement 2-word access signal 609 (low active) is "0".

In this condition, when the base address register value indicates h'1000, the coincidence signals 611 and 612 are each "1" and the selection signal 610 is "1", and consequently the selector 155 selects the output value from the latch 159 (the value in the MOD_U register 650). At that time, since the postdecrement 2-word access signal 609 of low active is "0", "0" is forcefully set to the bit 14 of the output value from the latch 159 by the AND gate 603. Accordingly, the selector 155 writes h'11fc back into the base address register.

Otherwise in the 2-word access with postdecrement, the selector 155 selects the output of the ALU 153, i.e., the value held in the base address register–"4", and writes back the output value into the base address register since the coincidence signal 611 is "0" and the selection signal is "0".

The second preferred embodiment ensures proper operations in both cases of 1-word access and 2-word access with postdecrement by setting the same values as used in the word access with postincrement to the MOD_U register 650 and the MOD_L register 651.

The above discussion on the second preferred embodiment has been presented using the circular buffer with both its two boundaries aligned in 4 bytes. In the data processor of the second preferred embodiment, however, a circular buffer with its one boundary misaligned in 4 bytes can also work properly, like in the first preferred embodiment.

Thus, the data processor of the second preferred embodiment allows efficient 2-word access as well as 1-word access to the circular buffer, and thereby reduces code size of the program and the number of operation cycles.

Moreover, the second preferred embodiment ensures proper postincrement/postdecrement operation by setting the high limit word address and the low limit word address of the circular buffer region to the MOD_U register 650 and the MOD_L register 651 respectively, regardless of whether postincrement or postdecrement, unlike the first preferred embodiment, and therefore it eliminates the need for resetting the control register in switching between the increment and decrement. That enables further reduction in code size of the program and the number of operation cycles.

Furthermore, the data processor of the second preferred embodiment allows judgment operation based on the base address value in parallel with address calculation during postincrement or postdecrement. That facilitates speeding up of operation with higher operating frequency.

The data processor of the second preferred embodiment may also be used in a variety cases as discussed in the first preferred embodiment.

Though the data processor of the second preferred embodiment discussed above uses 16-bit address, it may use an address of any length such as 24 bits and 32 bits. The data processor of the second preferred embodiment can process data of 24 bits and data of 32 bits, as well as data of 16 bits. Besides controlling byte address as discussed above, the data processor of the second preferred embodiment may be used to control word address, consisting of 16 bits, 24 bits or 32 bits.

The above discussion has been made on the data processor of the second preferred embodiment which enables execution of load/store instruction to perform 1-word or 2-word access with postincrement or postdecrement. Further, the present invention can be used to execute a load/store instruction which transfers 4 or more words at a time. For example, in order to achieve 1-word access, 2-word access and 4-word access, it is necessary to make a judgment based on coincidence signals of three levels (4-word level, 2-word level and 1-word level).

In the data processor of the second preferred embodiment discussed above, when the coincidence signal 611 indicates "1" in the postincrement (postdecrement) accompanying the 2-word access, the pointer value (the base address register value) is replaced without reference to the value of the bit 14. Besides the above, the data processor of the second preferred embodiment may be structured so that the pointer value should not be replaced until the coincidence signal 611 indicates "1" and the bit 14 is "0" (indicating that the pointer value coincides with the address designating the first one of the two 1-word data constituting the 2-word data) in the postincrement (postdecrement) accompanying the 2-word access.

Though the MOD_U register 650 and the MOD_L register 651 each hold 15 bits physically in the data processor of the second preferred embodiment discussed above, the MOD_U register 650 and the MOD_L register 651 may each have a structure to hold 16 bits and then the bit 15 may be compared or may not. When the bit 15 is compared, "0" is necessarily set to the bit 15 of the MOD_U register 650 and the MOD_L register 651, and the whole 16-bit data are compared.

Though the MOD_U register 650 and the MOD_L register 651 each have word address in the above-discussed second preferred embodiment, the MOD_U register 650 and the MOD_L register 651 may each have byte address defining the boundary. If the bit 15 is ignored, the same operation as above-discussed second preferred embodiment is achieved.

In the data processor of the second preferred embodiment discussed above, the MOD_U register 650 and the MOD_L register 651 each hold all the address values up to the most significant bit (MSB). If the high-order bits are not held and judgment is made based on only the low-order bits, however, modulo addressing can work over more than one circular buffer provided in more than one region at a time without change of setting. This case needs some additional processing, such as outputting the value before updated to the high-order bits not to be compared.

Though two comparison results, i.e., comparison result on the high-order 14 bits and that on the bit 14, are obtained in the data processor of the second preferred embodiment as discussed above, an operation result of any form may be used only if it includes matching information on word address and that on 2-word address.

Though the data processor of the second preferred embodiment discussed above has the structure of a general processor, the data processor may have a structure with the address register and the data register (such as accumulator) being separated, like a DSP. Further, the present invention may be also effective if it has a structure allowing independent access to a plurality of memories, like a DSP.

The data processor of the second preferred embodiment discussed above ensures no operation other than specified. When not-specified operation is done, additional processing for detecting an exception and the like may be performed. For example, an address exception may be serviced when the circular buffer has odd-word addresses.

The Third Preferred Embodiment

In the data processor of the first preferred embodiment, for modulo addressing, the beginning address of the modulo addressing region and the ending address of the modulo addressing region are set in the MOD_S register 156 and the MOD_E register 157, respectively, by word address. In a data processor of the third preferred embodiment discussed below, the beginning address and the ending address are set by 2-word address. The third preferred embodiment is different in control over modulo addressing from the first preferred embodiment, but it has the same basic specification and structure other than the above.

FIG. 31 illustrates a MOD_E register 850 and a MOD_S register 851 each defining an address of the circular buffer region by 2-word address. The MOD_E register 850 and the MOD_S register 851 correspond to the MOD_E register 157 and the MOD_S register 156 of the first preferred embodiment, respectively. The MOD_E register 850 and the MOD_S register 851 are 14-bit latches. Accordingly, the MOD_E register 850 and the MOD_S register 851 each hold one bit less information than the MOD_E register 157 and the MOD_S register 156 of the first preferred embodiment.

When modulo addressing is performed with increment, the lower address is set to the MOD_S register 851 and the higher address is set to the MOD_E register 850, and when modulo addressing is performed with decrement, the higher address is set to the MOD_S register 851 and the lower address is set to the MOD_E register 850. In the data processor of the third preferred embodiment, the boundaries of the circular buffer must be aligned in 2 words.

FIG. 32 is a schematic circuit diagram showing implementation of modulo addressing in the data processor of the third preferred embodiment. A control unit 816 corresponds to the control unit 112 of the first preferred embodiment, and has almost the same elements other than those associated with control over modulo addressing. A modulo operation unit 703 corresponds to the modulo operation unit 700 of the first preferred embodiment. For simple illustration, enable signals and the like for the latches are omitted. Further, logics are shown in positive representation as much as possible.

The data processor of the third preferred embodiment has almost the same circuit configuration other than shown in FIG. 32 as that of the first preferred embodiment. A comparator 852 compares the base address value transferred over the S3 bus 303 with the modulo end address held in the MOD_E register 850, and transfers the comparison result to the control unit 816. The comparator 852 brings a coincidence signal 811 into "1" when the two addresses coincide in the high-order 14 bits ranging from the bit 0 to the bit 13 and into "0" when they do not.

The MOD_E register 850 which holds the modulo end address is a 14-bit latch and has an input port connected to the D1 bus 311 and output ports connected to the S3 bus 303 and the comparator 852. When the value held in the MOD_E register 850 is outputted to the S3 bus 303, "0" is given as the bit 14 and the bit 15. The MOD_S register 851 which holds the modulo start address is a 14-bit latch and has an input port connected to the D1 bus 311 and output ports connected to the S3 bus 303 and a 14-bit latch 853.

When the value held in the MOD_S register 851 is outputted to the S3 bus 303, "0" is set to the bit 14 and the bit 15.

The selector 155 selectively outputs the output from the ALU 153 and the modulo start address value held in the latch 853 to the D1 bus 311, based on a selection signal 810. When the value held in the latch 853 is selected, a postdecrement 1-word access signal 809 is outputted as the bit 14 and "0" is set to the bit 15. This postdecrement 1-word access signal 809 is generated by a first decoder 817, and indicates "1" when the memory-access instruction performs 1-word access with postdecrement and otherwise indicates "0".

In the control unit 816, the selection signal 810 for the selector 155 is generated, based on the decoded result of the instruction and the comparison result from the comparator 852. The PSW unit 171 outputs the value of the MD bit 44 which indicates whether the modulo addressing is enabled or disabled over a signal line 806. Besides the postdecrement 1-word signal 809, the first decoder 817 outputs a post-update signal 807 which indicates "1" when memory access with postincrement/postdecrement is performed and a postincrement 1-word access signal 808 which indicates "1" when the memory-access instruction performs 1-word access with postincrement and otherwise "0", as a result of decoding of the instruction.

An AND gate 801, an OR gate 802, an AND gate 803, an AND gate 804, an inverter 805 and an inverter 812 generate the selection signal 810 based on these informations. Specifically, the postincrement 1-word access signal 808 is inputted to the AND gate 804 and to the AND gate 803 through the inverter 805, and the information of the bit 14 on the S3 bus 303 is inputted to the AND gate 804 and to the AND gate 803 through the inverter 812. The OR gate 802 performs an OR operation of outputs from the AND gates 803 and 804 and outputs the operation result to the AND gate 801. The AND gate 801 performs an AND operation of the post-update signal 807, the signal on the signal line 806, the output from the OR gate 802 and the coincidence signal 811 and outputs the operation result to the selector 155 as the selection signal 810.

Accordingly, if the memory-access instruction performs 1-word access with postincrement (the postincrement 1-word access signal 808 is "1"), the value on the signal line 813 is "1" when the bit 14 of the operand address is "1" and the value on the signal line 813 is "0" when the bit 14 is "0". Otherwise in a memory access (the postincrement 1-word access signal 808 is "0"), the value on the signal line 813 is "1" when the bit 14 of the operand address is "0" and the value on the signal line 813 is "0" when the bit 14 is "1". When the bit 14 is "1", specified is the second one of the two 1-word data constituting the 2-word data designated by the bit 0 to the bit 13 of the address.

When the modulo addressing is enabled (the signal line 806 is "1") and a load/store instruction is executed with postincrement/postdecrement (the post-update signal 807 is "1"), if the high-order 14 bits of the operand address transferred over the S3 bus 303 coincides with the value held in the MOD_E register 850 (the coincidence signal 811 is "1") and the signal line 813 is "1", the selection signal indicates "1", and otherwise "0".

When a load/store instruction with post-updating of the address is executed, if the selection signal 810 is "0", the addition/subtraction result from the ALU 153 is written back to the register file 115 over the D1 bus 311 as an updated pointer value. If the selection signal 810 is "1", the modulo start address value held in the latch 853 is written back to the register file 115 over the D1 bus 311 as the updated pointer value.

When the modulo addressing is disabled, the selection signal 810 is necessarily "0" and the selector 155 always selects the output from the ALU 153.

As an example, updating of address in execution of the load/store instructions which makes access to the circular buffer region will be discussed, where the value in the MD bit 44 is assumed to be "1", starting with the modulo addressing with postincrement.

The data processor of the third preferred embodiment does not ensure the reliability of access to the circular buffer with its data region misaligned into 4-byte boundary. The data region of the circular buffer must be aligned into 4-byte boundary when the 2-word access is made.

Figure 33:
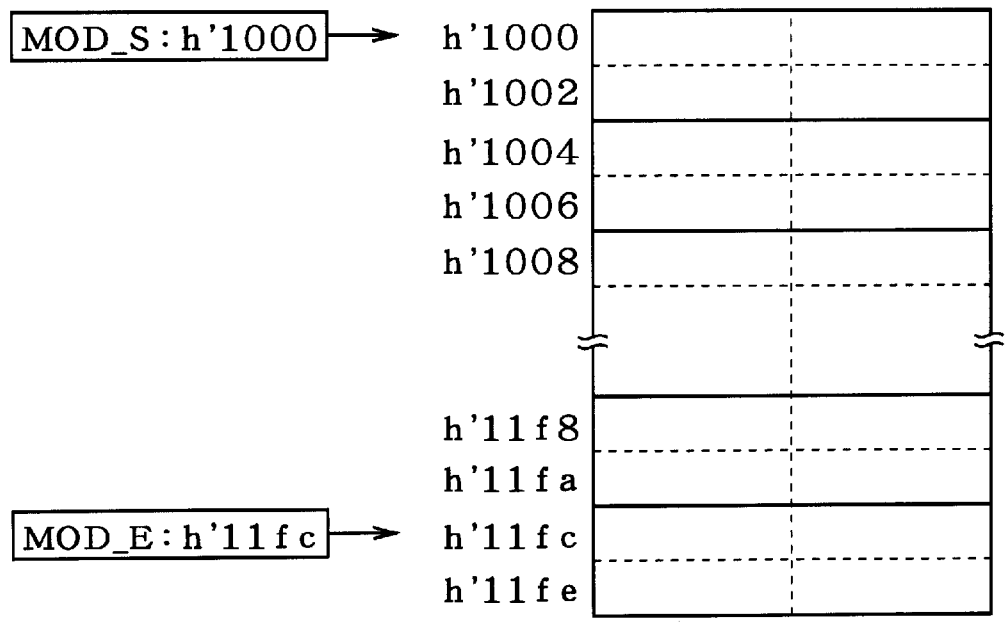
FIGS. 33 and 34 each illustrate a structure of a circular buffer with both the two boundaries aligned in 4 bytes.

FIG. 33 illustrates a structure of a circular buffer to be accessed with postincrement. Hexadecimal representation follows "h'". A circular buffer region covers 256 words (512 bytes) ranging from h'1000 to h'11ff. The high-order 14 bits at the beginning 2-word address h'1000 of the circular buffer are set to the MOD_S register 851 and the high-order 14 bits at the ending 2-word address h'11fc are set to the MOD_E register 850.

When 1-word access is made with postincrement, the post-update signal 807 outputted from the first decoder 817 is "1", the postincrement 1-word access signal 808 is "1" and the postdecrement 2-word access signal 809 is "0".

When the base address register value indicates h'11fe, the coincidence signal 811 is "1" and the bit 14 of the base address register is "1", and accordingly the selection signal 810 is "1". Consequently, the selector 155 selects the modulo start address value held in the latch 853 and writes back the address value into the base address register in the register file 115 over the D1 bus 311. In this case, h'1000 is written back into the base address register since the postdecrement 1-word access signal 809 is "0". Otherwise in the 1-word access with postincrement, the selector 155 selects the output of the ALU 153, i.e., the value held in the base address register+"2", and writes back the output value into the base address register since the signal line 813 is "0". For example, the base address register holds h'11fc, h'11fe is written back into the base address register.

When 2-word access is made with postincrement, the post-update signal 807 outputted from the first decoder 817 is "1", the postincrement 1-word access signal 808 is "0" and the postdecrement 2-word access signal 809 is "0".

When the base address register value indicates h'11fc, the coincidence signal 811 is "1" and the bit 14 of the base address register is "0", and accordingly the selection signal 810 is "1". Consequently, the selector 155 selects the modulo start address value held in the latch 853. In this case, h'1000 is written back into the base address register since the postdecrement 1-word access signal 809 is "0". Otherwise in the 2-word access with postincrement, the selector 155 selects the output from the ALU 153, i.e., the initial value of base address register+"4", and writes back the output value into the base address register since the coincidence signal 811 is "0" or the bit 14 of the base address register is "1".

The data processor of the third preferred embodiment ensures proper operations in both cases of 1-word access and 2-word access with postincrement by setting values to the MOD_S register 851 and the MOD_E register 850 which are used in common for the 1-word access with postincrement and the 2-word access with postincrement.

Figure 34:
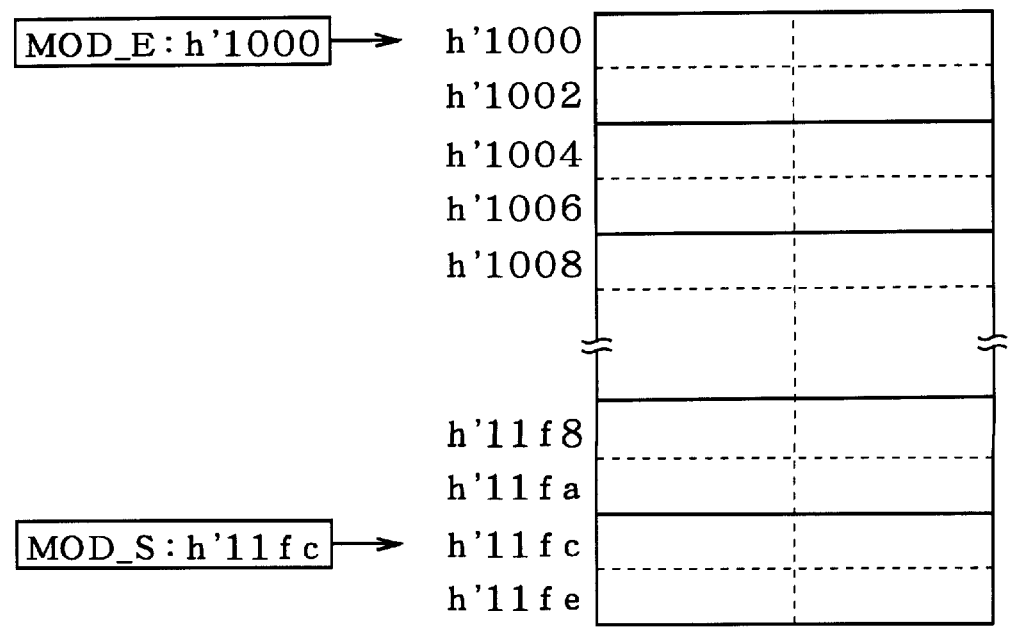

FIG. 34 illustrates a structure of a circular buffer to be accessed with postdecrement. Hexadecimal representation follows "h'". A circular buffer region covers 256 words (512 bytes) ranging from h'1000 to h'11ff. The high-order 14 bits at the beginning 2-word address h'11fc of the circular buffer are set to the MOD_S register 851 and the high-order 14 bits at the ending 2-word address h'1000 are set to the MOD_E register 850.

When 1-word access is made with postdecrement, the post-update signal 807 outputted from the first decoder 817 is "1", the postincrement 1-word access signal 808 is "0" and the postdecrement 2-word access signal 809 is "1".

When the base address register value indicates h'1000, the coincidence signal 811 is "1" and the bit 14 of the base address register is "0", and accordingly the selection signal 810 is "1". Consequently, the selector 155 selects the modulo start address value held in the latch 853. In this case, h'11fe is written back into the base address register since the postdecrement 1-word access signal 809 is "1". Otherwise in the 1-word access with postdecrement, the selector 155 selects the output of the ALU 153, i.e., the value held in the base address register−"2", and writes back the output value into the base address register since the coincidence signal 811 is "0" or the bit 14 of the base address register is "1". For example, the base address register holds h'1102, h'1000 is written back into the base address register.

When 2-word access is made with postdecrement, the post-update signal 807 outputted from the first decoder 817 is "1", the postincrement 1-word access signal 808 is "0" and the postdecrement 2-word access signal 809 is "0". When the base address register value indicates h'1000, the coincidence signal 811 is "1" and the bit 14 of the base address register is "0", and accordingly the selection signal 810 is "1". Consequently, the selector 155 selects the modulo start address value held in the latch 853. In this case, h'11fc is written back into the base address register since the postdecrement 1-word address 809 is "0". Otherwise in the 2-word access with postdecrement, the selector 155 selects the output from the ALU 153, i.e., the initial value of base address register−"4", and writes back the output value into the base address register since the coincidence signal 811 is "0" or the bit 14 of the base address register is "1".

The data processor of the third preferred embodiment ensure proper operations in both cases of 1-word access and 2-word access with postdecrement by setting values to the MOD_S register 851 and the MOD_E register 850 which are used in common for the 1-word access with postdecrement and the 2-word access with postdecrement.

Thus, though the circular buffer must be aligned in 2-word boundary, the data processor of the third preferred embodiment allows efficient 2-word access as well as 1-word access to the circular buffer with postincrement or postdecrement, like the first preferred embodiment, and thereby reduces code size of the program and the number of operation cycles.

Furthermore, the data processor of the third preferred embodiment allows judgment operation based on the base address value in parallel with address calculation during postincrement or postdecrement. That facilitates speeding up of operation with higher operating frequency.

The data processor of the third preferred embodiment may also be used in a variety cases as discussed in the first preferred embodiment.

Though the data processor of the third preferred embodiment discussed above uses 16-bit address, it may use an address of any length such as 24 bits and 32 bits. The data processor of the third preferred embodiment can process data of 24 bits and data of 32 bits, as well as data of 16 bits. Besides controlling byte address as discussed above, the data processor of the third preferred embodiment may be used to control word address, consisting of 16 bits, 24 bits or 32 bits.

The above discussion has been made on the data processor of the third preferred embodiment which enables execution of load/store instruction to perform 1-word or 2-word access with postincrement or postdecrement. Further, the present invention can be used to execute a load/store instruction which transfers 4 or more words at a time. In a case of 4-word data transfer, 4-word addresses are set to the MOD_E register 850 and the MOD_S register 851 and another judgments are made on the bit 13 and the bit 14.

Though judgment is made only based on the high-order 15 bits in the third preferred embodiment as discussed above, additional condition that the bit 15 is "0" may be relied upon in the judgment.

Though the MOD_E register 850 and the MOD_S register 851 each hold 14 bits physically in the data processor of the third preferred embodiment discussed above, the MOD_E register 850 and the MOD_S register 851 may each have a structure to hold 16 bits and then the bit 14 and the bit 15 may be compared or may not. When the bit 14 and the bit 15 are compared, "0" is necessarily set to the bit 14 and the bit 15 of the MOD_S register 851 and the whole 16-bit data are compared.

Though the MOD_E register 850 and the MOD_S register 851 each have word address in the above-discussed third preferred embodiment, the MOD_E register 850 and the MOD_S register 851 may each have byte address defining the boundary. If the bit 15 is ignored, the same operation as above-discussed third preferred embodiment is achieved.

In the data processor of the third preferred embodiment discussed above, the MOD_E register 850 and the MOD_S register 851 each hold all the address values up to the most significant bit (MSB). If the high-order bits are not held and judgment is made based on only the low-order bits, however, modulo addressing can work over more than one circular buffer provided in more than one region at a time without change of setting. This case needs some additional processing, such as outputting the value before updated to the high-order bits not to be compared.

Though the data processor of the third preferred embodiment discussed above can perform its function in both increment and decrement, the data processor may be structured so as to perform its function in either increment or decrement.

Though the data processor of the third preferred embodiment discussed above has the structure of a general processor, the data processor may have a structure with the address register and the data register (such as accumulator) being separated, like a DSP. Further, the present invention may be also effective if it has a structure allowing independent access to a plurality of memories, like a DSP.

The data processor of the third preferred embodiment discussed above ensures no operation other than specified. When not-specified operation is done, additional processing for detecting an exception and the like may be performed. For example, an address exception may be serviced when the circular buffer has odd-word addresses.

The Fourth Preferred Embodiment

In the data processor of the second preferred embodiment, for modulo addressing, the high limit address of the modulo addressing region and the low limit address of the modulo addressing region are set in the MOD_U register 650 and the MOD_L register 651, respectively, by word address. In a data processor of the fourth preferred embodiment discussed below, the high limit address and the low limit address are set by 2-word address. The fourth preferred embodiment is different in control over modulo addressing from the second preferred embodiment, but it has the same basic specification and structure other than the above.

Figure 35:
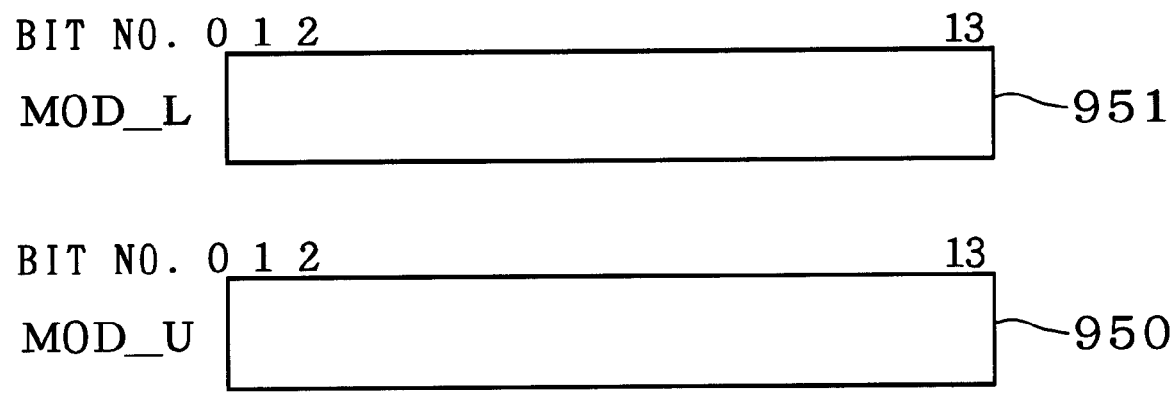
FIG. 35 illustrates registers holding the high limit address and the low limit address for modulo addressing in a data processor in accordance with a fourth preferred embodiment of the present invention.

FIG. 35 illustrates a MOD_U register 950 and a MOD_L register 951 each defining the address of the circular buffer by 2-word address. The MOD_U register 950 and the MOD_L register 951 correspond to the MOD_U register 650 and the MOD_L register 651 of the second preferred embodiment, respectively. The MOD_U register 950 is a 14-bit latch and holds the high limit address of a region to be modulo-addressed by 2-word address. The MOD_L register 951 is a 14-bit latch and holds the low limit address of a region to be modulo-addressed by 2-word address. The low limit address is an address lower than the high limit address. Accordingly, the MOD_U register 950 and the MOD_L register 951 of the fourth preferred embodiment each hold one bit less information than the MOD_U register 650 and the MOD_L register 651 of the second preferred embodiment.

The bit 14 and the bit 15 which are not held in the MOD_U register 950 nor the MOD_L register 951 are fixed to "0", and specifically no data are written into the MOD_U register 950 or the MOD_L register 951 as the bit 14 and the bit 15 and "0" is always read out as the bit 14 and the bit 15. In the data processor of the fourth preferred embodiment, the boundaries of the circular buffer must be aligned in 2 words.

Figure 36:
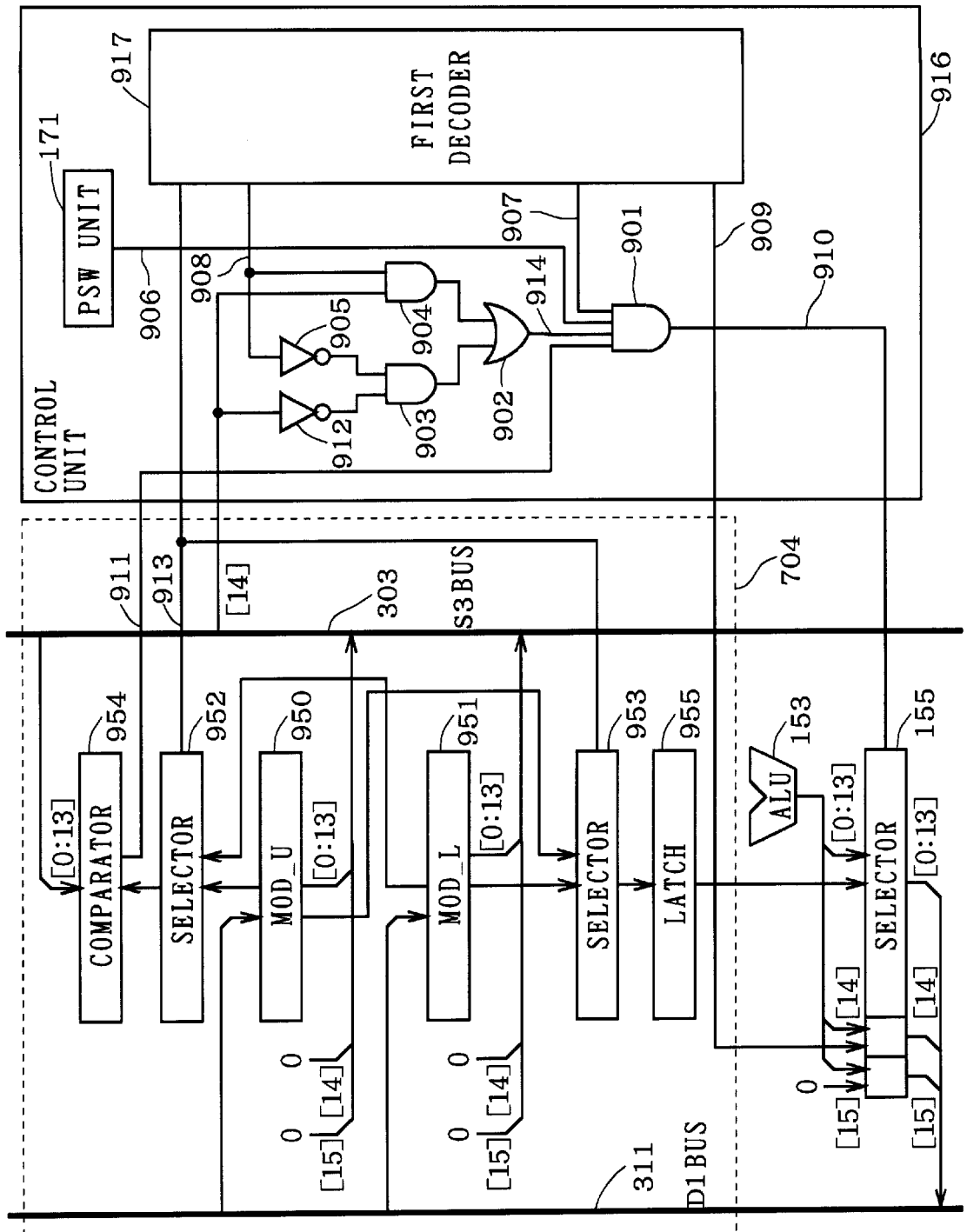
FIG. 36 is a schematic circuit diagram showing implementation of modulo addressing in the data processor in accordance with the fourth preferred embodiment of the present invention.

FIG. 36 is a schematic circuit diagram showing implementation of modulo addressing in the data processor of the fourth preferred embodiment. A control unit 916 corresponds to the control unit 112 of the first preferred embodiment, and has almost the same elements other than those associated with control over modulo addressing. A modulo operation unit 704 corresponds to the modulo operation unit 700 of the first preferred embodiment. For simple illustration, enable signals and the like for the latches are omitted. Further, logics are shown in positive representation as much as possible. The data processor of the fourth preferred embodiment has almost the same circuit configuration other than shown in FIG. 36 as that of the first preferred embodiment.

A selector 952 is controlled by a postincrement signal 913 generated by a first decoder 917. The postincrement signal 913 indicates "1" when a memory-access instruction is executed with postincrement and indicates "0" when executed with postdecrement. The selector 952 outputs the value held in the MOD_U register 950 to a comparator 954 when the postincrement signal 913 is "1" indicating postincrement and outputs the value held in the MOD_L register 951 to the comparator 954 when the postincrement signal 913 is "0" indicating postdecrement.

The comparator 954 compares the base address value transferred over the S3 bus 303 with the address outputted from the selector 952, and transfers the comparison result as a coincidence signal 911 to the control unit 916. Specifically, the coincidence signal 911 indicates "1" when the two addresses coincide in the high-order 14 bits ranging from the bit 0 to the bit 13 and indicates "0" when they do not.

The MOD_U register 950 which holds the high limit address of the circular buffer is a 14-bit latch and has an input port connected to the D1 bus 311 and output ports connected to the S3 bus 303 and the selectors 952 and 953. When the value held in the MOD_U register 950 is outputted to the S3 bus 303, "0" is set to the bit 14 and the bit 15.

The MOD_L register 951 which holds the low limit address is a 14-bit latch and has an input port connected to the D1 bus 311 and output ports connected to the S3 bus 303 and the selectors 952 and 953. When the value held in the MOD_S register 951 is outputted to the S3 bus 303, "0" is set to the bit 14 and the bit 15.

The selector 953 is controlled by the postincrement signal 913 generated by the first decoder 917. The selector 953 outputs the value held in the MOD_L register 951 to a latch 955 when the postincrement signal 913 is "1" indicating postincrement and outputs the value held in the MOD_U register 950 to the latch 955 when the postincrement signal 913 is "0" indicating postiderement.

The selector 155 selectively outputs the output from the ALU 153 and the address value held in the latch 955 to the D1 bus 311, based on a selection signal 910. When the value held in the latch 955 is selected, a postdecrement 1-word access signal 909 is outputted as the bit 14 and "0" is outputted as the bit 15. This postdecrement 1-word access signal 909 is generated by the first decoder 917, and indicates "1" when the memory-access instruction (load/store instruction) performs 1-word access with postdecrement and otherwise indicates "0".

In the control unit 916, the selection signal 910 to be outputted to the selector 155 is generated, based on the decoded result of the instruction and the comparison result from the comparator 954. The PSW unit 171 outputs the value of the MD bit 44 which indicates whether the modulo addressing is enabled or disabled over a signal line 906. The first decoder 917 outputs a post-update signal 907 which indicates "1" when memory access is performed with postincrement/postdecrement and a 1-word access signal 908 which indicates "1" when the memory-access instruction performs 1-word access with postincrement and otherwise indicates "0", as a result of decoding of the instruction.

An AND gate 901, an OR gate 902, an AND gate 903, an AND gate 904, an inverter 905 and an inverter 912 generate the selection signal 910 based on these informations. Specifically, the postincrement 1-word access signal 908 is inputted to the AND gate 904 and to the AND gate 903 through the inverter 905, and the information of the bit 14 on the S3 bus 303 is inputted to the AND gate 904 and to the AND gate 903 through the inverter 912. The OR gate 902 performs an OR operation of outputs from the AND gates 903 and 904 and outputs the operation result to the AND gate 901. The AND gate 901 performs an AND operation of the post-update signal 907, the signal on the signal line 906, the output from the OR gate 902 and the coincidence signal 911 and outputs the operation result to the selector 155 as the selection signal 910.

Accordingly, if the memory-access instruction performs 1-word access with postincrement (the postincrement 1-word access signal 908 is "1"), the value on a signal line (an address change signal) 914 is "1" when the bit 14 of the operand address is "1" and the value on the signal line 914 is "0" when the bit 14 is "0". Otherwise in a memory access (the postincrement 1-word access signal 908 is "0"), the value on the signal line 914 is "1" when the bit 14 of the operand address is "0" and the value on the signal line 914 is "0" when the bit 14 is "1".

When the modulo addressing is enabled (the signal line 906 is "1") and a load/store instruction is executed with postincrement/postdecrement (the post-update signal 907 is "1"), if the high-order 14 bits of the operand address transferred over the S3 bus 303 coincides with the output value from the selector 952 (the coincidence signal 911 is "1") and the signal line 914 is "1", the selection signal 910 indicates "1" and otherwise "0".

When a load/store instruction is executed with post-updating of the address, if the selection signal 910 is "0", the addition/subtraction result from the ALU 153 is written back to the register file 115 over the D1 bus 311 as an updated pointer value. If the selection signal 910 is "1", the address value held in the latch 955 is written back to the register file 115 over the D1 bus 311 as the updated pointer value.

When the modulo addressing is disabled, the selection signal 910 is necessarily "0" and the selector 155 always selects the output from the ALU 153.

As an example, updating of address in execution of the load/store instructions which makes access to the circular buffer region will be discussed. The value in the MD bit 44 is assumed to be "1".

The data processor of the fourth preferred embodiment does not ensure the reliability of access to the circular buffer with its data region misaligned into 4-byte boundary. The data region of the circular buffer must be aligned into 4-byte boundary when the 2-word access is made.

Figure 37:
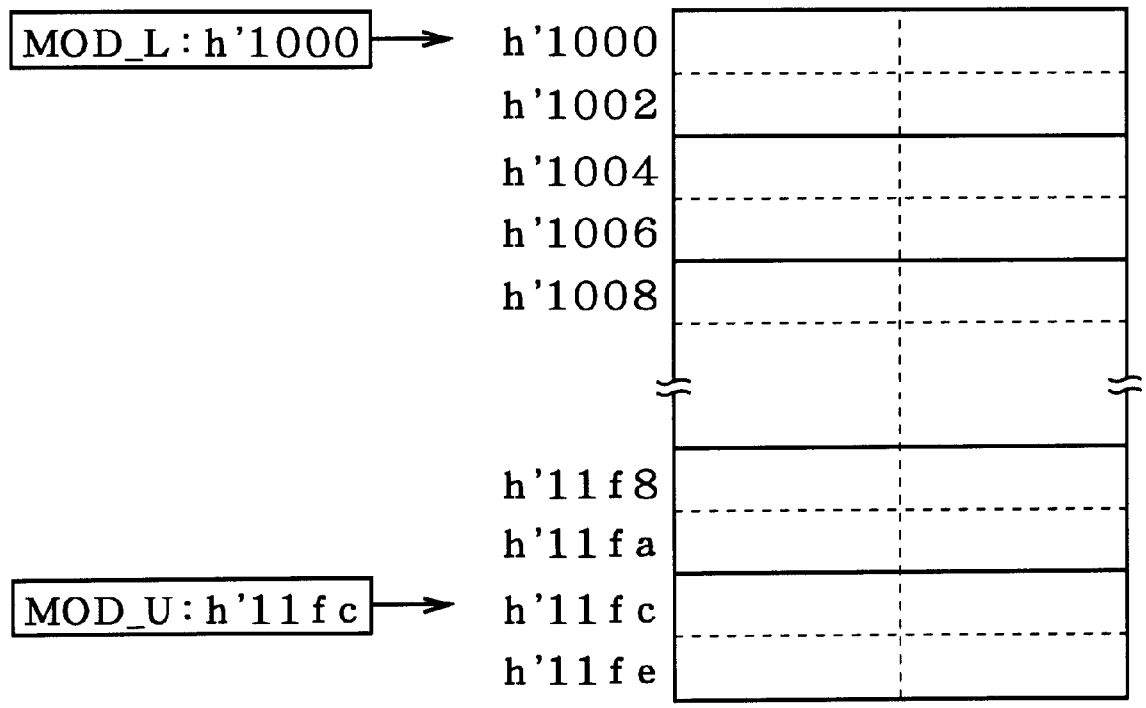
FIG. 37 illustrates a structure of a circular buffer with both the two boundaries aligned in 4 bytes.

FIG. 37 illustrates a structure of a circular buffer. Hexadecimal representation follows "h'". A circular buffer region covers 256 words (512 bytes) ranging from h'1000 to h'11ff. The high-order 14 bits at the low limit 2-word address h'1000 of the circular buffer are set to the MOD_L register 951 and the high-order 14 bits at the high limit 2-word address h'11fc are set to the MOD_U register 950.

When postincrement is made, regardless of whether 1-word access or 2-word access, the selector 952 outputs the value held in the MOD_U register 950 to the comparator 954 and the selector 953 outputs the value held in the MOD_L register 951 to the latch 955 since the postincrement signal 913 outputted from the first decoder 917 is "1".

When 1-word access is made with postincrement, the postincrement signal 913 outputted from the first decoder 917 is "1", the post-update signal 907 is "1", the postincrement 1-word access signal 908 is "1" and the postdecrement 1-word access signal 909 is "0".

When the base address register value indicates h'11fe, the coincidence signal 911 is "1" and the bit 14 of the base address register is "1", and accordingly the selection signal 910 is "1". Consequently, the selector 155 selects the value held in the latch 955 (the value of the MOD_L register 951) and writes h'1000 back into the base address register. Otherwise in the 1-word access with postincrement, the selector 155 selects the output of the ALU 153, i.e., the value held in the base address register+"2", and writes back the output value into the base address register since the address change signal 914 is "0". For example, the base address register holds h'11fc, h'11fe is written back into the base address register.

When 2-word access is made with postincrement, the postincrement signal 913 outputted from the first decoder 917 is "1", the post-update signal 907 is "1", the postincrement 1-word access signal 908 is "0" and the postdecrement 1-word access signal 909 is "0".

When the base address register value indicates h'11fc, the coincidence signal 911 is "1" and the bit 14 of the base address register is "0", and accordingly the selection signal 910 is "1". Consequently, the selector 155 selects the value held in the latch 955 (the value of the MOD_L register 951) and writes h'1000 back into the base address register. Otherwise in the 2-word access with postincrement, the selector 155 selects the output from the ALU 153, i.e., the value held in the base address register+"4", and writes back the output value into the base address register since the signal line 914 is "0".

The data processor of the fourth preferred embodiment ensures proper operations in both cases of 1-word access and 2-word access with postincrement by setting the high limit address and the low limit address to the MOD_U register 950 and the MOD_L register 951, respectively.

When the postdecrement is performed, regardless of whether 1-word access or 2-word access, the selector 952 outputs the value held in the MOD_L register 951 to the comparator 954 and the selector 953 outputs the value held in the MOD_U register 950 to the latch 955 since the postincrement signal 913 outputted from the first decoder 917 is "0".

When 1-word access is made with postdecrement, the postincrement signal 913 outputted from the first decoder 917 is "0", the post-update signal 907 is "1", the postincrement 1-word access signal 908 is "0" and the postdecrement 1-word access signal 909 is "1".

In this condition, when the base address register value indicates h'1000, the coincidence signal 911 is "1" and the bit 14 of the base address register is "0", and accordingly the selection signal 910 is "1". Consequently, the selector 155 selects the value held in the latch 955 (the value in the MOD_U register 950). In this case, the selector 155 outputs "1" as the bit 14 since the postdecrement 1-word access signal 909 is "1", and thus writes h'11fe back into the base address register. Otherwise in the 1-word access with postdecrement, the selector 155 selects the output of the ALU 153, i.e., the value held in the base address register–"2", and writes back the output value into the base address register since the signal line 914 is "0". For example, the base address register holds h'1002, h'1000 is written back into the base address register.

When 2-word access is made with postdecrement, the postincrement signal 913 outputted from the first decoder 917 is "0", the post-update signal 907 is "1", the postincrement 1-word access signal 908 is "0" and the postdecrement 1-word access signal 909 is "0".

In this condition, when the base address register value indicates h'1000, the coincidence signal 911 and the bit 14 of the base address register is "0", and accordingly the selection signal 910 is "1". Consequently, the selector 155 selects the value held in the latch 955 (the value in the MOD_U register 950) and writes h'11fc back into the base address register. Otherwise in the 2-word access with postdecrement, the selector 155 selects the output of the ALU 153, i.e., the value held in the base address register–"4", and writes back the output value into the base address register since the signal line 914 is "0".

The fourth preferred embodiment ensures proper operations in both cases of 1-word access and 2-word access with postdecrement even if the same values as used in the access with postincrement are set to the MOD_U register 950 and the MOD_L register 951.

Thus, though the circular buffer must be aligned in 2-word boundary, the data processor of the fourth preferred embodiment allows efficient 2-word access as well as 1-word access to the circular buffer with postincrement or postdecrement, like the second preferred embodiment, and thereby reduces code size of the program and the number of operation cycles. Further, setting is simple since it is only necessary to set the high limit address and the low limit address of the circular buffer by 2-word address in any case of the 1-word access and the 2-word access, regardless of whether postincrement or postdecrement.

Furthermore, the data processor of the fourth preferred embodiment allows judgment operation based on the base address value in parallel with address calculation during postincrement or postdecrement. That facilitates speeding up of operation with higher operating frequency.

The data processor of the fourth preferred embodiment may also be used in a variety cases as discussed in the first preferred embodiment.

Though the data processor of the fourth preferred embodiment discussed above uses 16-bit address, it may use an address of any length such as 24 bits and 32 bits. The data processor of the fourth preferred embodiment can process data of 24 bits and data of 32 bits, as well as data of 16 bits. Besides controlling byte address as discussed above, the data processor of the fourth preferred embodiment may be used to control word address, consisting of 16 bits, 24 bits or 32 bits.

The above discussion has been made on the data processor of the fourth preferred embodiment which enables execution of load/store instruction to perform 1-word or 2-word access with postincrement or postdecrement. Further, the present invention can be used to execute a load/store instruction which transfers 4 or more words at a time. In a case of 4-word data transfer, 4-word addresses are set to the MOD_U register 950 and the MOD_L register 951 and another judgments are made on the bit 13 and the bit 14.

Though judgment is made only based on the high-order 15 bits in the fourth preferred embodiment as discussed above, additional condition that the bit 15 is "0" may be relied upon in the judgment.

Though the MOD_U register 950 and the MOD_L register 951 each hold 14 bits physically in the data processor of the fourth preferred embodiment discussed above, the MOD_U register 950 and the MOD_L register 951 may each have a structure to hold 16 bits and then the bit 14 and the bit 15 may be compared or may not. When the bit 14 and the bit 15 are compared, "0" is necessarily set to the bit 14 and the bit 15 of the MOD_L register 951 and the whole 16-bit data are compared.

Though the MOD_U register 950 and the MOD_L register 951 each have word address in the above-discussed fourth preferred embodiment, the MOD_U register 950 and the MOD_L register 951 may each have byte address defining the boundary. If the bit 15 is ignored, the same operation as above-discussed fourth preferred embodiment is achieved.

In the data processor of the fourth preferred embodiment discussed above, the MOD_U register 950 and the MOD_L register 951 each hold all the address values up to the most significant bit (MSB). If the high-order bits are not held and judgment is made based on only the low-order bits, however, modulo addressing can work over more than one circular buffer provided in more than one region at a time without change of setting. This case needs some additional processing, such as outputting the value before updated to the high-order bits not to be compared.

Though the data processor of the fourth preferred embodiment discussed above has the structure of a general processor, the data processor may have a structure with the address register and the data register (such as accumulator) being separated, like a DSP. Further, the present invention may be also effective if it has a structure allowing independent access to a plurality of memories, like a DSP.

The data processor of the fourth preferred embodiment discussed above ensures no operation other than specified. When not-specified operation is done, additional processing for detecting an exception and the like may be performed. For example, an address exception may be serviced when the circular buffer has odd-word addresses.

The Fifth Preferred Embodiment

In the data processor of the second preferred embodiment, for modulo addressing, the high limit address of the modulo addressing region and the low limit address of the modulo addressing region are set in the MOD_U register 650 and the MOD_L register 651, respectively, by 1-word address. In the data processor of the fifth preferred embodiment, the high limit address and the low limit address are designated by 1-word address, like the second preferred embodiment, but only 1-word access with postincrement or postdecrement is allowed to be performed unlike the second preferred embodiment. The fifth preferred embodiment is different in control over modulo addressing from the second preferred embodiment, but it has the same basic specification and structure other than the above.

Figure 38:
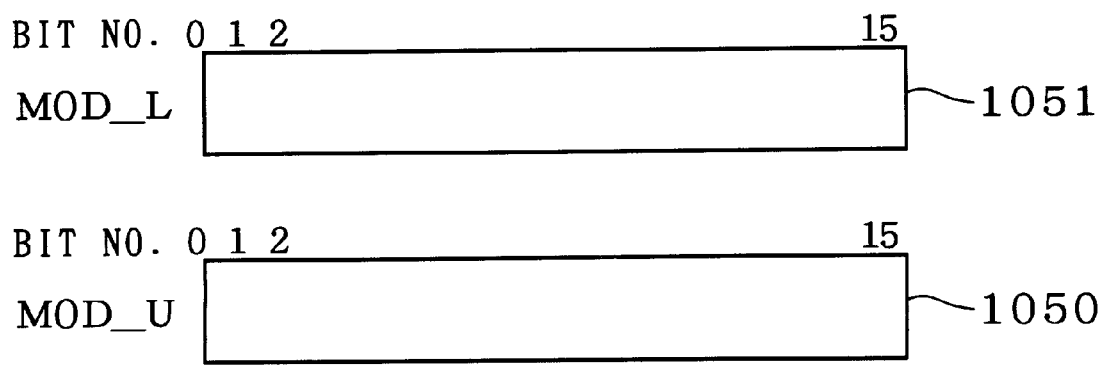
FIG. 38 illustrates registers holding the high limit address and the low limit address for modulo addressing in a data processor in accordance with a fifth preferred embodiment of the present invention.

FIG. 38 illustrates a MOD_U register 1050 and a MOD_L register 1051 to hold the high limit address and the low limit address, respectively, by 1-word address. The MOD_U register 1050 and the MOD_L register 1051 correspond to the MOD_U register 650 and the MOD_L register 651 of the second preferred embodiment, respectively. The MOD_U register 1050 is a 16-bit latch and holds the high limit 1-word address of a region to be modulo-addressed. The MOD_L register 1051 is a 16-bit latch and holds the low limit 1-word address of a region to be modulo-addressed. The low limit address is an address lower than the high limit address. To achieve modulo addressing, "0" must be set to the bit 15 of the MOD_U register 1050 and that of the MOD_L register 1051.

Figure 39:
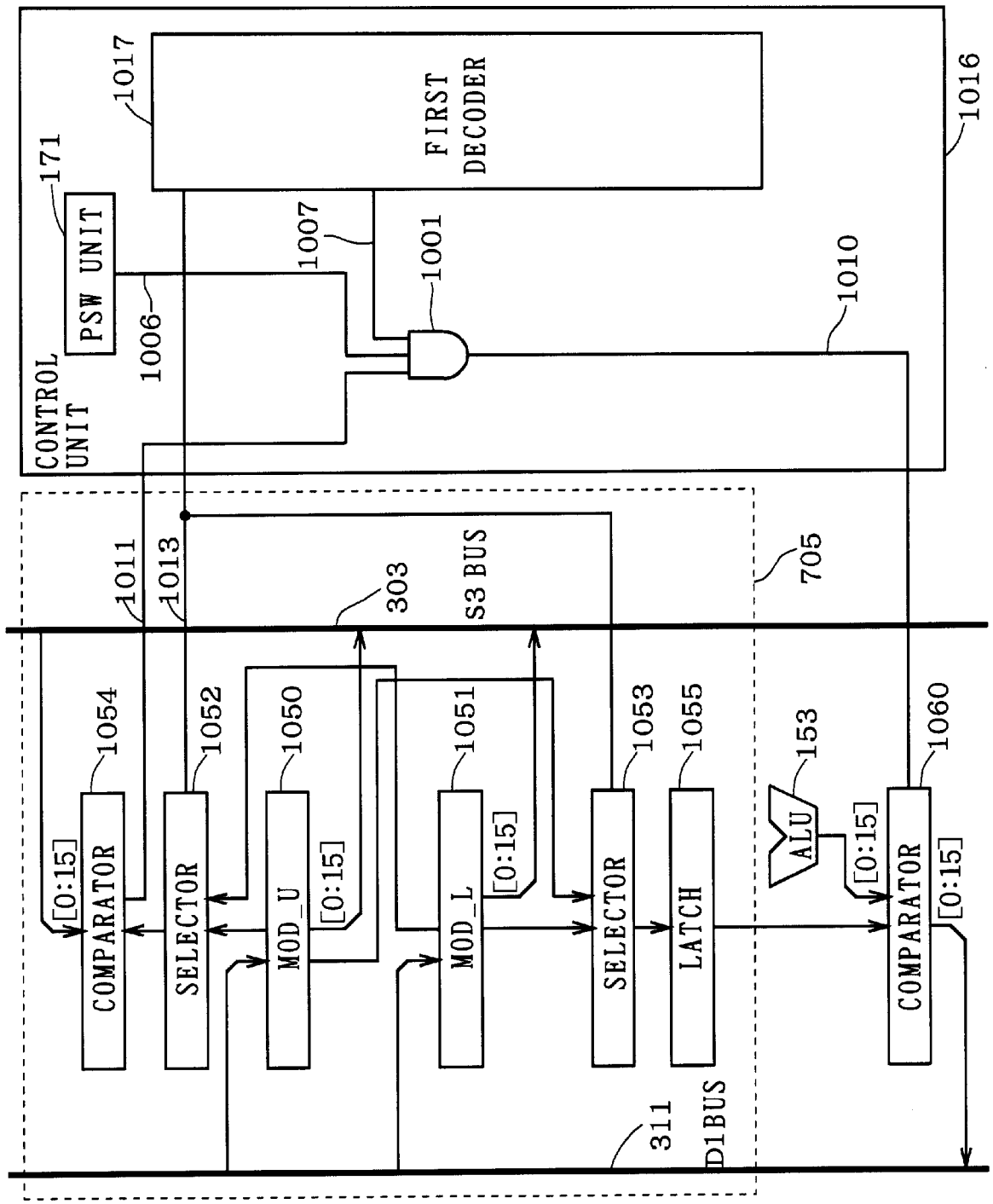
FIG. 39 is a schematic circuit diagram showing implementation of modulo addressing in the data processor in accordance with the fifth preferred embodiment of the present invention.

FIG. 39 is a schematic circuit diagram showing implementation of modulo addressing in the data processor of the fifth preferred embodiment. A control unit 1016 corresponds to the control unit 112 of the first preferred embodiment, and has almost the same elements other than those associated with control over modulo addressing. A modulo operation unit 705 corresponds to the modulo operation unit 700 of the first preferred embodiment. For simple illustration, enable signals and the like for the latches are omitted. Further, logics are shown in positive representation as much as possible. The data processor of the fifth preferred embodiment has almost the same circuit configuration other than shown in FIG. 39 as that of the first preferred embodiment.

A selector 1052 is controlled by a postincrement signal 1013 generated by a first decoder 1017. The postincrement signal 1013 indicates "1" when postincrement is made accompanying a memory-access instruction and indicates "0" when postdecrement is made. The selector 1052 outputs the value held in the MOD_U register 1050 to a comparator 1054 when the postincrement signal 1013 is "1" indicating postincrement and outputs the value held in the MOD_L register 1051 to the comparator 1054 when the postincrement signal 1013 is "0" indicating postiderement.

The comparator 1054 compares the base address value transferred over the S3 bus 303 with the address outputted from the selector 1052, and transfers the comparison result as a coincidence signal 1011 to the control unit 1016. Specifically, a coincidence signal 1011 indicates "1" when the two addresses coincide in 16 bits ranging from the bit 0 to the bit 15 and indicates "0" when they do not.

The MOD_U register 1050 which holds the high limit address of the circular buffer is a 16-bit latch and has an input port connected to the D1 bus 311 and output ports connected to the S3 bus 303 and the selectors 1052 and 1053. The MOD_L register 1051 which holds the low limit address is a 16-bit latch and has an input port connected to the D1 bus 311 and output ports connected to the S3 bus 303 and the selectors 1052 and 1053.

The selector 1053 is controlled by the postincrement signal 1013 generated by the first decoder 1017. The selector 1053 outputs the value held in the MOD_L register 1051 to a latch 1055 when the postincrement signal 1013 is "1" indicating postincrement and outputs the value held in the MOD_U register 1050 to the latch 1055 when the postincrement signal 1013 is "0" indicating postdecrement.

The selector 1060 selectively outputs the output from the ALU 153 and the address value held in the latch 1055 to the D1 bus 311, based on a selection signal 1010. In the control unit 1016, the selection signal 1010 for the selector 1060 is generated, based on the decoded result of the instruction and the comparison result from the comparator 1054. The PSW unit 171 outputs the value of the MD bit 44 which indicates whether the modulo addressing is enabled or disabled over a signal line 1006. The first decoder 1017 outputs a post-update signal 1007 which indicates "1" when memory access is performed with postincrement/postdecrement as a result of decoding of the instruction.

An AND gate 1001 generates the selection signal 1010 based on these informations. Specifically, the AND gate 1001 performs an AND operation of the post-update signal 1007, the signal on the signal line 1006 and the coincidence signal 1011 and outputs the operation result as the selection signal 1010.

When the modulo addressing is enabled (the signal line 1006 is "1") and a load/store instruction is executed with postincrement/postdecrement (the post-update signal 1007 is "1"), if the operand address transferred over the S3 bus 303 coincides with the output value from the selector 1052 (the coincidence signal 1011 is "1"), the selection signal 1010 indicates "1" and otherwise "0".

When a load/store instruction is executed with post-updating of the address, if the selection signal 1010 is "0", the addition/subtraction result from the ALU 153 is written back to the register file 115 over the D1 bus 311 as an updated pointer value. If the selection signal 1010 is "1", the address value held in the latch 1055 is written back to the register file 115 over the D1 bus 311 as the updated pointer value. When the modulo addressing is disabled, the selection signal 1010 is necessarily "0" and the selector 1060 always selects the output from the ALU 153.

As an example, updating of address in execution of the load/store instructions which makes access to the circular buffer region will be discussed. The value in the MD bit 44 is assumed to be "1".

In the data processor of the fifth preferred embodiment, the circular buffer must be accessed by 1-word address.

Figure 40:
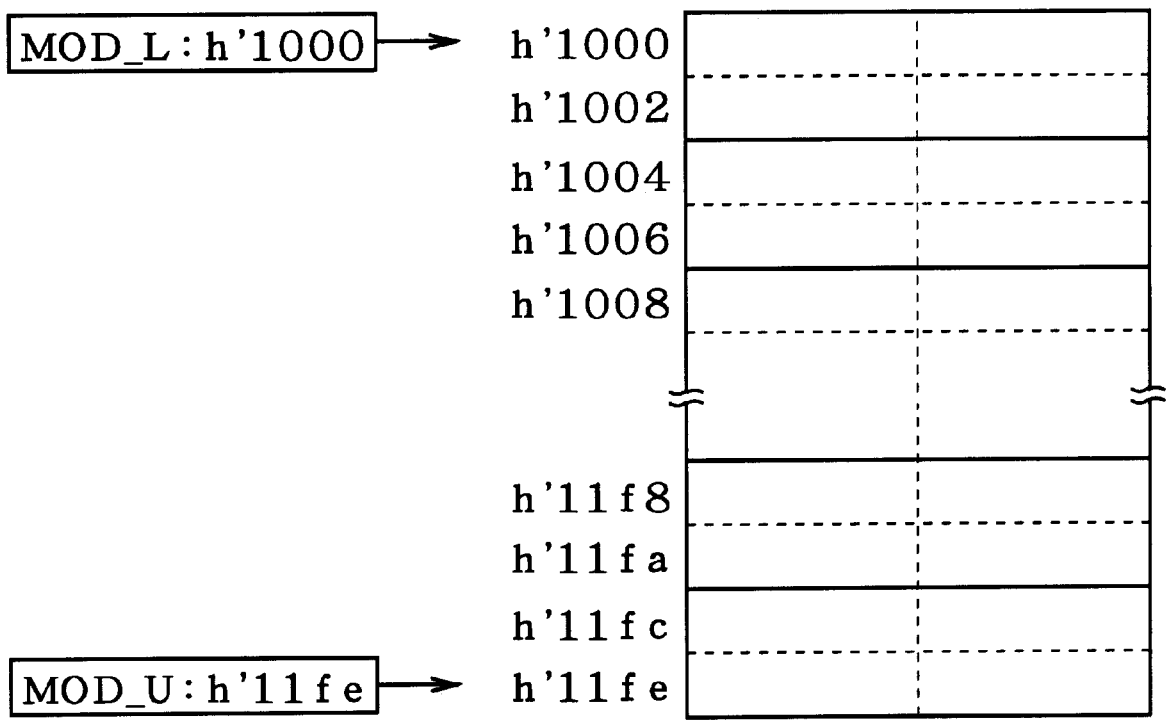
FIG. 40 illustrates a structure of a circular buffer with both the two boundaries aligned in 4 bytes.

FIG. 40 illustrates a structure of a circular buffer. In the data processor of the fifth preferred embodiment, the circular buffer only has to be aligned in 1-word boundary, and the same operation can be performed, regardless of whether being aligned in 2-word boundary or not. Hexadecimal representation follows "h'". A circular buffer region covers 256 words (512 bytes) ranging from h'1000 to h'11ff. The low limit 1-word address h'1000 of the circular buffer is set to the MOD_L register 1051 and the high limit 1-word address h'11fe is set to the MOD_U register 1050.

When postincrement is made, the selector 1052 outputs the value held in the MOD_U register 1050 to the comparator 1054 and the selector 1053 outputs the value held in the MOD_L register 1051 to the latch 1055 since the postincrement signal 1013 outputted from the first decoder 1017 is "1".

When 1-word access is made with postincrement, the postincrement signal 1013 outputted from the first decoder 1017 is "1" and the post-update signal 1007 is "1".

In this condition, when the base address register value indicates h'11fe, the coincidence signal 1011 is "1" and accordingly the selection signal 1010 is "1". Consequently, the selector 1060 selects the value held in the latch 1055 (the value of the MOD_L register 1051) and writes h'1000 back into the base address register. Otherwise in the 1-word access with postincrement, the selector 1060 selects the output of the ALU 153, i.e., the value held in the base address register+"2", and writes back the output value into the base address register since the coincidence signal line 1011 is "0". For example, the base address register holds h'11fc, h'11fe is written back into the base address register.

When postdecrement is made, the selector 1052 outputs the value held in the MOD_L register 1051 to the comparator 1054 and the selector 1053 outputs the value held in the MOD_U register 1050 to the latch 1055 since the postincrement signal 1013 outputted from the first decoder 1017 is "0".

When 1-word access is made with postdecrement, the postincrement signal 1013 outputted from the first decoder 1017 is "0" and the post-update signal 1007 is "1".

In this condition, when the base address register value indicates h'1000, the coincidence signal 1011 is "1" and accordingly the selection signal 1010 is "1". Consequently, the selector 1060 selects the value held in the latch 1055 (the value of the MOD_U register 1050) and writes h'11fe back into the base address register. Otherwise in the 1-word access with postdecrement, the selector 1060 selects the output of the ALU 153, i.e., the value held in the base address register−"2", and writes back the output value into the base address register since the coincidence signal line 1011 is "0". For example, the base address register holds h'1002, h'1000 is written back into the base address register.

The data processor of the fifth preferred embodiment ensures proper operations in both cases of 1-word access with postincrement and 1-word access with postdecrement without change of setting for the MOD_U register 1050 and the MOD_L register 1051.

Thus, the data processor of the fifth preferred embodiment ensures proper postdecrement operation even if the same values as used in the postincrement operation are set to the MOD_U register 1050 and the MOD_L register 1051.

Thus, though the modulo addressing works only for 1-word access, the data processor of the fifth preferred embodiment allows efficient access to the circular buffer, like the fourth preferred embodiment, and thereby reduces code size of the program and the number of operation cycles.

Further, setting is simple since it is only necessary to set the high limit address and the low limit address of the circular buffer by 1-word address regardless of whether postincrement or postdecrement.

Furthermore, the data processor of the fifth preferred embodiment allows judgment operation based on the base address value in parallel with address calculation during postincrement or postdecrement. That facilitates speeding up of operation with higher operating frequency.

The data processor of the fifth preferred embodiment may also be used in a variety cases as discussed in the first preferred embodiment.

Though the data processor of the fifth preferred embodiment discussed above uses 16-bit address, it may use an address of any length such as 24 bits and 32 bits. The data processor of the fifth preferred embodiment can process data of 24 bits and data of 32 bits, as well as data of 16 bits. Besides controlling byte address as discussed above, the data processor of the second preferred embodiment may be used to control word address, consisting of 16 bits, 24 bits or 32 bits.

Though only the 1-word access is allowed to be performed with modulo addressing in the data processor of the fifth preferred embodiment, other-sized access, such as 2-word access or 4-word access, may be performed alone. For example, only the 2-word access is performed, it is necessary to set 2-word address to the MOD_U register 1050 and the MOD_L register 1051 in order to control the modulo addressing.

Though judgment is based on the whole 16 bits of the address in the data processor of the fifth preferred embodiment as discussed above, the judgment may be based on only the high-order 15 bits In the data processor of the fifth preferred embodiment as discussed above, the MOD_U register 1050 and the MOD_L register 1051 each hold 16 bits physically. The MOD_U register 1050 and the MOD_L register 1051 may each have a structure to hold the high-order 15 bits to be compared. If the data processor does not ensure the reliability of an operation with odd-word address, any operation may be permitted.

In the data processor of the fifth preferred embodiment discussed above, the MOD_U register 1050 and the MOD_L register 1051 each hold all the address values up to the most significant bit (MSB). If the high-order bits are not held and judgment is made based on only the low-order bits, however, modulo addressing can work over more than one circular buffer provided in more than one region at a time without change of setting. This case needs some additional processing, such as outputting the value before updated to the high-order bits not to be compared.

Though the data processor of the fifth preferred embodiment discussed above has the structure of a general processor, the data processor may have a structure with the address register and the data register (such as accumulator) being separated, like a DSP. Further, the present invention may be also effective if it has a structure allowing independent access to a plurality of memories, like a DSP.

The data processor of the fifth preferred embodiment discussed above ensures no operation other than specified. When not-specified operation is done, additional processing for detecting an exception and the like may be performed. For example, an address exception may be serviced when the circular buffer has odd-word addresses.

While the invention has been shown and described in detail, the foregoing description is in all aspects illustrative and not restrictive. It is therefore understood that numerous modifications and variations can be devised without departing from the scope of the invention.

We claim:

1. A data processor having a memory with a circular buffer region to be accessed in units of n-bit data and 2n-bit data and being capable of executing at least a first memory-access instruction and a second memory-access instruction, said first memory-access instruction performing access to said memory in units of n-bit data with updating of address to specify n-bit data to be next accessed, said second memory-access instruction performing access to said memory in units of 2n-bit data with updating of address to specify 2n-bit data to be next accessed, comprising:

start-address information supply means for supplying start-address information on said circular buffer region;

end-address information supply means for supplying end-address information on said circular buffer means, said start-address information designating an address which can specify at least 2n-bit data in said circular buffer region, said end-address information designating an address which can specify at least 2n-bit data in said circular buffer region, the direction from said address designated by said start-address information to said address designated by said end-address information being defined as an address-update direction, comparison means for comparing an access address specifying data to be accessed in said circular buffer region with said address designated by said end-address information to output comparison result information;

address calculation means for calculating the next address of said access address in said address-update direction to output a calculated address during execution of said first or second memory-access instruction, said calculated address being an address to specify n-bit data when said first memory-access instruction is executed, said calculated address being an address to specify 2n-bit data when said second memory-access instruction is executed; and access-address selection means for selecting a value based on said address designated by said start-address information or said calculated address on the basis of said comparison result information as a next access address to specify data to be next accessed, wherein when said first memory-access instruction is executed, said access-address selection means selects an n-bit access address which is based on said address designated by said start-address information and can specify n-bit data in said circular buffer region as said next access address if judges that a first condition is true, said first condition being that said address designated by said end-address information and said access address substantially coincide in address field to specify n-bit data, and selects said calculated address as said next access address if judges that said first condition is not true, and when said second memory-access instruction is executed, said access-address selection means selects a 2n-bit access address which is based on said address designated by said start-address information and can specify 2n-bit data in said circular buffer region as said next access address if judges that a second condition is true, said second condition being that said address designated by said end-address information and said access address substantially coincide in address field to specify 2n-bit data, and selects said calculated address as said next access address if judges that said second condition is not true.

2. The data processor of claim 1, wherein said first memory-access instruction includes a first increment operation for incrementing an address to accomplish said updating of address, said second memory-access instruction includes a second increment operation for incrementing an address to accomplish said updating of address, and said address-update direction is a direction that increments an address, said start-address information supply means includes start-address information holding means for holding said start-address information, and said end-address information supply means includes end-address information holding means for holding said end-address information.

3. The data processor of claim 2, wherein said first memory-access instruction operates said first increment operation after accessing said memory, and said second memory-access instruction operates said second increment operation after accessing said memory.

4. The data processor of claim 2, wherein said address designated by said start-address information includes an address which can specify n-bit data in said circular buffer region, and said address designated by said end-address information includes an address which can specify n-bit data in said circular buffer region, said second condition used when said access-address selection means selects said next access address includes a condition that said access address coincides with an address specifying the first one of two n-bit data constituting 2n-bit data in said circular buffer region specified by said address designated by said end-address information, said n-bit access address includes said address designated by said start-address information, and said 2n-bit access address includes said address designated by said start-address information.

5. The data processor of claim 2, wherein said address designated by said start-address information includes an address which can specify 2n-bit data in said circular buffer region, and said address designated by said end-address information includes an address which can specify 2n-bit data in said circular buffer region, said first condition used when said access-address selection means selects said next access address includes a condition that said access address coincides with an address specifying the second one of two n-bit data constituting 2n-bit data in said circular buffer region specified by said address designated by said end-address information, said n-bit access address includes said address designated by said start-address information, and said 2n-bit access address includes said address designated by said start-address information.

6. The data processor of claim 1, wherein said first memory-access instruction includes a first decrement operation for decrementing an address to accomplish said updating of address, said second memory-access instruction includes a second decrement operation for decrementing an address to accomplish said updating of address, and said address-update direction is a direction that decrements an address, said start-address information supply means includes start-address information holding means for holding said start-address information, and said end-address information supply means includes end-address information holding means for holding said end-address information.

7. The data processor of claim 6, wherein said first memory-access instruction operates said first decrement operation after accessing said memory, and said second memory-access instruction operates said second decrement operation after accessing said memory.

8. The data processor of claim 6, wherein said address designated by said start-address information includes an address which can specify n-bit data in said circular buffer region, and said address designated by said end-address information includes an address which can specify n-bit data in said circular buffer region, said n-bit access address includes said address designated by said start-address information, and said 2n-bit access address includes an address field to specify 2n-bit data of said address designated by said start-address information and fixed data to enable access in units of 2n-bit data.

9. The data processor of claim 6, wherein said address designated by said start-address information includes an address which can specify 2n-bit data in said circular buffer region, and said address designated by said end-address information includes an address which can specify 2n-bit data in said circular buffer region, said n-bit access address includes an address specifying the second one of two n-bit data constituting 2n-bit data in said circular buffer region specified by said address designated by said start-address information, and said 2n-bit access address includes said address designated by said start-address information.

10. The data processor of claim 1, further comprising:

low-limit address holding means for holding a low limit address of said circular buffer region; and high-limit address holding means for holding a high limit address of said circular buffer region, wherein said first memory-access instruction includes a first increment operation for incrementing an address to accomplish said updating of address, said second memory-access instruction includes a second increment operation for incrementing an address to accomplish said updating of address, and said address-update direction is a direction that increments an address when said first and second memory-access instructions perform said first and second increment operations, respectively, wherein said first memory-access instruction includes a first decrement operation for decrementing an address to accomplish said updating of address, said second memory-access instruction includes a second decrement operation for decrementing an address to accomplish said updating of address, and said address-update direction is a direction that decrements an address when said first and second memory-access instructions perform said first and second decrement operations, respectively, and wherein said start-address information supply means includes first selection means receiving executable-instruction information indicating a content of said first or second memory-access instruction to be executed and said low and high limit addresses, for supplying said start-address information designating said low limit address when said executable-instruction information indicates said first or second increment operation and supplying said start-address information designating said high limit address when said executable-instruction information indicates said first or second decrement operation, and said end-address information supply means includes second selection means receiving said executable-instruction information and said low and high limit addresses, for supplying said end-address information designating said high limit address when said executable-instruction information indicates said first or second increment operation and supplying said end-address information designating said low limit address when said executable-instruction information indicates said first or second decrement operation.

11. The data processor of claim 10, wherein said low limit address and said high limit address each include an address which can specify n-bit data in said circular buffer region, said n-bit access address includes said address designated by said start-address information, and said 2n-bit access address is said address designated by said start-address information when said second memory-access instruction performs said second increment operation and said 2n-bit access address includes an address field to specify 2n-bit data of said address designated by said start-address information and fixed data to enable access in units of 2n-bit data when said second memory-access instruction performs said second decrement operation.

12. The data processor of claim 10, wherein said low limit address and said high limit address each include an address which can specify 2n-bit data in said circular buffer region, said first condition used when said access-address selection means selects said next access address is a condition that said access address coincides with an address specifying the second one of two n-bit data constituting 2n-bit data in said circular buffer region specified by said address designated by said end-address information when said first memory-access performs said first increment operation, said n-bit access address is said address designated by said start-address information when said first memory-access instruction performs said first increment operation and said n-bit access address is an address specifying the second one of two n-bit data constituting 2n-bit data in said circular buffer region specified by said address designated by said start-address information when said first memory-access instruction performs said first decrement operation, and said 2n-bit access address includes said address designated by said start-address information.

13. The data processor of claim 1, wherein said first and second memory-access instructions each include a load instruction which loads data from said memory.

14. The data processor of claim 1, wherein said first and second memory-access instructions each include a store instruction which stores data into said memory.

15. A data processor having a memory with a circular buffer region to be accessed in units of n-bit data and being capable of executing at least a memory-access instruction which performs access to said memory in units of n-bit data with updating of address to specify n-bit data to be next accessed, said memory-access instruction including an increment operation for incrementing an address to accomplish said updating of address or a decrement operation for decrementing an address to accomplish said updating of address, wherein an address-update direction is a direction that increments an address when said memory-access instruction performs said increment operation and is a direction that decrements an address when said memory-access instruction performs said decrement operation, said data processor comprising:

low-limit address holding means for holding a low limit address of said circular buffer region; and high-limit address holding means for holding a high limit address of said circular buffer region, said low limit address and said high limit address each including an address which can specify n-bit data in said circular buffer region, said data processor further comprising:

first selection means receiving executable-instruction information indicating a content of said memory-access instruction to be executed and said low and high limit addresses, for supplying start-address information designating said low limit address when said executable-instruction information indicates said increment operation and supplying said start-address information designating said high limit address when said executable-instruction information indicates said decrement operation; and second selection means receiving executable-instruction information and said low and high limit addresses, for supplying end-address information designating said high limit address when said executable-instruction information indicates said increment operation and supplying said end-address information designating said low limit address when said executable-instruction information indicates said decrement operation, wherein a direction from an address designated by said start-address information to an address designated by said end-address information is defined said address-update direction, said data processor further comprising:

comparison means for comparing an access address specifying data to be accessed in said circular buffer region with said address designated by said end-address information to output comparison result information;

address calculation means for calculating the next address of said access address in said address-update direction to output a calculated address during execution of said memory-access instruction; and access-address selection means for selecting said address designated by said start-address information or said calculated address on the basis of said comparison result information as a next access address to specify data to be next accessed, wherein said access-address selection means selects said address designated by said start-address information as said next access address if judges that a first condition is true on the basis of said comparison result information, said first condition being that said address designated by said end-address information and said access address substantially coincide in address field to specify n-bit data, and selects said calculated address as said next access address if judges that said first condition is not true.

16. The data processor of claim 15, wherein said memory-access instruction performs said increment operation after accessing said memory.

17. The data processor of claim 15, wherein said memory-access instruction performs said decrement operation after accessing said memory.

18. The data processor of claim 15, wherein said memory-access instruction includes a load instruction which loads data from said memory.

19. The data processor of claim 15, wherein said memory-access instruction includes a store instruction which stores data into said memory.

* * * * *